United States Patent [19]
Matsumoto et al.

[11] Patent Number: 5,864,858
[45] Date of Patent: Jan. 26, 1999

[54] METHOD FOR DATA RETRIEVAL IN A DATA-STRING SET BY EXTRACTING RELATED LINK-INFORMATION FROM A PARENT NODE

[75] Inventors: Shigeru Matsumoto, 420, Toyazuka-cho, Isesaki, Gunma 372, Japan; Takahisa Yamamoto, Yokohama, Japan

[73] Assignee: Shigeru Matsumoto, Gunma, Japan

[21] Appl. No.: 12,729

[22] Filed: Jan. 23, 1998

Related U.S. Application Data

[62] Division of Ser. No. 659,163, Jun. 5, 1996, Pat. No. 5,749,080.

[30] Foreign Application Priority Data

Jun. 5, 1995 [JP] Japan .................................. 7-161.400

[51] Int. Cl.⁶ ............................................... G06F 17/30
[52] U.S. Cl. ............................. 707/100; 707/3; 707/514; 707/517; 711/117
[58] Field of Search ........................... 707/3, 100, 514, 707/517; 711/117

[56] References Cited

U.S. PATENT DOCUMENTS

| | | | |
|---|---|---|---|
| 4,468,728 | 8/1984 | Wang | 707/1 |
| 4,611,298 | 9/1986 | Schuldt | 707/1 |
| 4,831,543 | 5/1989 | Mastellone | 364/489 |
| 4,945,475 | 7/1990 | Bruffey et al. | 707/1 |
| 5,247,666 | 9/1993 | Buckwold | 707/100 |
| 5,265,244 | 11/1993 | Gosh et al. | 707/1 |
| 5,343,559 | 8/1994 | Lee | 711/102 |
| 5,442,784 | 8/1995 | Powers et al. | 707/102 |
| 5,511,159 | 4/1996 | Baker et al. | 345/326 |
| 5,530,957 | 6/1996 | Koenig | 707/100 |
| 5,557,722 | 9/1996 | Derose et al. | 707/513 |
| 5,581,756 | 12/1996 | Nakabayashi | 707/2 |
| 5,625,812 | 4/1997 | David | 707/2 |
| 5,627,748 | 5/1997 | Baker et al. | 707/531 |
| 5,640,551 | 6/1997 | Chu et al. | 707/5 |
| 5,644,776 | 7/1997 | Derose et al. | 707/500 |
| 5,664,181 | 9/1997 | Velissaropoulos et al. | 707/102 |

*Primary Examiner*—Thomas G. Black
*Assistant Examiner*—Jean R. Homere

[57] ABSTRACT

A data retrieval method in a data-string set including a plurality of data strings, each data string having a data identification name storage area, a parent data storage area storing link-information data, wherein when data strings are consecutively traced on the basis of link-information data stored in parent data storage areas of data strings, with arbitrary link-information data stored in the parent data storage area of a certain data string as a starting point, until the parent data storage area of the traced data string is empty, the link-information data about the certain data string is included in none of the parent data storage areas of the traced data strings; the method comprising recursively extracting a data string on the basis of link-information data stored in a parent data storage areas of the data string storing a data identification name to be retrieved and the extracted data string, until the parent data storage area of the extracted data string is empty.

4 Claims, 34 Drawing Sheets

Fig. 5A

| ID | |
|---|---|
| Name | |
| Level_Value | |
| Parent | Parent_ID |
| | Parent_ID |
| | Parent_ID |
| | Parent_ID |
| | ..... |
| | ..... |
| | ..... |
| | ..... |

Fig. 5B

| (ID =) | 5 |
|---|---|
| (Name =) | INSULATOR |
| (Level_Value =) | 1 |
| Parent | (Parent_ID =) 12 |
| | (Parent_ID =) 14 |
| | |
| | |
| | |
| | |
| | |
| | |

Fig. 6A

| (ID = ) | 12 | |
|---|---|---|
| ( Name = ) | WOOD | |
| (Level_Value = ) | 2 | |
| Parent | ( Parent_ID = ) | 15 |
| | ( Parent_ID = ) | 16 |
| | | |
| | | |
| | | |
| | | |
| | | |
| | | |

Fig. 6B

| (ID = ) | 15 |
|---|---|
| ( Name = ) | DESK |
| (Level_Value = ) | 3 |
| Parent | |
| | |
| | |
| | |
| | |
| | |
| | |
| | |

Fig. 7A

| (ID = ) | 16 |
|---|---|
| ( Name = ) | PENCIL |
| (Level_Value = ) | 3 |
| Parent | |

Fig. 7B

| (ID = ) | 14 |
|---|---|
| ( Name = ) | MICA |
| (Level_Value = ) | 2 |
| Parent | |

Fig. 19A

| ID | |
|---|---|
| Name | |
| Level_Value | |
| Element | Element_ID |
| | Element_ID |
| | Element_ID |
| | Element_ID |
| | ..... |
| | ..... |
| | ..... |
| | ..... |

Fig. 19B

| (ID =) | 5 |
|---|---|
| (Name =) | INSULATOR |
| (Level_Value =) | 1 |
| Element | |
| | |
| | |
| | |
| | |
| | |
| | |

Fig. 20A

| (ID = ) | 12 | |
|---|---|---|
| ( Name = ) | WOOD | |
| (Level_Value = ) | 2 | |
| Element | (Element_ID = ) | 5 |
| | (Element_ID = ) | 6 |
| | (Element_ID = ) | 7 |
| | (Element_ID = ) | 8 |

Fig. 20B

| (ID = ) | 15 | |
|---|---|---|
| ( Name = ) | DESK | |
| (Level_Value = ) | 3 | |
| Element | (Element_ID = ) | 1 |
| | (Element_ID = ) | 2 |
| | (Element_ID = ) | 12 |

Fig. 21A

| (ID = ) | 16 | |
|---|---|---|
| ( Name = ) | PENCIL | |
| (Level_Value = ) | 3 | |
| Element | (Element_ID = ) | 1 |
| | (Element_ID = ) | 3 |
| | (Element_ID = ) | 4 |
| | (Element_ID = ) | 12 |
| | (Element_ID = ) | 13 |
| | | |
| | | |
| | | |

Fig. 21B

| (ID = ) | 14 | |
|---|---|---|
| ( Name = ) | MICA | |
| (Level_Value = ) | 2 | |
| Element | (Element_ID = ) | 5 |
| | | |
| | | |
| | | |
| | | |
| | | |
| | | |
| | | |

Fig. 27

| ID | |
|---|---|
| Name | |
| Level_Value | |
| Parent | Parent_ID |
| | Parent_ID |
| | Parent_ID |
| | Parent_ID |
| | ..... |
| | ..... |
| | ..... |
| | ..... |
| Element | Element_ID |
| | Element_ID |
| | Element_ID |
| | Element_ID |
| | ..... |
| | ..... |
| | ..... |
| | ..... |

Fig. 28

| (ID = ) | 5 | |
|---|---|---|
| ( Name = ) | INSULATOR | |
| (Level_Value = ) | 1 | |
| Parent | ( Parent_ID = ) | 12 |
| | ( Parent_ID = ) | 14 |
| | | |
| | | |
| | | |
| | | |
| | | |
| | | |
| Element | | |
| | | |
| | | |
| | | |
| | | |
| | | |
| | | |
| | | |

Fig. 29

| | (ID = ) | 12 |
|---|---|---|
| | ( Name = ) | WOOD |
| | (Level_Value = ) | 3 |
| Parent | ( Parent_ID = ) | 15 |
| | ( Parent_ID = ) | 16 |
| | | |
| | | |
| | | |
| | | |
| | | |
| | | |
| Element | ( Element_ID = ) | 5 |
| | ( Element_ID = ) | 6 |
| | ( Element_ID = ) | 7 |
| | ( Element_ID = ) | 8 |
| | | |
| | | |
| | | |
| | | |

Fig. 30

| (ID = ) | 15 |
|---|---|
| ( Name = ) | DESK |
| (Level_Value = ) | 4 |

| Parent | |
|---|---|
| | |

| Element | ( Element_ID = ) 1 |
| | ( Element_ID = ) 2 |
| | ( Element_ID = ) 12 |

Fig. 31

| (ID = ) | 14 |
|---|---|
| ( Name = ) | MICA |
| (Level_Value = ) | 2 |
| Parent | |
| Element | ( Element_ID = ) 5 |

Fig. 32

| (ID = ) | 16 |
|---|---|
| ( Name = ) | PENCIL |
| (Level_Value = ) | 4 |

| Parent | |
|---|---|
| Element | ( Element_ID = ) 1 |
| | ( Element_ID = ) 3 |
| | ( Element_ID = ) 4 |
| | ( Element_ID = ) 12 |
| | ( Element_ID = ) 13 |

Fig. 33

Concept Structure

| ID |
|---|
| Name |
| Level_Value |
| Parent | Parent_Count |
|  | Parent_LinkTop |
|  | Parent_LinkEnd |
| Element | Element_Count |
|  | Element_LinkTop |
|  | Element_LinkEnd |

Parent Set Structure

| ID |
|---|
| Next_ID |
| Before_ID |
| Parent_ID |
| Parent_ID |
| Parent_ID |
| Parent_ID |
| Parent_ID |
| Parent_ID |

Parent Set Structure

| ID |
|---|
| Next_ID |
| Before_ID |
| Parent_ID |
| Parent_ID |
| Parent_ID |
| Parent_ID |
| Parent_ID |
| Parent_ID |

Element Set Structure

| ID |
|---|
| Next_ID |
| Before_ID |
| Element_ID |
| Element_ID |
| Element_ID |
| Element_ID |
| Element_ID |
| Element_ID |

Element Set Structure

| ID |
|---|
| Next_ID |
| Before_ID |
| Element_ID |
| Element_ID |
| Element_ID |
| Element_ID |
| Element_ID |
| Element_ID |

METHOD FOR DATA RETRIEVAL IN A DATA-STRING SET BY EXTRACTING RELATED LINK-INFORMATION FROM A PARENT NODE

This application is a division of Ser. No. 8/659,163 filed Jun. 5, 1996 now U.S. Pat. No. 5,749,080.

BACKGROUND OF THE INVENTION AND RELATED ART STATEMENT

The present invention relates to a data retrieval method in a data structure which can constitute, e.g., database or an artificial intelligence, and a method of adding link-information data to a data string of the data structure.

A variety of databases are practically used at present, and above all, a relational database is the most widely used. A variety of data are stored in a database, and data stored in the database is retrieved by various methods.

With reference to an example in which each of concept names such as DESK, PENCIL, WOOD, GRAPHITE, MICA and BRUSH OF MOTOR consists of element names as shown in the following Table 1, and in a record, the concept name is stored in a concept field and element name(s) is/are stored in element field(s), the outline of a conventional relational database will be explained below. In Table 1, numerals show record numbers, and alphabets show element field numbers.

In the relational database, a new record relationship can made by deriving the relationship of X{Z} on the basis of a combination of two records of X{..., Y,...} and Y {..., Z,... }. A capital letter located before the brace "{" stands for a concept name, and capital letters in the braces "{ }" stand for element names. For example, concept name "DESK" and element name "COMBUSTIBILITY" can be combined as

DESK{COMBUSTIBILITY} on the basis of a combination of records of

DESK{WOOD, ... } and

WOOD {..., COMBUSTIBILITY, ... }.

number of the element field containing element name "Y" in record "X". In the example shown in Table 1, for example, it is necessary to know element name of "WOOD" is stored in element field number A of record number 1. However, the number of the element field containing element name "Y" is not always known. It is therefore necessary to combine all the element fields of record X with the concept fields of other records. However, the above operation requires enormous processing when the records and element fields increase in number. For preventing the above situation, there might be a method in which one record consists of one concept field and one element field, and the element field of the record is combined with the concept field of other records. However, not only a great number of records are required, but also it is required to input one concept name in each concept field of a great number of records.

In the relational database, further, when element name "COMBUSTIBILITY" is retrieved without combining records, record "PENCIL" and record "WOOD" are extracted. That is, a directly related concept name can be extracted. However, since the record "DESK" includes element name "WOOD" but the record "DESK" does not include element name "COMBUSTIBILITY" in its element field, it is impossible to make out a piece of information that record "DESK" can include element name "COMBUSTIBILITY". That is, an indirect related concept name can not be extracted. In the relational database, therefore, it is required to input element name "COMBUSTIBILITY" to the element field of the record "DESK". That is, the problem is that one "element name" is required to be inputted in an element field of each of a plurality of records. Further, it is required to input a number of element names in element fields in records having certain concept names. In another solution, all the element fields can be combined with all concept fields. However, it is required to retrieve huge data made by the above combinations, and it is not known which element field has the element name to be retrieved. It is therefore necessary to retrieve all the element fields.

In the relational database, further, it is impossible to prevent the occurrence of circulating definitions of A{B}, B{C} and C{A}. If the records having a state of the circulating definition are allowed to be present, an endless loop takes place in the retrieval.

TABLE 1

| Record No. | Concept Field | Element Field | | | | | | | | |
|---|---|---|---|---|---|---|---|---|---|---|
| | | A | B | C | D | E | F | G | H | I |
| 1 | desk | wood | office supplies | furniture | | | | | | |
| 2 | pencil | wood | insulator | combustibility | conductibility | softness | black color | office supplies | writing tools | cylindrical form |
| 3 | wood | insulator | combustibility | plant | specific gravity of 1 or less | | | | | |
| 4 | graphite | conductibility | softness | black color | | | | | | |
| 5 | mica | insulator | | | | | | | | |
| 6 | brush of motor | conductibility | softness | black color | | | | | | |

For convenience' sake, record "X" refers to a record in which concept name "X" is stored in the concept field.

In the relational database, for obtaining a piece of information that element name of "COMBUSTIBILITY" can be included in concept name "DESK", i.e., for combining record "X" including element name "Y" with record "Y" including element name "Z", it is necessary to know the In the relational database, further, original data are generally arrayed in the form of a two-dimensional table. Each column corresponds to a concept field and an element field containing fixed data of the same kind, and data are classified in advance and inputted to corresponding fields. The relational database is therefore not suitable for expressing a case where an element of an indefinite number such as concept name "PENCIL" is included and the attributes of data to be inputted in element fields are not classified.

In the above-explained relational database, the concept field is placed in the same table, while the above is also true of a case where one table is made from one concept.

OBJECTS AND SUMMARY OF THE INVENTION

It is therefore a first object of the present invention to provide a data retrieval method which enables the extraction of not only a directly related concept name but also an indirectly related concept name.

Further, it is a second object of the present invention to provide a method of adding link-information data, which enables the exclusion of occurrence of the above circulating definition when new link-information data is added to a predetermined region in a data string of a data-string set consisting of a plurality of data strings.

The data retrieval method directed to the first aspect of the present invention for achieving the above first object of the present invention is concerned with a data retrieval method of extracting a data string, which corresponds to a parent concept and/or an indirect parent concept, for a data identification name to be retrieved. The terms "parent concept" and "indirect parent concept" will be explained in detail later. That is, the data retrieval method directed to the first aspect of the present invention is a data retrieval method in a data-string set including a plurality of data strings, each data string DS_1 having
(1) a data identification name storage area storing a data identification name,
(2) a data level storage area storing a data level value, and
(3) a parent data storage area storing link-information data about a data string DS_2 storing a data identification name which indicates a set including the data identification name stored in the data string DS_1,
wherein:
(A) the data string DS_2 has a larger data level value than the data string DS_1 has,
(B) the parent data storage area of the data string DS_1 does not contain link-information data about the data string DS_1 itself, and the link-information data stored in the parent data storage area of the data string DS_1 differ from one another, and
(C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings,
the method comprising the steps of
(a) inputting a data identification name corresponding to data to be retrieved,
(b) extracting a data string on the basis of link-information data stored in a parent data storage area of a data string whose data identification name storage area stores the same data identification name as the inputted data identification name, and further extracting a data string on the basis of link-information data stored in a parent data storage area of the extracted data string until the parent data storage area of the extracted data string is empty, and
(c) outputting the extracted data string.

The term "link-information data" stands for a direct address or an indirect address for an area storing a data string, a pointer for an address area storing a data string, or a data identification name stored in a data string. To sum up, the link-information data may be any data which is referred to for reaching contents of other data string. The term "link-information data" is used in this sense hereinafter.

In the data retrieval method directed to the first aspect of the present invention, in the step (b), as schematically shown in FIG. 1A, data strings $P_1$, $P_2$, $P_3$, ... are extracted on the basis of the link-information data stored in the parent data storage area of the data string $S_0$ whose data identification name storage area stores the same data identification name as the inputted data identification name. Then, concerning the data strings $P_1$, $P_2$, $P_3$, ..., data strings are extracted on the basis of the link-information data stored in the parent data storage areas of these extracted data strings $P_1$, $P_2$, $P_3$, .... The extracted data strings are, for example, data string $P_{11}$, $P_{12}$, $P_{13}$ ..., $P_{21}$, $P_{22}$, $P_{23}$ ..., $P_{31}$, $P_{32}$, $P_{33}$ .... FIGS. 1A and 1B show part of the data strings.

Then, data strings are extracted on the basis of the link-information data stored in the parent data storage areas of all of the extracted data strings $P_{11}$, $P_{12}$, $P_{13}$ ..., $P_{21}$, $P_{22}$, $P_{23}$ ..., $P_{31}$, $P_{32}$, $P_{33}$ .... The extracted data strings are $P_{111}$, $P_{112}$, $P_{113}$, $P_{121}$, $P_{122}$, $P_{123}$ ..., $P_{131}$, $P_{132}$, $P_{133}$ ..., $P_{211}$, $P_{212}$, $P_{213}$ ..., $P_{221}$, $P_{222}$, $P_{223}$ ..., $P_{231}$, $P_{232}$, $P_{233}$ ..., $P_{311}$, $P_{312}$, $P_{313}$ ..., $P_{321}$, $P_{322}$, $P_{323}$ ..., $P_{331}$, $P_{332}$, $P_{333}$ ... (see FIG. 1B). Then, data strings are extracted on the basis of the link-information data stored in the parent data storage areas of these extracted data strings $P_{111}$, $P_{112}$, $P_{113}$ .... This operation is conducted until the parent data storage areas of the extracted data strings are empty. The flow of the above operation will be referred to as "first retrieving pattern" for convenience' sake. In FIGS. 1A and 1B, symbols within ellipses stand for data strings, and numerals given to lines connecting the ellipses show the order of operation.

The above step (b) can be also conducted according to the flow of operation shown in FIG. 2 (to be referred to as "second retrieving pattern"). That is, data string $P_1$ is extracted on the basis of the link-information data stored in the parent data storage area of the data string $S_0$ storing the same data identification name as the inputted data identification name. FIG. 2 shows part of data strings.

Then, data strings are extracted on the basis of the link-information data stored in the parent data storage area of the data string P1 until the parent data storage area of the extracted data string is empty. That is, data string $P_{11}$, data string $P_{111}$ and data string $P_{1111}$ are consecutively extracted. Since the parent data storage area of the extracted data string $P_{1111}$ is empty, the operation returns to the data string $P_{111}$, and data string $P_{1112}$ is extracted on the basis of the link-information data stored in the next parent data storage area of the data string $P_{111}$. Since the parent data storage area of the extracted data string $P_{1112}$ is empty, the operation returns to the data string $P_{111}$, and data string $P_{1113}$ is extracted on the basis of the link-information data stored in the next parent data storage area of the data string $P_{111}$. Since the parent data storage area of the extracted data string $P_{1113}$ is empty, the operation returns to the data string $P_{111}$. Since, however, the next parent data storage area of the data string $P_{111}$ is empty, the operation returns to the data string $P_{11}$, and data string $P_{112}$, data string $P_{1121}$, data string $P_{1122}$ and data string $P_{1123}$ are consecutively extracted on the basis of the link-information data stored in the next parent data storage area of the data string $P_{11}$. The above procedures are consecutively conducted. And, if the link-information data stored in the parent data storage area of the data string $P_{11}$ is empty, data string is extracted on the basis of the link-information data stored in the next parent data storage area of the data string $P_1$. Further, if the link-information data stored in the parent data storage area of the data string $P_1$ is empty, data strings $P_2, P_3, \ldots$ are extracted on the basis of the link-information data stored in the next parent data storage area of the data string $S_0$. In FIG. 2, symbols within ellipses stand for data strings, and numerals given to lines connecting the ellipses show the order of operation.

The data retrieval method directed to the second aspect of the present invention for achieving the above first object of the present invention is concerned with a data retrieval method of extracting a data string, which corresponds to an element concept and/or an indirect element concept, for a data identification name to be retrieved. The terms "element concept" and "indirect element concept" will be explained in detail later. That is, the data retrieval method directed to the second aspect of the present invention is a data retrieval method in a data-string set including a plurality of data strings, each data string DS_1 having
(1) a data identification name storage area storing a data identification name,
(2) a data level storage area storing a data level value, and
(3) an element data storage area storing link-information data about a data string DS_0 storing a data identification name which is an element of a set indicated by the data identification name stored in the data string DS_1,
wherein:
(A) the data string DS_0 has a smaller data level value than the data string DS_1 has,
(B) the element data storage area of the data string DS_1 does not contain link-information data about the data string DS_1 itself, and the link-information data stored in the element data storage area of the data string DS_1 differ from one another, and
(C) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings,
the method comprising the steps of
(a) inputting a data identification name corresponding to data to be retrieved,
(b) extracting a data string on the basis of link-information data stored in an element data storage area of a data string whose data identification name storage area stores the same data identification name as the inputted data identification name, and further extracting a data string on the basis of link-information data stored in an element data storage area of the extracted data string until the element data storage area of the extracted data string is empty, and
(c) outputting the extracted data string.

In the data retrieval method directed to the second aspect of the present invention, as shown in FIG. 3A, in the step (b), data strings $E_1, E_2, E_3, \ldots$ are extracted on the basis of the link-information data stored in the element data storage area of the data string $S_0$ whose data identification name storage area stores the same data identification name as the inputted data identification name. Then, concerning the data strings $E_1, E_2, E_3, \ldots$, data strings are extracted on the basis of the link-information data stored in the element data storage areas of these extracted data strings $E_1, E_2, E_3, \ldots$. The extracted data strings are, for example, data strings $E_{11}, E_{12}, E_{13} \ldots, E_{21}, E_{22}, E_{23} \ldots, E_{31}, E_{32}, E_{33} \ldots$. FIGS. 3A and 3B show part of the data strings.

Then, data strings are extracted on the basis of the link-information data stored in the element data storage areas of all of the extracted data strings $E_{11}, E_{12}, E_{13} \ldots, E_{21}, E_{22}, E_{23} \ldots, E_{31}, E_{32}, E_{33} \ldots$. The extracted data strings are $E_{111}, E_{112}, E_{113} \ldots, E_{121}, E_{122}, E_{123} \ldots, E_{131}, E_{132}, E_{133} \ldots, E_{211}, E_{212}, E_{213} \ldots, E_{221}, E_{222}, E_{223} \ldots, E_{231}, E_{232}, E_{233} \ldots, E_{311}, E_{312}, E_{313} \ldots, E_{321}, E_{322}, E_{323} \ldots, E_{331}, E_{332}, E_{333} \ldots$ (see FIG. 3B). Then, data strings are extracted on the basis of the link-information data stored in the element data storage areas of these data strings $E_{111}, E_{112}, E_{113} \ldots$. This operation is conducted until the element data storage areas of the extracted data strings are empty. The flow of the above operation will be referred to as "third retrieving pattern" for convenience' sake. In FIGS. 3A and 3B, symbols within ellipses stand for data strings, and numerals given to lines connecting the ellipses show the order of operation.

The above step (b) can be also conducted according to the flow of operation shown in FIG. 4 (to be referred to as "fourth retrieving pattern"). That is, data string $E_1$ is extracted on the basis of the link-information data stored in the element data storage area of the data string $S_0$ storing the same data identification name as the inputted data identification name. FIG. 4 shows part of data strings.

Then, data strings are extracted on the basis of the link-information data stored in the element data storage area of the data string $E_1$ until the element data storage area of the extracted data string is empty. That is, data string $E_{11}$, data string $E_{111}$ and data string $E_{1111}$ are consecutively extracted. Since the element data storage area of the extracted data string $E_{1111}$ is empty, the operation returns to the data string $E_{111}$, and data string $E_{1112}$ is extracted on the basis of the link-information data stored in the next element data storage area of the data string $E_{111}$. Since the element data storage area of the extracted data string $E_{1112}$ is empty, the operation returns to the data string $E_{111}$, and data string $E_{1113}$ is extracted on the basis of the link-information data stored in the next element data storage area of the data string $E_{111}$. Since the element data storage area of the extracted data string $E_{1113}$ is empty, the operation returns to the data string $E_{111}$. Since, however, the next element data storage area of the data string $E_{111}$ is empty, the operation returns to the data string $E_{11}$. And, data string $E_{112}$, data string $E_{1121}$, data string $E_{1122}$ and data string $E_{1123}$ are consecutively extracted on the basis of the link-information data stored in the next element data storage area of the data string $E_{11}$. The above procedures are consecutively conducted. And, if the link-information data stored in the element data storage area of the data string $E_{11}$ is empty, data string is extracted on the basis of the link-information data stored in the next element data storage area of the data string $E_1$. Further, if the link-information data stored in the element data storage area of the data string $E_1$ is empty, data strings $E_2, E_3, \ldots$ are extracted on the basis of the link-information data stored in the next element data storage area of the data string $S_0$.

The data retrieval method directed to the third aspect of the present invention for achieving the above first object of the present invention is concerned with a data retrieval method of extracting at least one of a data string corresponding to a parent concept, a data string corresponding to an indirect parent concept, a data string corresponding to an element concept and a data string corresponding to an indirect an element concept. That is, the data retrieval method directed to the third aspect of the present invention is a data retrieval method in a data-string set including a plurality of data-strings, each data string DS__1 having
- (1) a data identification name storage area storing a data identification name,
- (2) a data level storage area storing a data level value,
- (3) a parent data storage area storing link-information data about a data string DS__2 storing a data identification name which indicates a set including the data identification name stored in the data string DS__1, and
- (4) an element data storage area storing link-information data about a data string DS__0 storing a data identification name which is an element of a set indicated by the data identification name stored in the data string DS__1, wherein:
- (A) the data string DS__2 has a larger data level value than the data string DS__1 has,
- (B) the parent data storage area of the data string DS__1 does not contain link-information data about the data string DS__1 itself, and the link-information data stored in the parent data storage area of the data string DS__1 differ from one another,
- (C) when data strings are consecutively traced on the basis of link-information data stored in parent data storage areas of data strings, with arbitrary link-information data stored in the parent data storage area of the data string DS__1 as a starting point, until the parent data storage area of the traced data string is empty, the link-information data about the data string DS__1 is included in none of the parent data storage areas of the traced data strings,
- (D) the data string DS__0 has a smaller data level value than the data string DS__1 has,
- (E) the element data storage area of the data string DS__1 does not contain link-information data about the data string DS__1 itself, and the link-information data stored in the element data storage area of the data string DS__1 differ from one another, and
- (F) when data strings are consecutively traced on the basis of link-information data stored in element data storage areas of data strings, with arbitrary link-information data stored in the element data storage area of the data string DS__1 as a starting point, until the element data storage area of the traced data string is empty, the link-information data about the data string DS__1 is included in none of the element data storage areas of the traced data strings, the method comprising the steps of
- (a) inputting a data identification name corresponding to data to be retrieved,
- (b) extracting a data string on the basis of link-information data stored in a parent data storage area of a data string whose data identification name storage area stores the same data identification name as the inputted data identification name, and further extracting a data string on the basis of link-information data stored in a parent data storage area of the extracted data string until the parent data storage area of the extracted data string is empty,
- (c) extracting a data string on the basis of link-information data stored in an element data storage area of the data string whose data identification name storage area stores the same data identification name as the inputted data identification name, and further extracting a data string on the basis of link-information data stored in an element data storage area of the extracted data string until the element data storage area of the extracted data string is empty, and
- (d) outputting the extracted data strings.

The flow of the data retrieval operation in the data retrieval method directed to the third aspect of the present invention can be conducted by properly combining the first retrieving pattern or the second retrieving pattern explained concerning the data retrieval method directed to the first aspect of the present invention with the third retrieving pattern or the fourth retrieving pattern explained concerning the data retrieval method directed to the second aspect of the present invention, and the detailed explanation thereof is omitted.

The data retrieval method directed to the fourth aspect of the present invention for achieving the above first object of the present invention is concerned with a data retrieval method of extracting a data string, which corresponds to an element concept and/or an indirect element concept and has a minimum data level value, for a data identification name to be retrieved, and then extracting a data string, which corresponds to a parent concept and/or an indirect parent concept, for the data identification name stored in the above-extracted data string. That is, the data retrieval method directed to the fourth aspect of the present invention comprises the steps of
- (a) inputting a data identification name corresponding to data to be retrieved,
- (b) extracting a data string on the basis of link-information data stored in an element data storage area of a data string whose data identification name storage area stores the same data identification name as the data identification name to be retrieved, and further extracting a data string on the basis of link-information data stored in an element data storage area of the extracted data string until the element data storage area of the extracted data string is empty,
- (c) extracting a data string on the basis of link-information data stored in the parent data storage area of the extracted data string whose element data storage area is empty, from among the data strings extracted in the step (b), and further extracting a data string on the basis of link-information data stored in a parent data storage area of the extracted data string until the parent data storage area of the extracted data string is empty, and
- (d) outputting the extracted data string.

In the data retrieval method directed to the fourth aspect of the present invention, the data-string set can be structurally the same as the data-string set in the data retrieval method directed to the above third aspect of the present invention.

In the data retrieval method directed to the fourth aspect of the present invention, the flow of the retrieval operation in the step (b) can be the third retrieving pattern or the fourth retrieving pattern explained concerning the data retrieval method directed to the second aspect of the present invention. Further, the flow of the retrieval operation in the step (c) can be the first retrieving pattern or the second retrieving pattern explained concerning the data retrieval method directed to the first aspect of the present invention. Therefore, the detailed explanation thereof are omitted.

The link-information adding method directed to the first aspect of the present invention for achieving the above second object of the present invention is concerned with a method of adding new link-information data to a parent data storage area of a data string DS_I. The new link-information is concerned with a data string DS_P corresponding to a parent concept for the data string DS_I. That is, the link-information adding method directed to the first aspect of the present invention is a link-information adding method of adding new link-information data to a parent data storage area of a data string DS_I in a data-string set consisting of a plurality of data strings, each data string DS_1 having
- (1) a data identification name storage area storing a data identification name,
- (2) a data level storage area storing a data level value, and
- (3) a parent data storage area storing link-information data about a data string DS_2 storing the data identification name which indicates a set including the data identification name stored in the data string DS_1, wherein:
- (A) the data string DS_2 has a greater data level value than the data string DS_1 has,
- (B) the parent data storage area of the data string DS_1 does not contain link-information data about the data string DS_1 itself, and the link-information data stored in the parent data storage area of the data string DS_1 differ from one another, and
- (C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings, the method comprising the steps of
- (a) inputting a data identification name and a parent concept name which indicates a set including the data identification name,
- (b) adding no link-information data when the inputted data identification name and the inputted parent concept name are in agreement with each other,
- (c) extracting a data string DS_I storing the inputted data identification name when the inputted data identification name and the inputted parent concept name are not in agreement with each other,
- (d) extracting a data string DS_P storing the data identification name which is in agreement with the inputted parent concept name,
- (e) adding no link-information data when the parent data storage area of the data string DS_I extracted in the step (c) has link-information data about the data string DS_P extracted in the step (d),
- (f) extracting a data string on the basis of link-information data stored in the parent data storage area of the data string DS_P extracted in the step (d) when the parent data storage area of the data string DS_I extracted in the step (c) has no link-information data about the data string DS_P extracted in the step (d), and further extracting a data string on the basis of the link-information data stored in the parent data storage area of the extracted data string until the parent data storage area of the extracted data string is empty,
- (g) adding no link-information data when any one of the data strings extracted in the step (f) is in agreement with the data string DS_I extracted in the step (c),
- (h) storing link-information data about the data string DS_P extracted in the step (d) to the parent data storage area of the data string DS_I extracted in the step (c) when none of the data strings extracted in the step (f) is in agreement with the data string DS_I extracted in the step (c), and
- (i) storing a value obtained by adding 1 to the data level value of the data string DS_I extracted in the step (c) in the data level storage area of the data string DS_P extracted in the step (d) when the data string DS_P extracted in the step (d) has a data level value equal to, or smaller than, the data level value of the data string DS_I extracted in the step (c).

In the link-information adding method directed to the first aspect of the present invention, the procedures of extracting data strings in the step (f) can be the same as the first retrieving pattern or the second retrieving pattern explained concerning the data retrieval method directed to the first aspect of the present invention.

The link-information adding method directed to the second aspect of the present invention for achieving the above second object of the present invention is concerned with a method of adding new link-information data to an element data storage area of a data string DS_I. The new link-information data is concerned with a data string DS_E corresponding to an element concept for the data string DS_I. That is, the link-information adding method directed to the second aspect of the present invention is a link-information adding method of adding new link-information data to an element data storage area of a data string DS_I in a data-string set consisting of a plurality of data strings, each data string DS_1 having
- (1) a data identification name storage area storing a data identification name,
- (2) a data level storage area storing a data level value, and
- (3) an element data storage area storing link-information data about a data string DS_0 storing a data identification name which is an element of a set indicated by the data identification name stored in the data string DS_1, wherein:
- (A) the data string DS_0 has a smaller data level value than the data string DS_1 has,
- (B) the element data storage area of the data string DS_1 does not contain link-information data about the data string DS_1 itself, and the link-information data stored in the element data storage area of the data strings DS_1 differ from one another, and (C) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings, the method comprising the steps of (a) inputting a data identification name and an element concept name which is an element of a set indicated by the data identification name, (b) adding no link-information data when the inputted data identification name and the inputted element concept name are in agreement with each other, (c) extracting a data string DS_I storing the inputted data identification name when the inputted data identification name and the inputted element concept name are not in agreement with each other, (d) extracting a data string DS_E storing the data identification name which is in agreement with the inputted element concept name, (e) adding no link-information data when the element data storage area of the data string DS_I extracted in the step (c) has link-information data about the data string DS_E extracted in the step (d), (f) extracting a data string on the basis of link-information data stored in the element data storage area of the data string DS_E extracted in the step (d) when the element data storage area of the data string DS_I extracted in the step (c) has no link-information data about the data string DS_E extracted in the step (d), and further extracting a data string on the basis of the link-information data stored in the element data storage area of the extracted data string until the element data storage area of the extracted data string is empty, (g) adding no link-information data when any one of the data strings extracted in the step (f) is in agreement with the data string DS_I extracted in the step (c), (h) storing link-information data about the data string DS_E extracted in the step (d) to the element data storage area of the data string DS_I extracted in the step (c) when none of the data strings extracted in the step (f) is in agreement with the data string DS_I extracted in the step (c), and (i) storing a value obtained by adding 1 to the data level value of the data string DS_E extracted in the step (d) in the data level storage area of the data string DS_I extracted in the step (c) when the data string DS_E extracted in the step (d) has a data level value equal to, or greater than, the data level value of the data string DS_I extracted in the step (c).

In the link-information adding method directed to the second aspect of the present invention, the procedures of extracting data strings in the step (f) can be the same as the third retrieving pattern or the fourth retrieving pattern explained concerning the data retrieval method directed to the second aspect of the present invention.

The link-information adding method directed to the third aspect of the present invention for achieving the above second object of the present invention is concerned with a method of adding new link-information data to a parent data storage area of a data string DS_I. The new link-information data is concerned with a data string DS_P corresponding to a parent concept for the data string DS_I. That is, the link-information adding method directed to the third aspect of the present invention is a link-information adding method of adding link-information data to a parent data storage area of a data string DS_I in a data-string set consisting of a plurality of data strings, each data string DS_1 having (1) a data identification name storage area storing a data identification name, (2) a data level storage area storing a data level value, (3) a parent data storage area storing link-information data about a data string DS_2 storing a data identification name which indicates a set including the data identification name stored in the data string DS_1, and (4) an element data storage area storing link-information data about a data string DS_0 storing a data identification name which is an element of a set indicated by the data identification name stored in the data string DS_1, wherein:

(A) the data string DS_2 has a greater data level value than the data string DS_1 has, (B) the parent data storage area of the data string DS_1 does not contain link-information data about the data string DS_1 itself, and the link-information data stored in the parent data storage area of the data string DS_1 differ from one another, (C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings, (D) the data string DS_0 has a smaller data level value than the data string DS_1 has, (E) the element data storage area of the data string DS_1 does not contain link-information data about the data string DS_1 itself, and the link-information data stored in the element data storage area of the data strings DS_1 differ from one another, and (F) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings, the method comprising the steps of (a) inputting a data identification name and a parent concept name which indicates a set including the data identification name, (b) adding no link-information data when the inputted data identification name and the inputted parent concept name are in agreement with each other, (c) extracting a data string DS_I storing the inputted data identification name when the inputted data identification name and the inputted parent concept name are not in agreement with each other, (d) extracting a data string DS_P storing the data identification name which is in agreement with the inputted parent concept name, (e) adding no link-information data when the parent data storage area of the data string DS_I extracted in the step (c) has link-information data about the data string DS_P extracted in the step (d), (f) extracting a data string on the basis of link-information data stored in the parent data storage area of the data string DS_P extracted in the step (d) when the parent data storage area of the data string DS_I extracted in the step (c) has no link-information data about the data string DS_P extracted in the step (d), and further extracting a data string on the basis of the link-information data stored in the parent data storage area of the extracted data string until the parent data storage area of the extracted data string is empty, (g) adding no link-information data when any one of the data strings extracted in the step (f) is in agreement with the data string extracted DS_I in the step (c), (h) storing link-information data about the data string DS_P extracted in the step (d) in the parent data storage area of the data string DS_I extracted in the step (c) when none of the data strings extracted in the step (f) is in agreement with the data string DS_I extracted in the step (c), (i) storing link-information data about the data string DS_I extracted in the step (c) in the element data storage area of the data string DS_P extracted in the step (d), and (j) storing a value obtained by adding 1 to the data level value of the data string DS_I extracted in the step (c) in the data level storage area of the data string DS_P extracted in the step (d) when the data string DS_P extracted in the step (d) has a data level value equal to, or smaller than, the data level value of the data string DS_I extracted in the step (c).

In the link-information adding method directed to the third aspect of the present invention, the procedures of extracting data strings in the step (f) can be the same as the first retrieving pattern or the second retrieving pattern explained concerning the data retrieval method directed to the first aspect of the present invention. In the steps (e) and (f), it is decided whether or not the parent data storage area of the data string DS_I extracted in the step (c) has the link-information data about the data string DS_P extracted in the step (d), which decision is equivalent to a decision on whether or not the element data storage area of the data string DS_P extracted in the step (d) has the link-information data about the data string DS_I extracted in the step (c).

In the above link-information adding method directed to the third aspect of the present invention, in the step (f), a data string is extracted on the basis of link-information data stored in the parent data storage area of the data string DS_P storing the inputted parent concept name. On the other hand, in the link-information adding method directed to the fourth aspect of the present invention to be explained below, in the step (f'), a data string is extracted on the basis of link-information data stored in the element data storage area of the data string DS_I storing an inputted data identification name.

That is, differing from the link-information adding method directed to the third aspect of the present invention comprising the above steps (e), (f), (g) and (h), the link-information adding method directed to the fourth aspect of the present invention for achieving the second object of the present invention comprises (e') adding no link-information data when the element data storage area of the data string DS_P extracted in the step (d) has link-information data about the data string DS_I extracted in the step (c), (f') extracting a data string on the basis of link-information data stored in the element data storage area of the data string DS_I extracted in the step (c) when the element data storage area of the data string DS_P extracted in the step (d) has no link-information data about the data string DS_I extracted in the step (c), and further extracting a data string on the basis of the link-information data stored in the element data storage area of the extracted data string until the element data storage area of the extracted data string is empty, (g') adding no link-information data when any one of the data strings extracted in the step (f') is in agreement with the data string DS_P extracted in the step (d) and (h') storing link-information data about the data string DS_P extracted in the step (d) in the parent data storage area of the data string DS_I extracted in the step (c) when none of the data strings extracted in the step (f') is in agreement with the data string DS_P extracted in the step (d).

In the link-information adding method directed to the fourth aspect of the present invention, the procedures of extracting a data string in the step (f') can be the same as the third retrieving pattern or the fourth retrieving pattern explained concerning the data retrieval method directed to the second aspect of the present invention. In the steps (e') and (f'), it is decided whether or not the element data storage area of the data string DS_P extracted in the step (d) has the link-information data about the data string DS_I extracted in the step (c), which decision is equivalent to a decision on whether or not the parent data storage area of the data string DS_I extracted in the step (c) has the link-information data about the data string DS_P extracted in the step (d).

In the above link-information adding methods directed to the third and fourth aspects of the present invention, a data identification name and a parent concept name indicating a set including the data identification name are inputted. On the other hand, in the following link-information adding methods directed to the fifth and sixth aspects of the present invention, a data identification name and an element concept name which is an element of a set indicated by the data identification name are inputted.

The link-information adding method directed to the fifth aspect of the present invention for achieving the above second object of the present invention is concerned with a link-information adding method of adding new link-information data to an element data storage area of a data string DS_I. The new link-information data is concerned with a data string DS_E corresponding to an element concept for the data string DS_I. That is, the link-information adding method directed to the fifth aspect of the present invention is a link-information adding method of adding new link-information data to an element data storage area of a data string DS_I in a data-string set consisting of a plurality of data strings, each data string DS_1 having
- (1) a data identification name storage area storing a data identification name,
- (2) a data level storage area storing a data level value,
- (3) a parent data storage area storing link-information data about a data string DS_2 storing the data identification name which indicates a set including the data identification name stored in the data string DS_1, and
- (4) an element data storage area storing link-information data about a data string DS_0 storing the data identification name which is an element of a set indicated by the data identification name stored in the data string DS_1, wherein:
- (A) the data string DS_2 has a greater data level value than the data string DS_1 has,
- (B) the parent data storage area of the data string DS_1 does not contain link-information data about the data string DS_1 itself, and the link-information data stored in the parent data storage area of the data string DS_1 differ from one another,
- (C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings,
- (D) the data string DS_0 has a smaller data level value than the data string DS_1 has,
- (E) the element data storage area of the data string DS_1 does not contain link-information data about the data string DS_1 itself, and the link-information data stored in the element data storage area of the data string DS_1 differ from one another, and
- (F) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings, the method comprising the steps of
- (a) inputting a data identification name and an element concept name which is an element of a set indicated by the data identification name,
- (b) adding no link-information data when the inputted data identification name and the inputted element concept name are in agreement with each other,
- (c) extracting a data string DS_I storing the inputted data identification name when the inputted data identification name and the inputted element concept name are not in agreement with each other,
- (d) extracting a data string DS_E storing the data identification name which is in agreement with the inputted element concept name,
- (e) adding no link-information data when the element data storage area of the data string DS_I extracted in the step (c) has link-information data about the data string DS_E extracted in the step (d),
- (f) extracting a data string on the basis of link-information data stored in the parent data storage area of the data string DS_I extracted in the step (c) when the element data storage area of the data string DS_I extracted in the step (c) has no link-information data about the data string DS_E extracted in the step (d), and further extracting a data string on the basis of the link-information data stored in the parent data storage area of the extracted data string until the parent data storage area of the extracted data string is empty,
- (g) adding no link-information data when any one of the data strings extracted in the step (f) is in agreement with the data string DS_E extracted in the step (d),
- (h) storing link-information data about the data string DS_E extracted in the step (d) in the element data storage area of the data string DS_I extracted in the step (c) when none of the data strings extracted in the step (f) is in agreement with the data string DS_E extracted in the step (d),
- (i) storing link-information data about the data string DS_I extracted in the step (c) in the parent data storage area of the data string DS_E extracted in the step (d), and
- (j) storing a value obtained by adding 1 to the data level value of the data string DS_E extracted in the step (d) in the data level storage area of the data string DS_I extracted in the step (c) when the data string DS_E extracted in the step (d) has a data level value equal to, or greater than, the data level value of the data string DS_I extracted in the step (c).

In the link-information adding method directed to the fifth aspect of the present invention, the procedures of extracting data strings in the step (f) can be the same as the first retrieving pattern or the second retrieving pattern explained concerning the data retrieval method directed to the first aspect of the present invention. In the steps (e) and (f), it is decided whether or not the element data storage area of the data string DS_I extracted in the step (c) has the link-information data about the data string DS_E extracted in the step (d), which decision is equivalent to a decision on whether or not the parent data storage area of the data string DS_E extracted in the step (d) has the link-information data about the data string DS_I extracted in the step (c).

In the above link-information adding method directed to the fifth aspect of the present invention, in the step (f), a data string is extracted on the basis of link-information data stored in the parent data storage area of the data string DS_I storing the inputted data identification name. On the other hand, in the link-information adding method directed to the sixth aspect of the present invention to be explained below, in the step (f'), a data string is extracted on the basis of link-information data stored in the element data storage area of the data string DS__E storing the inputted element concept name.

That is, differing from the link-information adding method directed to the fifth aspect of the present invention comprising the above steps (e), (f), (g) and (h), the link-information adding method directed to the sixth aspect of the present invention for achieving the second object of the present invention comprises (e') adding no link-information data when the parent data storage area of the data string DS__E extracted in the step (d) has link-information data about the data string DS__I extracted in the step (c), (f') extracting a data string on the basis of link-information data stored in the element data storage area of the data string DS__E extracted in the step (d) when the parent data storage area of the data string DS__E extracted in the step (d) has no link-information data about the data string DS__I extracted in the step (c), and further extracting a data string on the basis of link-information data stored in the element data storage area of the extracted data string until the element data storage area of the extracted data string is empty, (g') adding no link-information data when any one of the data strings extracted in the step (f') is in agreement with the data string DS__I extracted in the step (c), and (h') storing link-information data about the data string DS__E extracted in the step (d) in the element data storage area of the data string DS__I extracted in the step (c) when none of the data strings extracted in the step (f') is in agreement with the data string DS__I extracted in the step (c).

In the link-information adding method directed to the sixth aspect of the present invention, the data-string set can be structurally the same as the data-string set in the above link-information adding method directed to the fifth aspect of the present invention.

In the link-information adding method directed to the sixth aspect of the present invention, the procedures of extracting data strings in the step (f') can be the same as the third retrieving pattern or the fourth retrieving pattern explained concerning the data retrieval method directed to the second aspect of the present invention. In the steps (e') and (f'), it is decided whether or not the parent data storage area of the data string DS__E extracted in the step (d) has the link-information data about the data string DS__I extracted in the step (c), which decision is equivalent to a decision on whether or not the element data storage area of the data string DS__I extracted in the step (c) has the link-information data about the data string DS__E extracted in the step (d).

In the data retrieval method or the link-information adding method of the present invention, the parent data storage area (or the element data storage area) of the data string DS__1 contains no link-information data about the data string DS__1 itself, and the link-information data stored in the parent data storage area (or the element data storage area) of the data string DS__1 differ from one another. Further, when data strings are consecutively traced on the basis of link-information data stored in parent data storage areas (or element data storage areas) of data strings, with arbitrary link-information data stored in the parent data storage area (or the element data storage area) of the data string DS__1 as a starting point, until the parent data storage area (or the element data storage area) of the traced data string is empty, the link-information data about the data string DS__1 is included in none of the parent data storage areas (or element data storage areas) of the traced data strings. Therefore, not only the possibility of falling into an endless loop can be completely prevented, but also the circulating definition to be described later can be completely excluded.

In the data retrieval method of the present invention, further, a data string is extracted on the basis of the link-information data stored in the parent data storage area (or the element data storage area) of the data string whose data identification name storage area stores the inputted data identification name, and a data string is extracted on the basis of the link-information data stored in the parent data storage area (or the element data storage area) of the extracted data string until the parent data storage area (or the element data storage area) of the extracted data string is empty. Therefore, not only the data string corresponding to a parent concept (or an element concept) but also the data string corresponding to an indirect parent concept (or an indirect element concept) can be extracted. Unlike prior art, it is no longer necessary to store an element name in a plurality of element fields repeatedly.

In the link-information adding method of the present invention, in the step (f) or (f'), a data string is extracted and it is decided whether or not the extracted data string stores the link-information data about the data string storing the inputted parent concept name (or the inputted element concept name). As a result, when link-information data is added, the possibility of falling into an endless loop in the retrieval can be completely prevented, and the circulating definition to be described later can be completely excluded.

BRIEF DESCRIPTION OF THE DRAWINGS

The present invention will be explained in detail with reference to drawings hereinafter.

FIGS. 5A and 5B schematically show the structure of a data string of each level and the structure of a first level data string in Example 1.

FIGS. 6A and 6B schematically show the structures of second and third level data strings in Example 1.

FIGS. 7A and 7B schematically show the structures of second and third level data strings in Example 1.

FIGS. 19A and 19B schematically show the structure of a data string of each level and the structure of a first level data string in Example 5.

FIGS. 20A and 20B schematically show the structures of second and third level data strings in Example 5.

FIGS. 21A and 21B schematically show the structures of second and third level data strings in Example 5.

FIG. 27 schematically shows the structure of a data string of each level in Example 8.

FIG. 28 schematically shows the structure of a first level data string in Example 8.

FIG. 29 schematically shows the structure of a second level data string in Example 8.

FIG. 30 schematically shows the structure of a third level data string in Example 8.

FIG. 31 schematically shows the structure of a second level data string in Example 8.

FIG. 32 schematically shows the structure of a third level data string in Example 8.

FIG. 33 schematically shows another example of the structure of a data string of each level in the present invention.

DESCRIPTION OF THE PREFERRED EMBODIMENTS

Figure 1A:
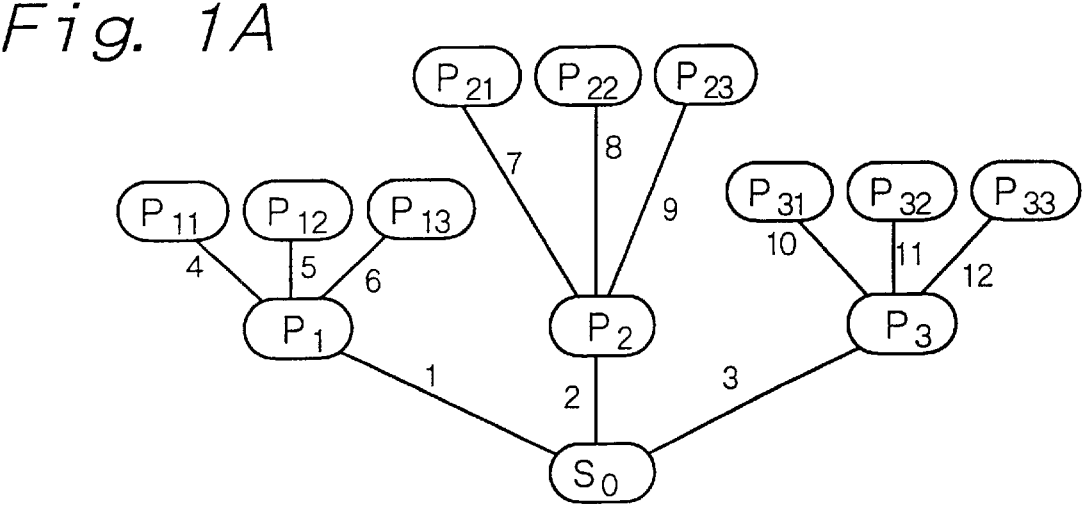
FIGS. 1A and 1B schematically show the first retrieving pattern in the data retrieval method directed to the first aspect of the present invention.

The present invention will be explained with reference to Examples hereinafter. First, the background of the data retrieval method and the link-information adding method of the present invention will be explained first, followed by the explanation of specific examples of the data retrieval method and the link-information adding method of the present invention.

In the data structure shown in Table 1, for example, element name "COMBUSTIBILITY" is stored in record "PENCIL" and record "WOOD", and "WOOD" is stored in the element field of record "DESK". Therefore, if not only record "PENCIL" and record "WOOD" are extracted but also record "DESK" containing "WOOD" in its element field can be extracted when the record containing element name "COMBUSTIBILITY" in its element field is retrieved, it is not necessary to store element name "COMBUSTIBILITY" in the element field of record "DESK".

Further, element name "CONDUCTIBILITY", element name "SOFTNESS" and element name "BLACK COLOR" are stored in the element fields of record "PENCIL" and record "BRUSH OF MOTOR". All of these element names are stored in record "GRAPHITE". Therefore, if element name "GRAPHITE" is stored in the element fields of record "PENCIL" and record "BRUSH OF MOTOR", and if not only record "GRAPHITE" but also record "PENCIL" and record "BRUSH OF MOTOR" can be extracted when the record having the element field containing any one (e.g., element name "BLACK COLOR") of the element names stored in "GRAPHITE" is retrieved, element name "CONDUCTIBILITY", element name "SOFTNESS" and element name "BLACK COLOR" can be deleted from the element fields of record "PENCIL" and record "BRUSH OF MOTOR". In other words, it is not necessary to store element name "CONDUCTIBILITY", element name "SOFTNESS" and element name "BLACK COLOR" in the element fields of record "PENCIL" and record "BRUSH OF MOTOR".

Similarly, the element fields of record "PENCIL" store element name "INSULATOR" and element name "COMBUSTIBILITY", and these element names are also contained in record "WOOD". Therefore, when the record having the element field containing any one (e.g., element name "COMBUSTIBILITY") of the element names stored in record "WOOD" is retrieved and if the record "PENCIL" having the element field containing "WOOD" can be extracted as well, element name "COMBUSTIBILITY" can be deleted from the element field of record "PENCIL". Further, it is no longer necessary to store element names constituting record "WOOD" such as element name "INSULATOR", element name "PLANT" and element name "SPECIFIC GRAVITY OF 1 OR LESS" in the element fields of record "DESK" and record "PENCIL".

If it is no longer necessary to store one element name in a plurality of element fields repeatedly as explained above, it is made more effective to input data. Further, concepts can be grouped into various levels such as lower concepts, intermediate concepts and higher concepts. Table 2 shows data strings which are simplified as explained above.

The background of the data retrieval method and the link-information adding method of the present invention will be explained first with reference to Table 2. Concepts shown in Table 2 are interpreted most simply below. That is, concept "DESK" is a set including elements {WOOD, OFFICE SUPPLIES, FURNITURE}. Concept "PENCIL" is a set including elements {WOOD, GRAPHITE, OFFICE SUPPLIES, WRITING TOOLS, CYLINDRICAL FORM}. Concept "WOOD" is a set including elements {INSULATOR, COMBUSTIBILITY, PLANT, SPECIFIC GRAVITY OF 1 OR LESS}. Concept "GRAPHITE" is a set including elements {CONDUCTIBILITY, SOFTNESS, BLACK COLOR}. Concept "MICA" is a set including element {INSULATOR}. Concept "BRUSH OF MOTOR" is a set including element {GRAPHITE}.

Originally, a concept is established by defining it by some qualities. A concept can be therefore identified by enumerating qualities defining the concept. A "set" in terms of mathematics can be determined by enumerating elements included in the set. A set is therefore suitable as a model of a concept. A set can contain another set as an element. That is, concept "PENCIL" contains, as elements, concept "WOOD" and concept "GRAPHITE". A set type database which allows the construction of concepts on the basis of a set will be explained below.

Definitions of Concept, Element Set and Element Concept

First, some terms to be used hereinafter will be defined bellow, and various rules will be also

TABLE 2

| Record No. | Concept Field | Element Field | | | | |
|---|---|---|---|---|---|---|
| | | A | B | C | D | E |
| 1 | desk | wood | office supplies | furniture | | |
| 2 | pencil | wood | graphite | office supplies | writing tools | cylindrical form |
| 3 | wood | insulator | combustibility | plant | specific gravity of 1 or less | |
| 4 | graphite | conductibility | softness | black color | | |
| 5 | mica | insulator | | | | |
| 6 | brush of motor | graphite | | | | | explained bellow. To begin with, concept "A" will be defined/expressed as follows.

Concept Name A {Element Concept Name X, Element Concept Name Y, Element Concept Name Z, . . . } in which "Concept Name A" is name of concept "A", and Element Concept Names X, Y, Z, . . . are names of concepts which are elements constituting concept "A". {Element Concept Name X, Element Concept Name Y, Element Concept Name Z, . . . } will be called an element set. On the other hand, there is a concept having no element concept name. A concept of this type means that an element set is an empty set. Element concept name is constituted of a concept having the same concept name. This concept will be called an element concept.

For example, concept "DESK" can be expressed as

DESK {WOOD, OFFICE SUPPLIES, FURNITURE} in which "DESK" is a concept name, and "WOOD", "OFFICE SUPPLIES" and "FURNITURE" are element concept names. Further, {WOOD, OFFICE SUPPLIES, FURNITURE} is an element set. Further, element concept names "WOOD", "OFFICE SUPPLIES" and "FURNITURE" are constituted of concepts "WOOD", "OFFICE SUPPLIES" and "FURNITURE" having the same concept names "WOOD", "OFFICE SUPPLIES" and "FURNITURE". Concepts "WOOD", "OFFICE SUPPLIES" and "FURNITURE" are elements of concept "DESK". Further, concept "WOOD" can be also expressed as follows.

WOOD {INSULATOR, COMBUSTIBILITY, PLANT, SPECIFIC GRAVITY OF 1 OR LESS}

On the other hand, concept "OFFICE SUPPLIES" and concept "FURNITURE" are concepts having no element concept name. That is, its element set is an empty set. These concepts can be therefore expressed as follows.

OFFICE SUPPLIES { }
FURNITURE { }

Definitions of Parent Concept and Parent Set

When concept "a" is an element concept of concept "A", concept "A" will be called a parent concept of concept "a", and expressed as follows.

$A \ni_\theta a$

A set consisting of all of parent concepts of concept "a" will be called a parent concept set of concept "a".

For example, concept "WOOD" is an element concept of concept "DESK", and concept "DESK" is a parent concept of concept "WOOD". Further, concept "WOOD" is an element concept of concept "PENCIL", and concept "PENCIL" is a parent concept of concept "WOOD". Further, a set consisting of all of parent concepts (concept "DESK" and concept "PENCIL") of concept "WOOD" is a parent concept set of concept "WOOD". The relationship among concept "WOOD", concept "DESK" and concept "PENCIL" are expressed as follows.

concept "WOOD" $\epsilon_\theta$ concept "DESK"

concept "WOOD" $\epsilon_\theta$ concept "PENCIL"

Definitions of Indirect Parent Concept and Indirect Element Concept

When concept "A" is an element concept of concept "B" ($B \ni_\theta A$) and when concept "B" is an element of concept "C" concept ($C \ni_\theta B$), concept "C" is called an indirect parent concept of concept "A", and this relationship is expressed as follows. On the other hand, concept "A" is called an indirect element concept of concept "C".

$C \ni_i A$

Or, when $B \ni_\theta A$ and $D \ni_i B$, concept "D" is also an indirect parent concept of concept "A", and this relationship is expressed as $D \ni_i A$. On the other hand, concept "A" is called an indirect element concept of concept "D". Further, when $B \ni_i A$ and $C \ni_i B$, concept "C" is an indirect parent concept of concept "A", and this relationship is expressed as $C \ni_i A$. The relationship between concept "INSULATOR" and concept "DESK" can be expressed as follows.

concept "DESK" $\ni_i$ concept "INSULATOR"

Concept Level

For example, concept "Insulator" has no element set. That is, its element set is an empty set.

INSULATOR { }

A concept of which the element set is an empty set as above is called a first level concept, and the name of this first level concept is called a first level concept name. For example, concept "INSULATOR", "COMBUSTIBILITY", "PLANT" and "SPECIFIC GRAVITY OF 1 OR LESS" which are element concepts of concept "WOOD" are first level concepts having no qualities by which to define themselves, i.e., having no internal relativity.

Further, second level concept, third level concept, . . . , n-th level concept are expressed as follows.

second level concept: concept whose element concept consists of first level concept(s).

third level concept: concept whose element concept has a maximum level of 2 and which has at least one second level concept as an element concept.

n-th level concept: concept whose element concept has a maximum level of (n−1) and which has at least one (n−1)th level concept as an element concept.

For example, concept "WOOD", concept "GRAPHITE" and concept "MICA" are second level concepts, and concept "DESK" and concept "PENCIL" are third level concepts.

Further, names of second level concept, third level concept, . . . , n-th level concept are called a second level concept name, a third level concept name, . . . , an n-th level concept name.

Change in Concept Level

A concept level may change when an element concept is deleted or added. That is, when all of (n−1)th level concepts are deleted from the element set of an n-th level concept, the concept level changes to the concept at a level which is obtained by adding 1 to the maximum level of the element concepts of the element set remaining after the deletion. For example, when element concept "WOOD" is deleted from concept "DESK", concept "DESK" changes from a third level concept to a second level concept. On the other hand, when an n-th level or higher level concept as an element concept is added to an n-th level concept, the concept level changes to a level obtained by adding 1 to the maximum level of the element concepts in a new element set.

While an element set does not change, the level of a parent concept or an indirect parent concept may change if the level of the element concept changes. For example, concept "PLANT" is a first level concept. If a first level concept such as "ORGANISM" or "CONSTITUTION FROM CELLS" is included as an element concept, concept "PLANT" changes to a second level concept. As a result, although element concepts constituting concept "WOOD" do not change at all, concept "WOOD" which is a parent concept of concept "PLANT" changes from a second level concept to a third level concept. Accordingly, concept "DESK" and concept "PENCIL" which are indirect parent concepts of concept "PLANT" change from a third level concepts to a 4th level concepts.

Prohibition of Duplication of Concept Name

A concept name is an identifier of a concept, and a concept name must not be duplicated. Even if concept "X" and concept "Y" have an identical element concept(s) or an identical element set, concept name "X" and concept name "Y" have to be different.

Construction Rules of Concept

When concept "a" and concept "A" satisfy the following relationship, concept "a" can be an element concept of concept "A".

Rule (1): concept "a" is not an element concept of concept "A".

Rule (2): concept "a" differs from concept "A".

Rule (3): concept "a" is neither an indirect parent concept of concept "A" nor a parent concept thereof.

Rule (1) is given to avoid a useless operation. Even if a plurality of identical concepts are added to an element set, no change takes place in the concept. Rules (2) and (3) are given for excluding a circulating definition. Rule (2) can exclude, e.g., the circulating definition of

DESK {DESK, WOOD, OFFICE SUPPLIES, FURNITURE}.

Further, when the following concepts and elements are present,

A {B}, B {A}, C {A} concept "A" is indirectly defined to have a circulating definition if Rule (3) is not given.

Rule (3) may be replaced with the following rule.

Rule (3'): concept "A" is neither an indirect element concept of concept "a" nor an element concept thereof.

Fundamental Procedure

In the set type database for constructing concepts on the basis of sets, the following four fundamental procedures are allowed.

(1) Formation of a new data string.

(2) Addition of new link-information data to a predetermined area of a data string.

(3) Deletion of link-information data from a predetermined area of a data string.

(4) Removal of a data string.

The data retrieval method and the link-information adding method of the present invention will be explained with reference to specific examples hereinafter. Examples 1 to 3 and Example 14 are concerned with the data retrieval method directed to the first aspect of the present invention. Examples 4 and 15 are concerned with the link-information adding method directed to the first aspect of the present invention. Examples 5 and 6 are concerned with the data retrieval method directed to the second aspect of the present invention. Example 7 is concerned with the link-information adding method directed to the second aspect of the present invention. Example 8 is concerned with the data retrieval method directed to the third aspect of the present invention. Examples 9 and 14 are concerned with data retrieval method directed to the fourth aspect of the present invention. Example 10 is concerned with the link-information adding method directed to the third aspect of the present invention. Example 11 is concerned with the link-information adding method directed to the fourth aspect of the present invention. Example 12 is concerned with the link-information adding method directed to the fifth aspect of the present invention. Example 13 is concerned with the link-information adding method directed to the sixth aspect of the present invention.

EXAMPLE 1

Example 1 is concerned with the data retrieval method directed to the first aspect of the present invention. In Example 1, for a data identification name to be retrieved, a data string corresponding to a parent concept and/or an indirect parent concept is extracted.

FIG. 5A shows the structure of a data string in Example 1. A data string is composed of a data identification name storage area [Name] in which a data identification name is stored, a data level storage area [Level_value] in which a data level value is stored, and a parent data storage area [Parent]. Further, the data string has an identification number storage area [ID] in which an identification number for identifying the data string is stored. The identification number is a number characteristic of an individual data string.

A maximum out of data level values stored in the data strings in the data structure will be simply called the maximum data level value, and a data string whose data level storage area [Level_value] stores the maximum data level value will be called n-th level data string. A data string whose data level storage area [Level_value] stores a value of 1 will be called a first level data string. A data string whose data level storage area [Level_value] stores a value of L (1<L<N) will be called L-th level data string. Further, data identification names stored in the data identification name storage areas of an n-th level data string, an L-th level data string and a first level data string will be called an N-th level data identification name, an L-th level data identification name and a first level data identification name, respectively. A data identification name corresponds to the above-explained concept name.

In the data structure in Example 1, a value of 1, 2 or 3 is stored in the data level storage area [Level_value] of each data string. That is, the data structure in Example 1 is constituted of a plurality of first level data strings, a plurality of second level data strings and a plurality of third level data strings.

An N-th level data identification name is a name of a set consisting of at least one (N−1)th level data identification name, or an N-th level data identification name is a name of a set consisting of one (N−1)th level data identification name and further consisting of at least one L'-th level data identification name (in which L'=1, 2, . . . , N−1). An L-th level data identification name is a name of a set consisting of at least one (L−1)th level data identification name, or an L-th level data identification name is a name of a set consisting of one (L−1)th level data identification name and further consisting of at least one L"-th level data identification name (in which L"=1, 2, . . . , L−1). Each data identification name is stored in the data identification name storage area [Name] of each data string.

The parent data storage area [Parent] of each data string DS_1 stores link-information data about a data string DS_2 storing a data identification name which indicates a set including the data identification name stored in the data string DS_1. The parent data storage area [Parent] is composed of a plurality of parent identification number storage areas [Parent_ID]. Further, the data level value of the data string DS_2 corresponding to the link-information data stored in the parent data storage area [Parent] of the data string DS_1 is greater than the data level value of the data string DS_1.

When there is an M'-th level data identification name (M'=M+1, M+2, . . . , N) which indicates a set including an M-th level data identification name (1≦M<M'), the link-information data about the M'-th level data string DS_2 storing the M'-th level data identification name is stored in the parent data storage area [Parent] of the M-th level data string DS_1 which stores the M-th level data identification name. Specifically, the identification number of the M'-th level data string DS_2 is stored in the parent data storage area [Parent] of the M-th level data string DS_1. The identification number of M'-th level data string DS_2 stored in the parent identification number storage area [Parent_ID] of the parent data storage area [Parent] in the M-th level data string DS_1 is link-information data in Example 1.

When the M-th level data string DS_1 is taken as standard, the M'-th level data string DS_2 corresponds to a parent concept. The data identification name stored in the M'-th level data string DS_2 corresponds to the above-explained parent concept name. On the other hand, when the M'-th level data string DS_2 is taken as standard, the M-th level data string DS_1 corresponds to an element concept. Further, when the data identification name stored in the M'-th level data string DS_2 is taken as standard, the data identification name stored in the M-th level data string DS_1 corresponds to an element concept name. Further, the data identification name(s) of M'-th level data string(s) DS_2 corresponding to the link-information data stored in the parent identification number storage area [Parent_ID] of the parent data storage area in the M-th level data string DS_1 corresponds to a parent concept set.

Table 3 shows examples of data identification names corresponding to concept names and data level values thereof, and data identification names corresponding to element concept names and data level values thereof in the data structure in Example 1.

FIG. 5B shows a data string structure of a first level data string indicated by ID number 5 in Table 3. The data identification name in the first level data string is "INSULATOR", and this data identification name is stored in the data identification name storage area [Name] of the data string. Further, the data level storage area [Level_value] stores "1" which indicates that the data string is a first level data string.

Further, since there are M'-th level data identification names (in this case M'=2 or 3) (specifically, second level data identification names "WOOD" and "MICA") which indicate a set including the first (=M) level data identification name "INSULATOR", identification numbers 12 and 14 of the M'-th level data strings storing these M'-th level data identification names are stored in the parent identification number storage areas [Parent_ID] of the parent data storage area [Parent] in the first level data string indicated

TABLE 3

| ID No. | Concept Name Recorded in Data String | | | Element Concept Name | |
|---|---|---|---|---|---|
| | 3rd level | 2nd level | 1st level | 2nd level | 1st level |
| 1 | | | office supplies | | |
| 2 | | | furniture | | |
| 3 | | | writing tools | | |
| 4 | | | cylindrical form | | |
| 5 | | | insulator | | |
| 6 | | | combusti-bility | | |
| 7 | | | plant specific | | |
| 8 | | | gravity of 1 or less | | |
| 9 | | | conducti-bility | | |
| 10 | | | softness | | |
| 11 | | | black color | | |
| 12 | | wood | | | insulator combusti-bility plant specific gravity of 1 or less |
| 13 | | graphite | | | conducti-bility softness black color |
| 14 | | mica | | | insulator |
| 15 | desk | | | wood | office supplies furniture |
| 16 | pencil | | | wood graphite | office supplies writing tools cylindrical form |
| 17 | brush of motor | | | graphite | | by ID number 5, as link-information data. ID numbers 1 to 4 and 6 to 11 which are first level data strings also have the same structure. Some M-th level data strings have no M'-th level data identification name which indicates a set including the M-th level data identification name. In this case, nothing is stored in the parent identification number storage area [Parent_ID] of the parent data storage area [Parent] in the M-th level data string.

FIG. 6A shows a data string structure of a second (M=2) level data string indicated by ID number 12 in Table 3. The data identification name which is a second level data identification name in the second level data string is "WOOD", and the data identification name is stored in the data identification name storage area [Name] of the data string. Further, the data level storage area [Level_value] stores "2" which indicates that the data string is a second level data string.

Further, since there are M'-th level data identification names (in this case M'=3) (specifically, third level data identification names "DESK" and "PENCIL") which indicate a set including the second level data identification name "WOOD", identification numbers 15 and 16 of the M'-th level data strings storing these M'-th level data identification names are stored in the parent identification number storage areas [Parent_ID] of the parent data storage area [Parent] in the second level data string indicated by ID number 12, as link-information data.

ID numbers 13 and 14 which are second level data strings have the same structure.

FIG. 6B shows a data string structure of a third (=N) level data string indicated by ID number 15 in Table 3. The data identification name in this third level data string is "DESK", and the data identification name is stored in data identification name storage area [Name] of the data string. Further, the data level storage area [Level_value] stores "3" which indicates that the data string is a third level data string. In Example 1, the maximum data level value (N) is 3, and therefore, nothing is stored in the parent identification number storage area [Parent_ID] of the parent data storage area [Parent] in the third level data string. ID numbers 16 and 17 which are third level data strings also have the same structure.

FIGS. 7A and 7B show data string structures of a third level data string and a second level data string indicated by ID numbers 16 and 14, respectively.

For excluding a circulating definition, the parent data storage area [Parent] of the data string DS_1 does not contain any link-information data (e.g., identification number) about the data string DS_1 itself. Further, the link-information data stored in the parent data storage area [Parent] of the data string DS_1 differ from one another. These correspond to Rules (1) and (2) explained in "Construction Rule of Concept".

Further, when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings. This corresponds to Rule (3) in the above-explained "Construction Rule of Concept".

For example, if it is assumed that ID number 12 which is link-information data stored in the parent identification number storage area [Parent_ID] of the parent data storage area [Parent] of the first level data string DS_1 indicated by ID number 5 is arbitrary link-information data, data strings are consecutively traced on the basis of the link-information data stored in the parent data storage areas of the data strings with the above link-information data (ID number 12) as a starting point. That is, the operation reaches the data string of ID number 15 on the basis of ID number 15 which is link-information data stored in the parent identification number storage area [Parent_ID] of the parent data storage area [Parent] in the data string of ID number 12. The parent identification number storage area [Parent_ID] of the parent data storage area [Parent] in the data string of ID number 15 is empty. Therefore, the operation then reaches the data string of ID number 16 on the basis of ID number 16 which is link-information data stored in the next parent identification number storage area [Parent_ID] of the parent data storage area [Parent] in the data string of ID number 12. The parent identification number storage area [Parent_ID] of the parent data storage area [Parent] in the data string of ID number 16 is empty. Therefore, link-information data stored in the next parent identification number storage area [Parent_ID] of the parent data storage area [Parent] in the data string of ID number 12 is traced. This parent identification number storage area [Parent_ID] is empty. In this operation, ID number 5 which is the link-information data about the data string DS_1 is included in none of the parent data storage areas of the traced data strings (data strings of ID numbers 12, 15 and 16).

When the first level data string indicated by ID number 5 is taken as standard, the second level data string of ID number 12 corresponds to a parent concept, and further, the third level data string of ID number 15 corresponds to an indirect parent concept. On the other hand, when the third level data string indicated by ID number 15 is taken as standard, the second level data string of ID number 12 corresponds to an element concept, and further, the first level data string of ID number 5 corresponds to an indirect parent concept.

Figure 34:
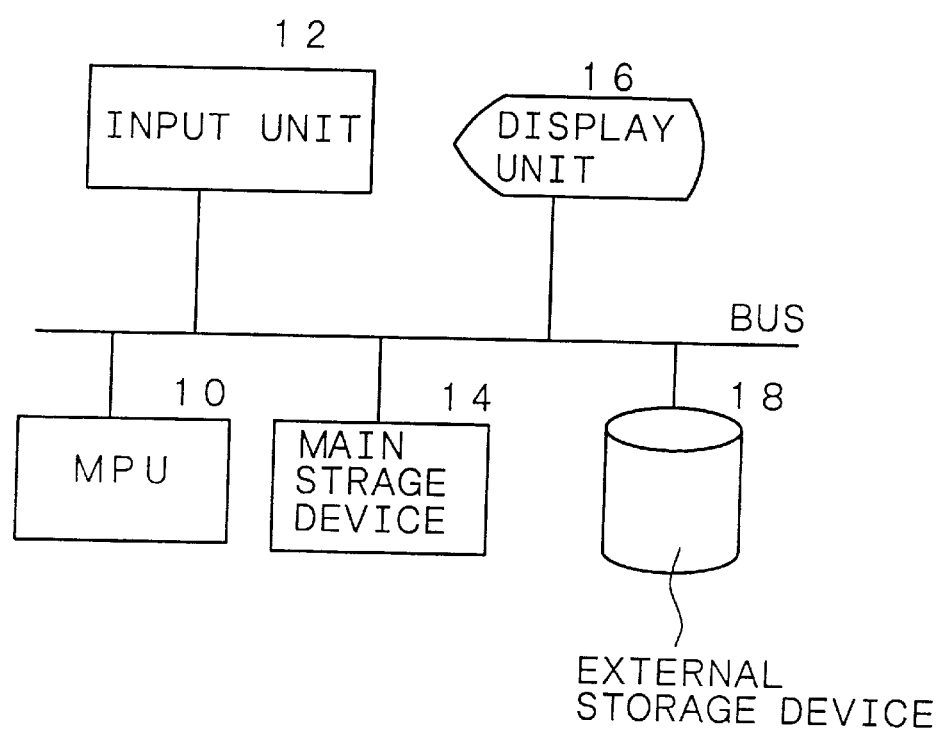
FIG. 34 schematically shows an apparatus suitable for working the data retrieval method of the present invention.

FIG. 34 schematically shows an apparatus suitable for working the data retrieval method or the link-information adding method of the present invention. The apparatus is constituted of a processing unit, an input unit 12, a display unit 16, a main storage device 14 and an external storage device 18 such as a hard disc drive. The processing unit contains, for example, a microprocessor unit 10 (to be abbreviated as MPU 10 hereinafter). The input unit 12 contains, for example, a pointing device (mouse) and a keyboard. The display unit 16 contains a cathode ray tube (CRT) and displays various data. The main storage device 14 contains, for example, a random access memory (RAM) and stores programs and various data to be processed by MPU 10 and data strings. The external storage device 18 stores a data structure which is the object of the data retrieval method or the link-information adding method of the present invention. The data structure may have any file form.

Figure 1B:
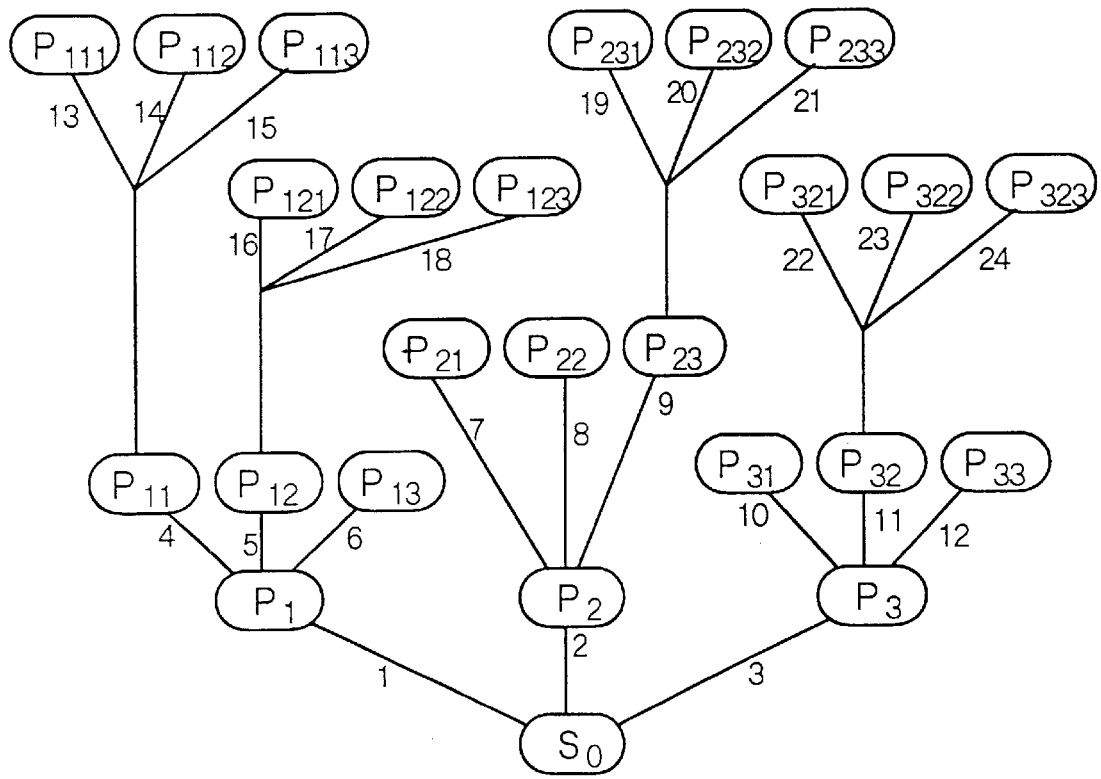

In the data retrieval method in Example 1, first, a data identification name corresponding to data to be retrieved is inputted. Then, a data string is extracted on the basis of link-information data stored in the parent data storage area of the data string (to be sometimes called "inputted data string") whose data identification name storage area stores the inputted data identification name. Further, a data string is extracted on the basis of link-information data stored in the parent data storage area of the extracted data string until the parent data storage area of the extracted data string is empty. Then, the extracted data strings are outputted. The retrieval pattern of the data retrieval method in Example 1 is the first retrieving pattern shown in FIGS. 1A and 1B.

The data retrieval method in Example 1 will be explained with reference to flow charts of FIG. 8 and FIG. 9 hereinafter.

Figure 8:
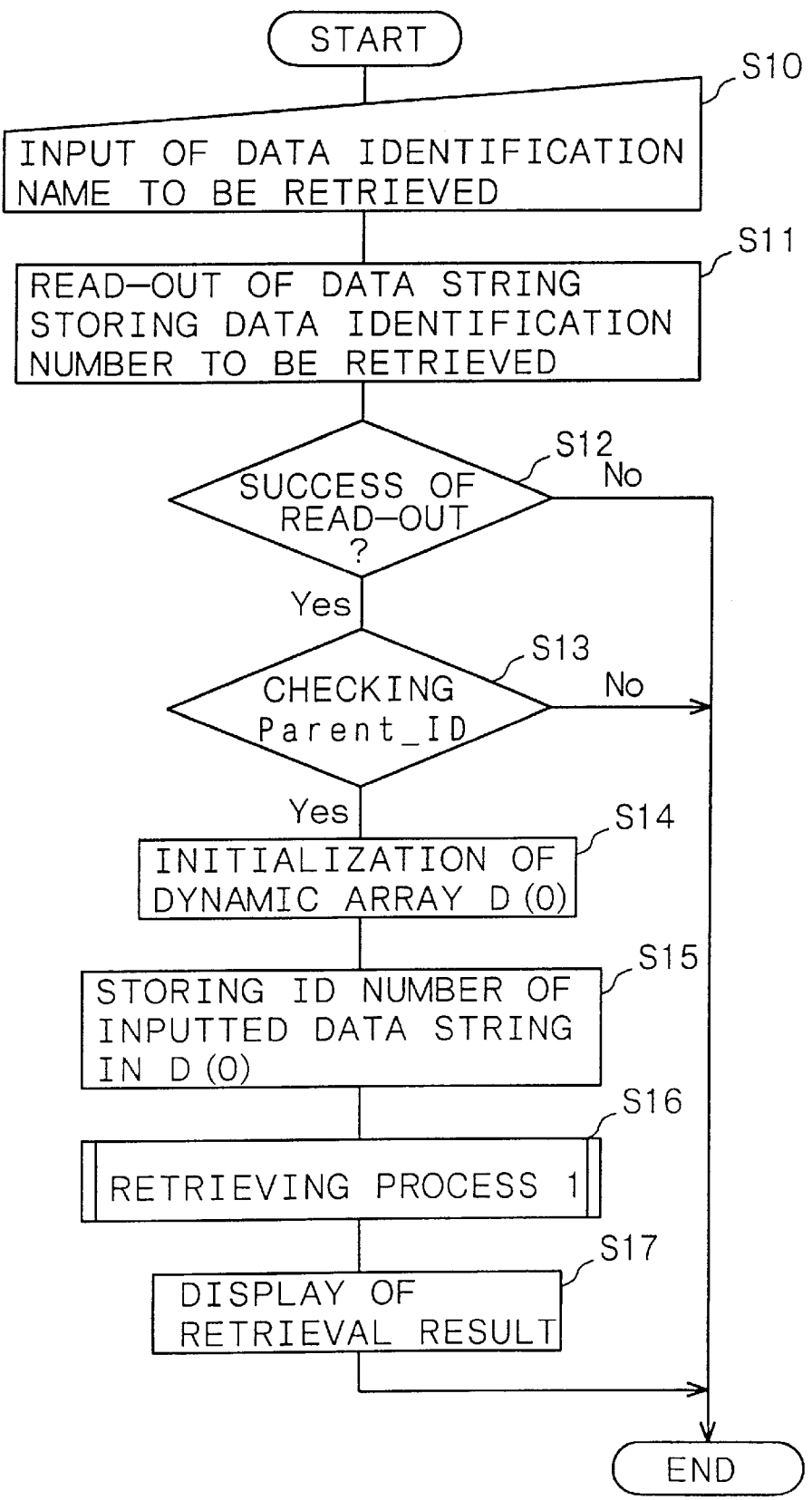
FIG. 8 is a flow chart showing the data retrieval method in Example 1.

As shown in FIG. 8, a letter string "INSULATOR" as an data identification name to be retrieved is inputted first, for example, from the input unit 12 containing, e.g., a keyboard (STEP-S10). MPU 10 reads the inputted letter string "INSULATOR" and stores it in a variable storage area (not shown)

of the main storage device 14. Then, MPU 10 accesses the data structure stored in the external storage device 18, extracts (reads out) the data string having the data identification name which is stored in the data identification name storage area [Name] and is in agreement with the inputted letter string (inputted data string, or data string of ID number 5 in Example 1) from the data structure (STEP-S11) and stores the content of the inputted data string in the variable storage area of the main storage device 14. When MPU 10 fails in reading out the data string from the data structure, the retrieval operation comes to an end (STEP-S12).

Then MPU 10 checks the parent identification number storage area of parent data storage area of the inputted data string stored in the variable storage area of the main storage device 14, and when the parent identification number storage area is empty, MPU 10 terminates the retrieval procedure (STEP-S13). When the parent identification number storage area is not empty, MPU 10 arranges a dynamic array D(0) in the variable storage area and initializes the dynamic array D(0) (STEP-S14). In the dynamic array D, ID number of a data string is stored. Then, ID number of the inputted data string is stored in the dynamic array D(0) (STEP-S15).

Then, data strings are extracted on the basis of the link-information data stored in the parent data storage area of the inputted data string, and data strings are further extracted on the basis of the link-information data stored in the parent data storage areas of the extracted data strings until the parent data storage area of the extracted data string is empty.

Figure 9:
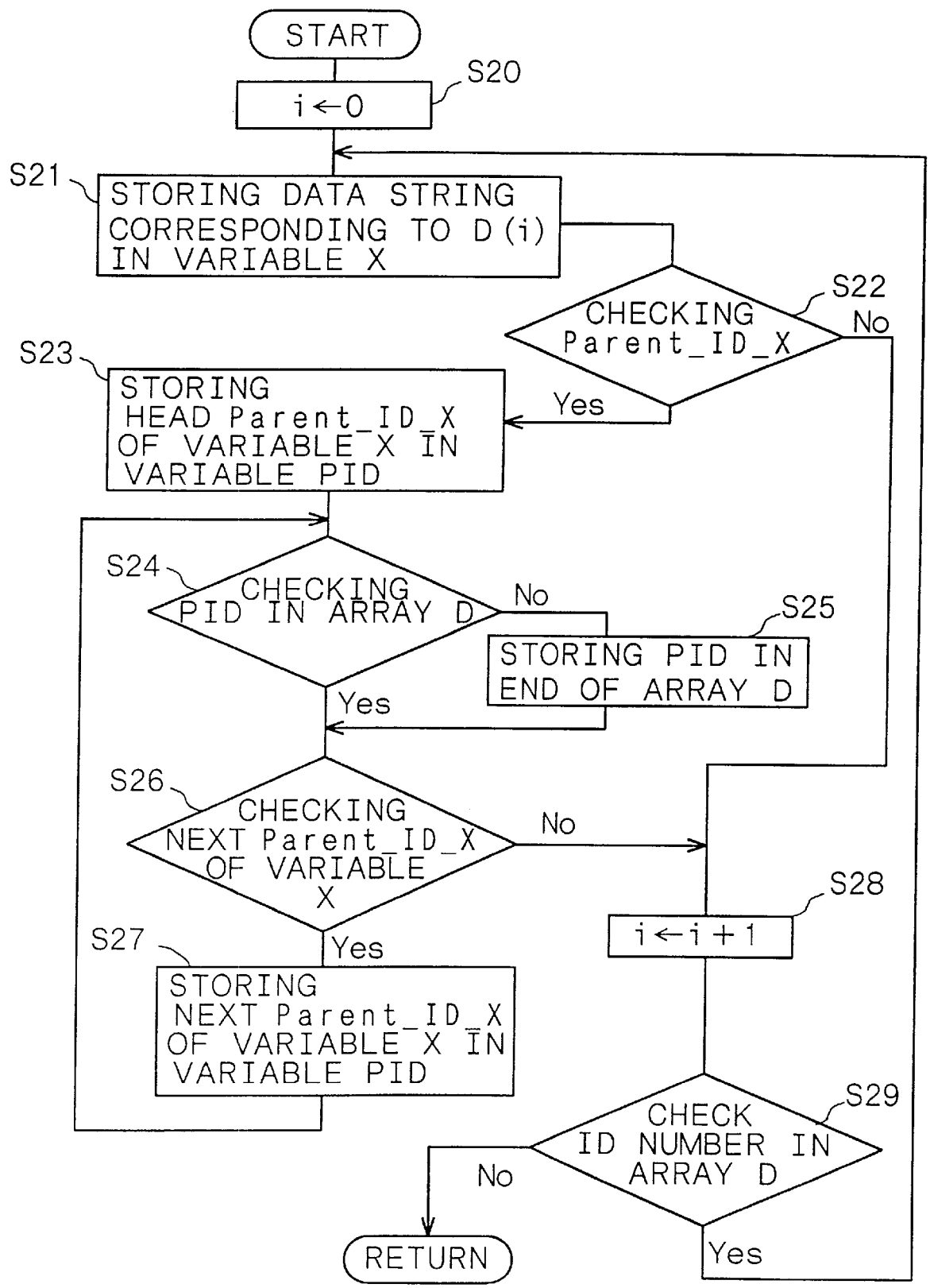
FIG. 9 is a flow chart showing the retrieving process-1 in the data retrieval method in Example 1.

Specifically, the retrieving process 1 shown in FIG. 9 is executed (STEP-S16). In the retrieving process 1, the variable i is set at 0 (STEP-S20).

Then, MPU 10 reads the data string corresponding to ID number stored in the dynamic array D(i) from the data structure and stores it in variable X (STEP-S21). The variable X can be structurally the same as the data string. Then, MPU 10 checks the parent identification number storage area [Parent_ID_X] of the parent data storage area [Parent_X] in the variable X, and when the parent identification number storage area [Parent_ID_X] is empty, the operation jumps to STEP-S28 (STEP-S22). When the parent identification number storage area [Parent_ID_X] is not empty, MPU 10 stores ID number (stored in the head parent identification number storage area [Parent_ID_X]) in variable PID (STEP-S23).

Thereafter, MPU 10 checks whether ID number stored in the variable PID is present in the dynamic array D (STEP-S24), and when it is present, MPU 10 jumps to STEP-S26. On the other hand, when it is not present, MPU 10 adds ID number stored in the variable PID to the end of the dynamic array D (STEP-S25). Then, MPU 10 checks the next parent identification number storage area [Parent_ID_X] in the parent data storage area [Parent_X] in the variable X, and when the parent identification number storage area [Parent_ID_X] is empty, the operation jumps to STEP-S28 (STEP-S26). When the parent identification number storage area [Parent_ID_X] is not empty, MPU 10 stores ID number (stored in the parent identification number storage area [Parent_ID_X]) in the variable PID (STEP-S27) and then returns to STEP-S24.

In STEP-S28, the value of the variable i is incremented by 1 (STEP-S28), and MPU 10 checks whether ID number is stored in the dynamic array D(i), i.e., whether the dynamic array D(i) is a tail end (EOF). When ID number is stored in the dynamic array D(i), MPU 10 returns to STEP-S21. When no ID number is stored in the dynamic array D(i), MPU 10 terminates the retrieving process 1 (STEP-S29).

Then, MPU 10 reads the data string corresponding to ID number stored in the dynamic array D(i) from the data structure, and displays the data identification name stored in the data identification name storage area of the above data string and the data level value stored in the data level storage area, for example, on the display unit 16 (STEP-S17). The data identification name to be retrieved may be displayed, or no data identification name to be retrieved may be displayed. The retrieval operation is so-finished.

When "INSULATOR" is retrieved, ID numbers are stored in the dynamic array D(i) in the following order.

TABLE 4

D (0) : ID number = 5
D (1) : ID number = 12
D (2) : ID number = 14
D (3) : ID number = 15
D (4) : ID number = 16

As explained above, when "INSULATOR" is inputted as a data identification name to be retrieved, not only "WOOD" and "MICA" which are second level data strings storing the second level data identification name which indicates the set containing "INSULATOR" are extracted, but also "DESK" and "PENCIL" which are third level data strings storing the third level data identification name which indicates the set including "WOOD" can be extracted. That is, even if the element of "INSULATOR" is not included in "DESK" and "PENCIL" which are third level concepts, it can be led out that "DESK" and "PENCIL" includes concept "INSULATOR".

When the "INSULATOR" which is a first level concept is taken as standard in the above example, "WOOD" and "MICA" which are second level concepts correspond to parent concepts, and "DESK" and "PENCIL" which are third level concepts correspond to indirect parent concepts. Table 5 shows the retrieval results. For a reference purpose, parent concept or indirect parent concept is shown after the data level value.

TABLE 5

| Data identification name of extracted data string | Data level value | Classification of concept |
| --- | --- | --- |
| WOOD | 2 | parent concept |
| MICA | 2 | parent concept |
| DESK | 3 | indirect parent concept |
| PENCIL | 3 | indirect parent concept |

In Example 1, the first level data identification name is an object to be retrieved, while a second level data identification name to a (N−1)th level data identification name can be used an object to be retrieved depending upon the value of N. Further, extracted data strings may be outputted at the time when ID number stored in the variable PID is added to the end of the dynamic array D in STEP-S25.

EXAMPLE 2

Figure 2:
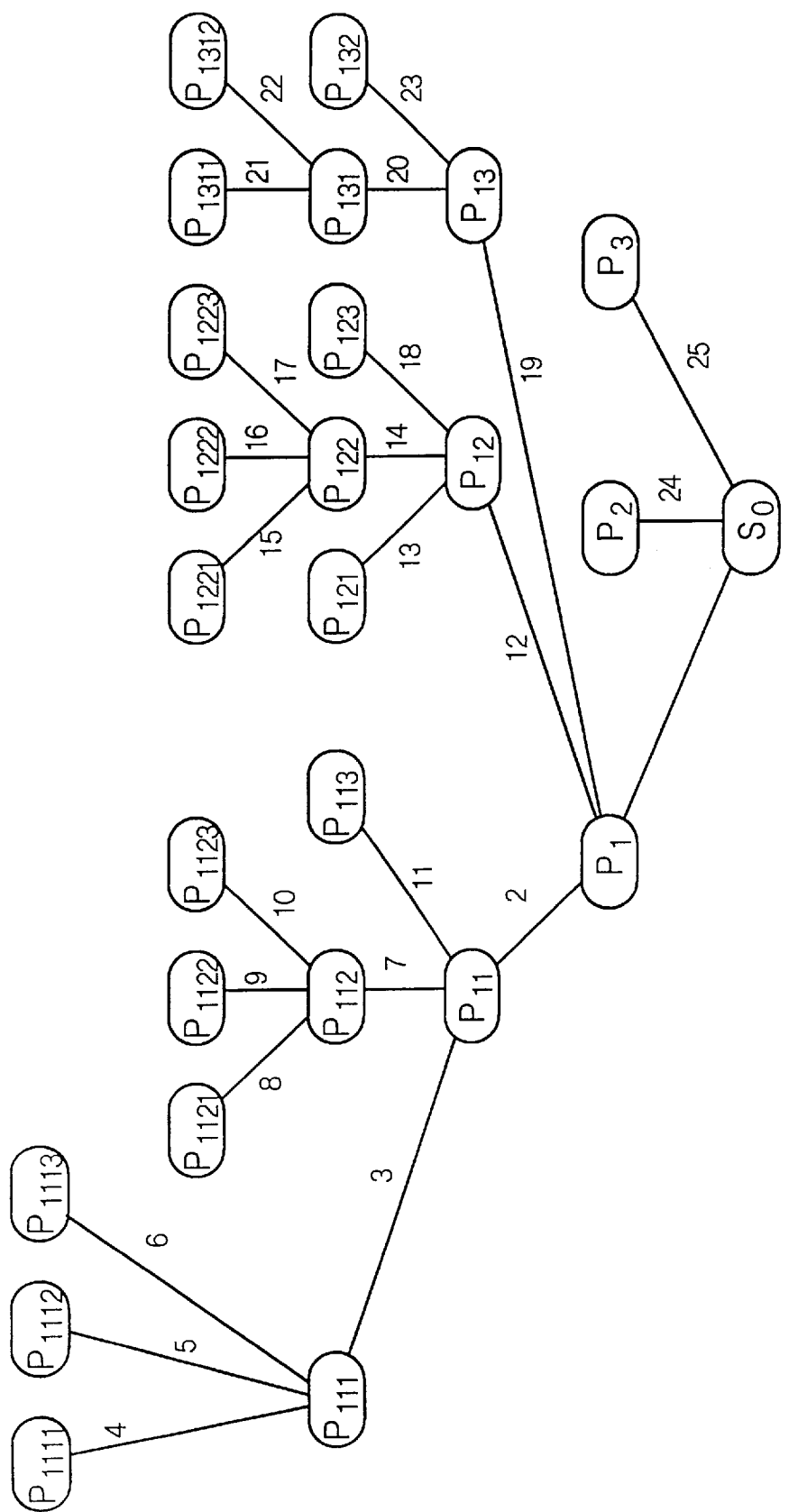
FIG. 2 schematically shows the second retrieving pattern in the data retrieval method directed to the first aspect of the present invention.

Example 2 is a variant of Example 1. In Example 1, the retrieving pattern in the data retrieval method is the first retrieving pattern shown in FIGS. 1A and 1B. In Example 2, the retrieving pattern in the data retrieval method is the second retrieving pattern shown in FIG. 2. The data retrieval method in Example 2 will be explained with reference to flow charts of FIGS. 10 and 11 hereinafter.

Figure 10:
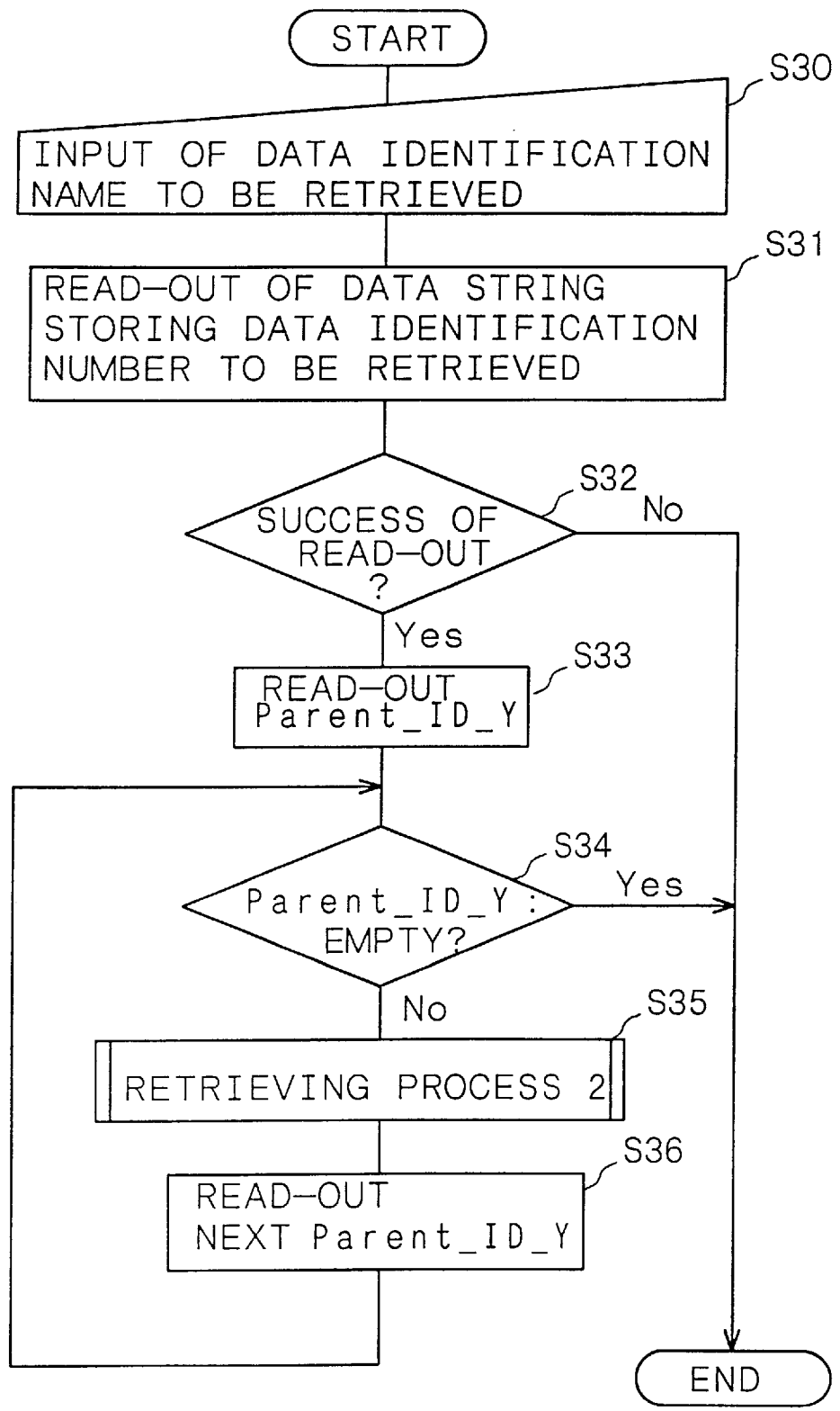
FIG. 10 is a flow chart showing the data retrieval method in Example 2.

As shown in FIG. 10, first, a letter string "INSULATOR" as a data identification name corresponding to data to be retrieved is inputted from the input unit 12 containing, e.g., a keyboard (STEP-S30). MPU 10 reads inputted letter string "INSULATOR", and stores it in the variable storage area of the main storage device 14. Then, MPU 10 accesses the data structure stored in the external storage device 18, extracts (reads out) the data string having the data identification name which is stored in its data identification name storage area [Name] and is in agreement with the inputted letter string (inputted data string, data string of ID number 5 in Example 2) from the data structure (STEP-S31), and stores the content of the inputted data string in a variable $Y_1$ of the main storage unit 14. The variable $Y_1$, $Y_2$, . . . can be structurally the same as that of the data string. When MPU 10 fails in reading out the data string from the data structure, the retrieval procedure is terminated (STEP-S32).

Then, MPU 10 reads the parent identification number storage area [Parent_ID_Y] of the parent data storage area [Parent_Y] of the inputted data string stored in the variable $Y_1$ in the main storage device 14 (STEP-S33), and when the parent identification number storage area [Parent_ID_Y] is empty, the retrieval procedure is terminated (STEP-S34). In Example 2, as shown in FIG. 5B, ID number 12 as link-information data is stored in the head parent identification number storage area [Parent_ID] of the parent data storage area [Parent] in the data string of ID number 5, and the retrieving process 2 is executed (STEP-S35).

Figure 11:
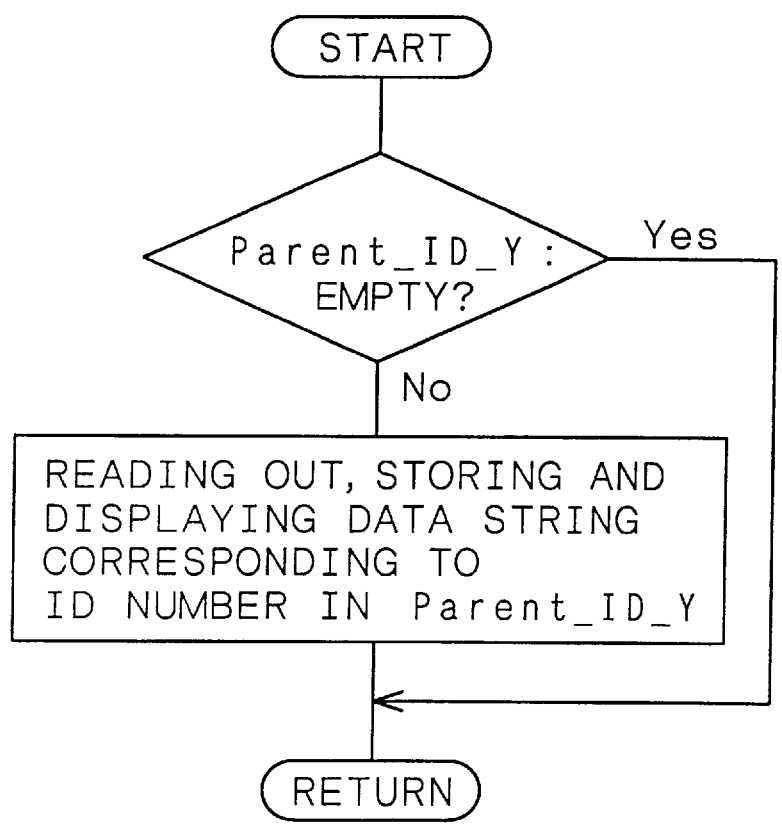
FIG. 11 is a flow chart showing the retrieving process-2 in the data retrieval method in Example 2.
Figure 12:
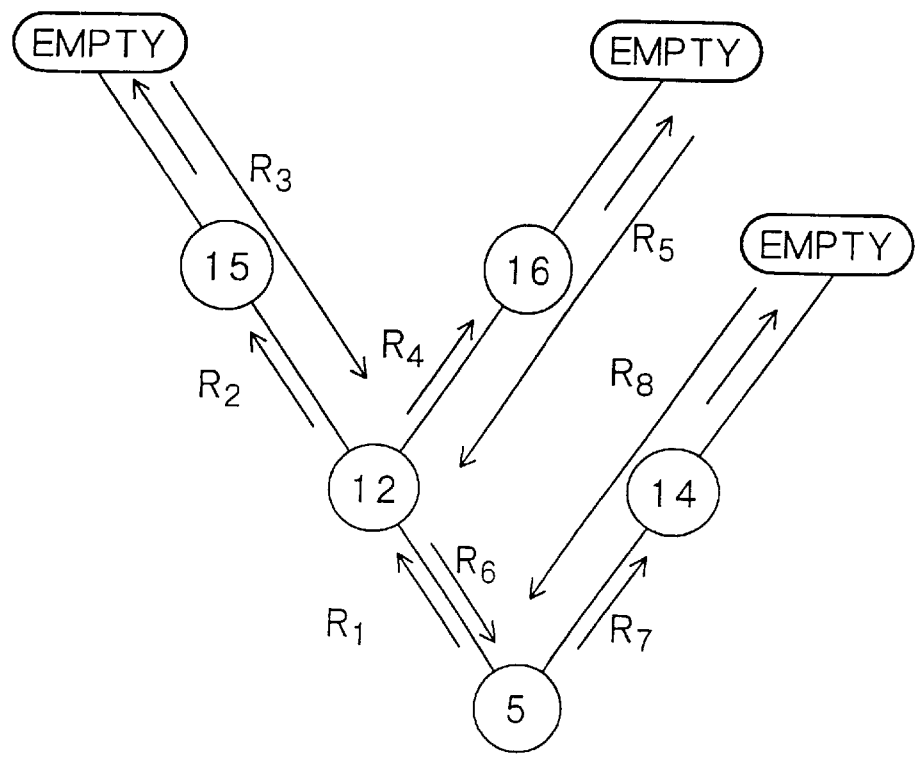
FIG. 12 shows the order of procedures of the retrieving process-2 in the data retrieval method in Example 2.

In the retrieving process 2, a routine shown in FIG. 11 is mainly executed. For the purpose of explanation of Example 2, FIG. 12 will be referred to hereinafter. In FIG. 12, suffixes to "R" indicate the order of the routine, and encircled numerals indicates ID number of data strings. In the routine, on the basis of ID number 12, MPU 10 accesses the data structure stored in the external storage device 18, extracts (reads out) the data string of ID number 12 from the data structure and stores the content of the data string of ID number 12 in a variable $Y_2$ of the main storage device 14. And, MPU 10 displays "WOOD" which is a second level data identification name stored in the data identification name storage area [Name] of the data string of ID number 12 and "2" which is a data level value stored in the data level storage area [Level_value] on the display unit 16 ($R_1$).

Then, the routine is repeated. That is, MPU 10 reads, as link-information data, the data stored in the head parent identification number storage area [Parent_ID_Y] of the parent data storage area [Parent_Y] in the content of the data string of ID number 12 stored in the variable $Y_2$ of the main storage device 14. In Example 2, as shown in FIG. 6A, ID number 15, as link-information data, is stored in the head parent identification number storage area [Parent_ID] of the parent data storage area [Parent] in the data string of ID number 12. On the basis of ID number 15, MPU 10 accesses the data structure stored in the external storage device 18, extracts (reads out) the data string of ID number 15 from the data structure and stores the content of the data string of ID number 15 in a variable $Y_3$ of the main storage device 14. And, MPU 10 displays "DESK" which is a third level data identification name stored in the data identification name storage area [Name] of the data string of ID number 15 and "3" which is a data level value stored in the data level storage area [Level_value] on the display unit 16 ($R_2$).

Further, MPU 10 reads, as link-information data, the data stored in the head parent identification number storage area [Parent_ID_Y] of the parent data storage area [Parent_Y] in the content of the data string of ID number 15 stored in the variable $Y_3$ of the main storage device 14. In Example 2, as shown in FIG. 6B, nothing is stored in the head parent identification number storage area [Parent_ID] of the parent data storage area [Parent] in the data string of ID number 15. Therefore, MPU 10 escapes from the routine ($R_3$), and discards the variable $Y_3$ in the main storage device 14.

Further, the retrieving process 2 is repeated. That is, MPU 10 reads, as link-information data, the data stored in the next parent identification number storage area [Parent_ID_Y] of the parent data storage area [Parent_Y] in the content of the data string of ID number 12 stored in the variable $Y_2$ of the main storage device 14. In Example 2, as shown in FIG. 6A, ID number 16, as link-information data, is stored in the second parent identification number storage area [Parent_ID] of the parent data storage area [Parent] in the data string of ID number 12. On the basis of ID number 16, MPU 10 accesses the data structure stored in the external storage device 18, extracts (reads out) the data string of ID number 16 from the data structure and stores the content of the data string of ID number 16 in a variable $Y_3$ of the main storage device 14. And, MPU 10 displays "PENCIL" which is a third level data identification name stored in the data identification name storage area [Name] of the data string of ID number 16 and "3" which is a data level value stored in the data level storage area [Level_value] on the display unit 16 ($R_4$).

Then, MPU 10 reads, as link-information data, the data stored in the head parent identification number storage area [Parent_ID_Y] of the parent data storage area [Parent_Y] in the content of the data string of ID number 16 stored in the variable $Y_3$ of the main storage device 14. In Example 2, as shown in FIG. 7A, nothing is stored in the head parent identification number storage area [Parent_ID] of the parent data storage area [Parent] in the data string of ID number 16. Therefore, MPU 10 escapes from the routine ($R_5$), and discards the variable $Y_3$ in the main storage device 14.

Then, MPU 10 reads the data stored in the next parent identification number storage area [Parent_ID_Y] of the parent data storage area [Parent_Y] in the content of the data string of ID number 12 stored in the variable $Y_2$ of the main storage device 14. In Example 2, as shown in FIG. 6A, nothing is stored in the third parent identification number storage area [Parent_ID] of the parent data storage area [Parent] in the data string of ID number 12. Therefore, MPU 10 escapes from the routine ($R_6$), and discards the variable $Y_2$ in the main storage device 14.

The retrieving process 2 (STEP-S35) is finished once. Then, as shown in FIG. 10, MPU 10 reads, as link-information data, the data stored in the next parent identification number storage area [Parent_ID_Y] of the parent data storage area [Parent_Y] in the content of the data string of ID number 5 stored in the variable $Y_1$ of the main storage device 14 (STEP-S36), and returns to STEP-S34.

In Example 2, as shown in FIG. 5B, ID number 14, as link-information data, is stored in the second parent identification number storage area [Parent ID] of the parent data storage area [Parent] in the data string of ID number 5. On the basis of the link-information data stored in the parent data storage area of the inputted data string, again, a data string is extracted, and on the basis of the link-information data stored in the parent data storage area of the extracted data string, a data string is further extracted until the parent data storage area of the extracted data string is empty.

That is, the retrieving process 2 is again executed (STEP-S35). That is, on the basis of ID number stored in the next parent identification number storage area [Parent_ID_Y] of the parent data storage area [Parent_Y] in the content of the data string of ID number 5 stored in the variable $Y_1$ of the main storage device 14, MPU 10 accesses the data structure stored in the external storage device 18, extracts (reads out) the data string of ID number 14 from the data structure and stores the content of the data string of ID number 14 in a variable $Y_2$ of the main storage device 14. And, MPU 10 displays "MICA" which is a second level data identification name stored in the data identification name storage area [Name] of the data string of ID number 14 and "2" which is a data level value stored in the data level storage area [Level_value] on the display unit 16 ($R_7$).

Then, MPU 10 reads the data stored in the head parent identification number storage area [Parent_ID_Y] of the parent data storage area [Parent Y] in the content of the data string of ID number 14 stored in the variable $Y_2$ of the main storage device 14. In Example 2, as shown in FIG. 7B, nothing is stored in the head parent identification number storage area [Parent_ID] of the parent data storage area [Parent] in the data string of ID number 14. Therefore, MPU 10 escapes from the routine ($R_8$), and discards the variable $Y_2$ in the main storage device 14.

The retrieving process 2 (STEP-S35) is finished once. Then, MPU 10 reads the data stored in the next parent identification number storage area [Parent_ID_Y] of the parent data storage area [Parent_Y] in the content of the data string of ID number 5 stored in the variable $Y_1$ of the main storage device 14 (STEP-S36), and returns to STEP-S34. In Example 2, however, as shown in FIG. 5B, nothing is stored in the third parent identification number storage area [Parent_ID] of the parent data storage area [Parent] in the data string of ID number 5. Therefore, MPU 10 terminates all the retrieval operation.

Table 6 shows the retrieval results in Example 2. For a reference purpose, parent concept or indirect parent concept is shown after the data level value.

TABLE 6

| Data identification name of extracted data string | Data level value | Classification of concept |
|---|---|---|
| WOOD | 2 | parent concept |
| DESK | 3 | indirect parent concept |
| PENCIL | 3 | indirect parent concept |
| MICA | 2 | parent concept |

EXAMPLE 3

Example 3 is also concerned with the data retrieval method directed to the first aspect of the present invention. In Examples 1 and 2, the number of data identification name to be retrieved was 1, while a plurality of data identification names are retrieved in Example 3. The data retrieval method explained in Example 1 or 2 is executed for data identification names to be retrieved. And, the number of the data identification names to be retrieved with regard to each of the extracted data strings are outputted. The data retrieval method of outputting the number of the data identification names to be retrieved with regard to each of the extracted data strings will be called "a data retrieval method of scrap method" hereinafter.

Example 3 will specifically explained on the basis of the data structure explained in Example 1. The retrieving pattern is the same as the first retrieving pattern in Example 1, while the second retrieving pattern explained in Example 2 may be used. The number of data identification names to be retrieved is 3, i.e., the data identification names to be retrieved are "INSULATOR", "BLACK COLOR" and "OFFICE SUPPLIES". The data level values of data strings storing the data identification names to be retrieved may be the same or different. The data retrieval method in Example 3 will be explained with reference to flow charts of FIGS. 13 and 14 hereinafter.

Figure 13:
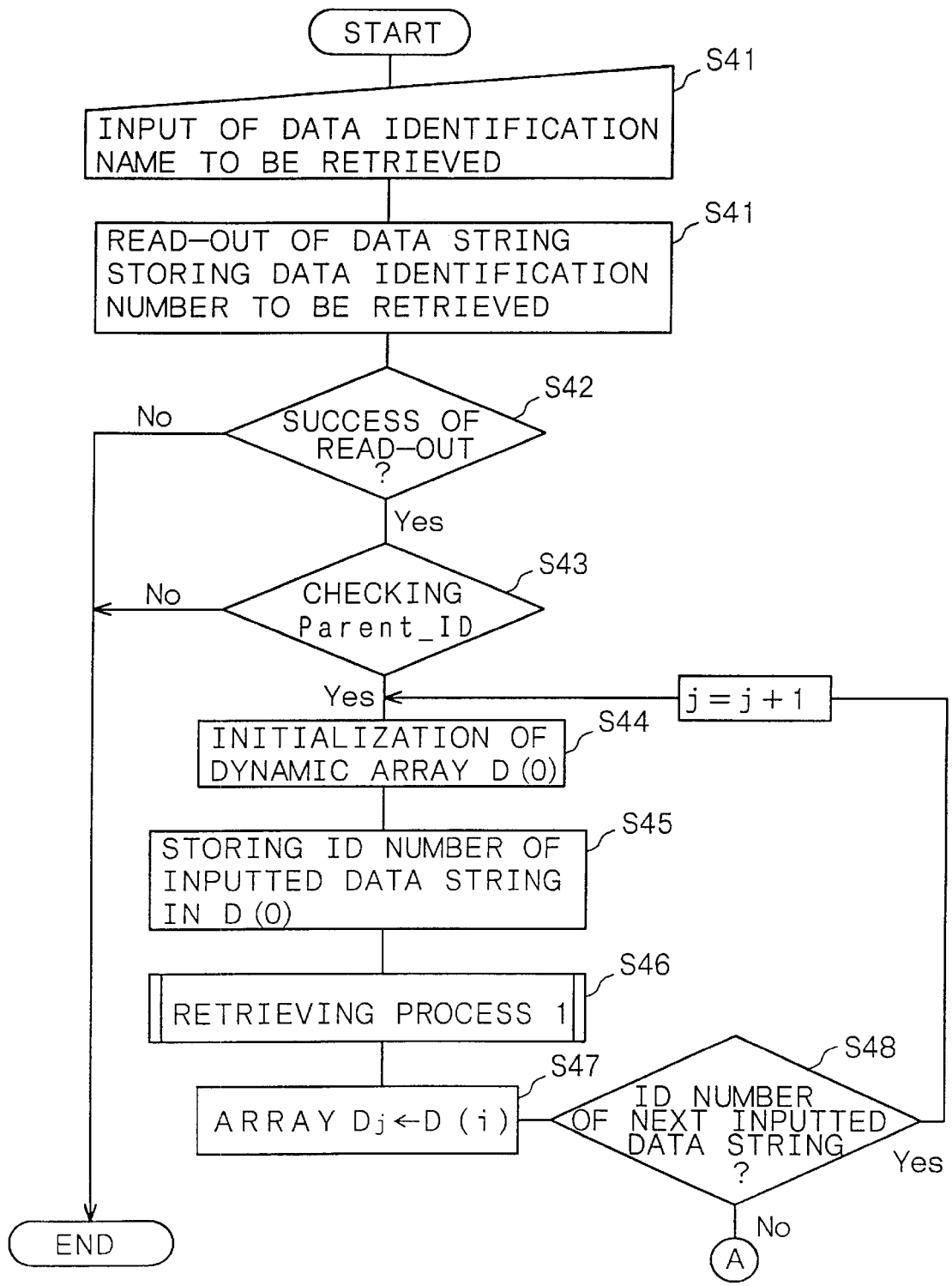
FIG. 13 is a flow chart showing the data retrieval method in Example 3.

As shown in FIG. 13, first, letter strings "INSULATOR", "BLACK COLOR" and "OFFICE SUPPLIES" are inputted from the input unit 12 containing, e.g., a keyboard, as data identification names corresponding to data to be retrieved (STEP-S40). MPU 10 reads the letter strings "INSULATOR", "BLACK COLOR" and "OFFICE SUPPLIES" and stores them in the variable storage areas (not shown) in the main storage device 14. Then, MPU 10 substitutes "1" in a variable j, then accesses the data structure stored in the external storage device 18, extracts (reads out) the data string (first inputted data string) having a data identification name (data string of ID number 5 in Example 3) which is stored in its data identification name storage area [Name] and is in agreement with the inputted letter string from the data structure, and stores the content of the read-out data string in the variable storage area of the main storage device 14. This procedure is conducted as many times as the number of the inputted data identification names. That is, in Example 3, MPU 10 accesses the data structure stored in the external storage device 18, extracts (reads out) the data string of ID number 11 from the data structure, and stores the content of the read-out data string (second inputted data string) in the variable storage area of the main storage device 14. Further, MPU 10 accesses the data structure stored in the external storage device 18, extracts (reads out) the data string of ID number 1 from the data structure, and stores the content of the read-out data string (third inputted data string) in the variable storage area of the main storage device 14 (STEP-S41). When MPU 10 fails in reading out the data string from the data structure, the retrieval procedure is terminated (STEP-S42). Then, MPU 10 checks the parent identification number storage areas of the parent data storage areas of all the data strings stored in the variable storage area in the main storage device 14, and when all the parent identification number storage areas of data strings are empty, the retrieval procedure is terminated (STEP-S43).

On the other hand, when the parent identification number storage area of any inputted data string is not empty, MPU 10 prepares a dynamic array D(0) in the variable storage area and initializes the dynamic array D(0) (STEP-S44). The dynamic array D stores ID number of the data string. Then, out of data strings stored in the variable storage area in the main storage device 14, MPU 10 stores, in the dynamic array D(0), ID number 5 of the first inputted data string which is a data string storing the first data identification name to be retrieved first (STEP-S45).

Then, a data string is extracted on the basis of the link-information data stored in the parent data storage area of the first inputted data string, and a data string is further extracted on the basis of the link-information data stored in the parent data storage area of the extracted data string until the parent data storage areas of the extracted data string is empty. Specifically, the same retrieving process 1 as that of Example 1 shown in FIG. 9 is executed (STEP-S46).

Then, MPU 10 prepares array $D_j$ (=$D_1$), copies the content of the dynamic array D(i) to the array $D_j$(i) and discards the dynamic array D(i). Then, MPU 10 checks whether a next inputted data string is stored in the variable storage area of the main storage device 14 (STEP-S48). When the next inputted data string is not stored in the variable storage area of the main storage device 14, MPU 10 moves to STEP-S50. Table 7 shows the contents of $D_1$.

TABLE 7

$D_1(0)$:ID number=5
$D_1(1)$:ID number=12
$D_1(2)$:ID number=14
$D_1(3)$:ID number=15
$D_1(4)$:ID number=16

When the next inputted data string is stored in the variable storage area of the main storage device 14, MPU 10 increments the variable j by 1 and returns to STEP-S44. That is, MPU 10 again prepares a dynamic array D(0) in the variable storage area and initializes the dynamic array D(0) (STEP-S44). Then, MPU 10 stores ID number 11 of the second inputted data string in the dynamic array D(0) (STEP-S45).

Then, a data string is extracted on the basis of the link-information data stored in the parent data storage area of the second inputted data string, and a data string is further extracted on the basis of the link-information data stored in the parent data storage area of the extracted data string until the parent data storage area of the extracted data string is empty. Specifically, the same retrieving process 1 as that of Example 1 is executed (STEP-S46).

Then, MPU 10 prepares array $D_j(=D_2)$, copies the content of the dynamic array D(i) to the array $D_2$ and discards the dynamic array D(i). Table 8 shows the contents of $D_2$.

TABLE 8

$D_2(0)$:ID number=11
$D_2(1)$:ID number=13
$D_2(2)$:ID number=16
$D_2(3)$:ID number=17

Then, MPU 10 checks whether a next inputted data string is stored in the variable storage area of the main storage device 14 (STEP-S48). In Example 3, the next inputted data string (corresponding to ID number 1) is stored in the variable storage area of the main storage device 14, MPU 10 increments the variable j by 1, returns to STEP-S44, and executes STEP-S45, STEP-S46 and STEP-S47. In STEP-S47, the content of the dynamic array D(i) is copied to $D_j(=D_3)$. Table 9 shows the contents of $D_3$.

TABLE 9

$D_3(0)$:ID number=1
$D_3(1)$:ID number=15
$D_3(2)$:ID number=16

Then, MPU 10 checks whether a next inputted data string is stored in the variable storage area of the main storage device 14 (STEP-S48). In Example 3, since no inputted data string is stored in the above variable storage area, MPU 10 moves to STEP-S50.

Figure 14:
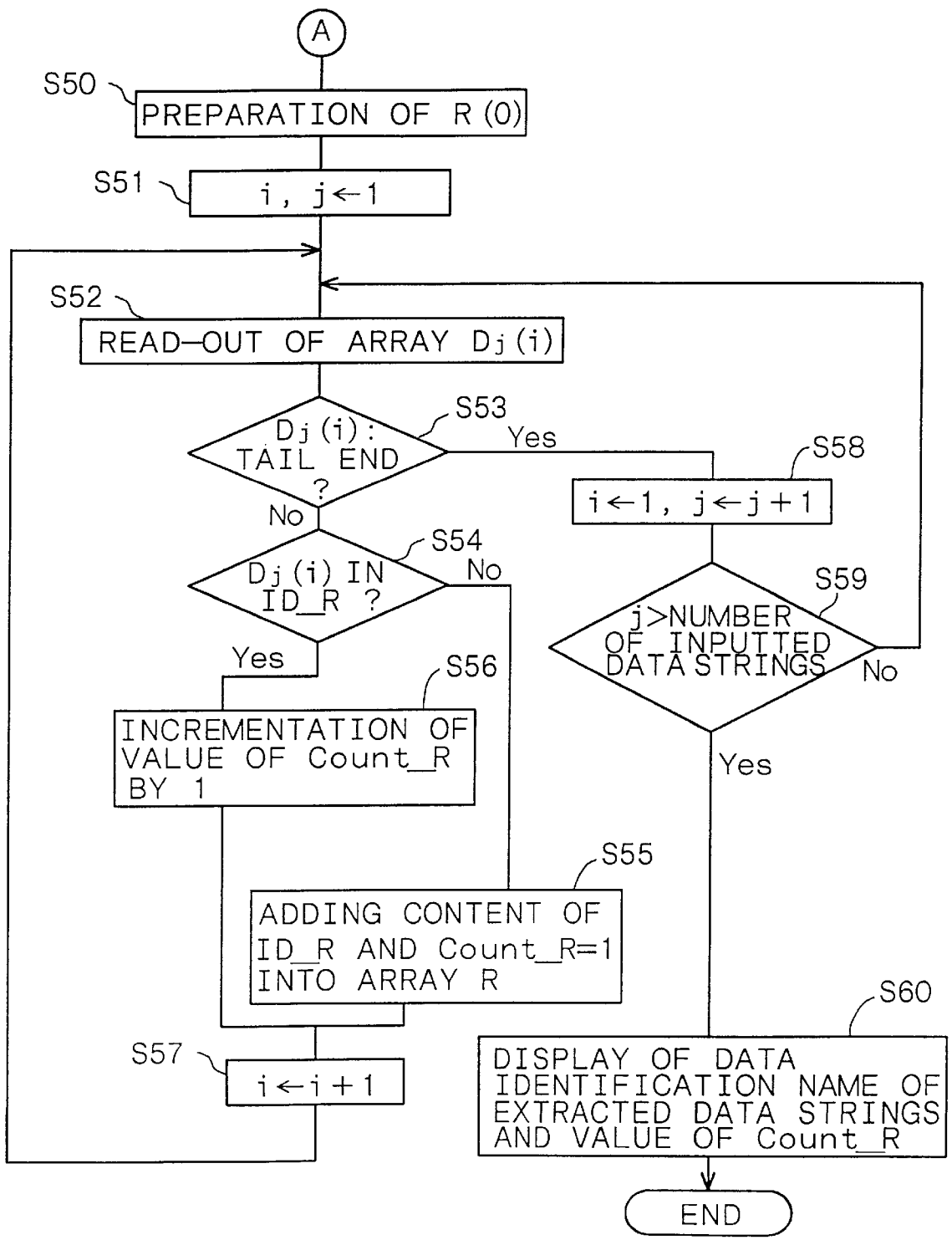
FIG. 14 is a flow chart showing the data retrieval method in Example 3 subsequent to FIG. 13.

In STEP-S50 shown in FIG. 14, MPU 10 prepares dynamic array R(0) and initializes it. The dynamic array R contains an ID number storage area [ID_R] and a count area [Count_R].

Then, MPU 10 substitutes "1" in the variables i and j (STEP-S51) and reads the content (ID number) of the array $D_j(i)$ (STEP-S52). MPU 10 checks whether the array $D_j$ has data (STEP-S53), and if no data is there, MPU 10 returns to STEP-S58. If data is there, MPU 10 checks all of ID number storage areas [ID_R] of the dynamic array R as to whether the content (ID number) of the array $D_j(i)$ is recorded (STEP-S54). If no record is there, MPU 10 adds ID number storage area [ID_R] storing the above ID number and a count area [Count_R] storing "1" to the end of the dynamic array R (STEP-S55). If the record is there, MPU 10 increments the value of the count area [Count_R] of element of the dynamic array R storing the above ID number by 1 (STEP-S56). Then, MPU 10 increments the variable i by 1 (STEP-S57) and returns to STEP-S52.

In STEP-S58, MPU 10 substitutes "1" in the variable i, increments the variable j by 1 and then checks whether the value of the variable j exceeds the number of the inputted data strings (STEP-S59). If the value of the variable j does not exceed the number of the inputted data strings, MPU 10 returns to STEP-S52. If the value of the variable j exceeds the number of the inputted data strings, MPU 10 consecutively reads out the data strings corresponding to ID numbers stored in ID number storage area [ID_R] of the dynamic array R, from the data structure in the main storage device 14. The reading starts in the dynamic array R(1). And, MPU 10 displays the data identification name stored in the data identification name storage areas of the read-out data string and the value (hit number of the inputted data strings) stored in the count area [Count_R] (STEP-S60). Table 10 shows a display example. For a reference purpose, data identification names inputted for the retrieval are given after the hit number of the inputted data strings.

In Example 3, the number of the data identification names to be retrieved is outputted with regard to each of the extracted second level data string and third data string. It can be determined in advance by inputting a data level value through the input unit 12 whether the number of the data identification names to be retrieved is outputted with regard to each of the extracted data strings having the inputted data level value.

In the data retrieval method of the scrap method, the value (hit number of the inputted data strings) stored in the count area [Count_R] of the dynamic array R shows how many of the three data identification names "INSULATOR", "BLACK COLOR" and "OFFICE SUPPLIES" are included in, or related to, the extracted data strings. For example, the value of the count area in the third level data string having "PENCIL" as a data identification name is "3", and

TABLE 10

| Data identification name of extracted data string | Hit number of inputted data strings | Data identification name to be retrieved |
|---|---|---|
| WOOD | 1 | INSULATOR |
| MICA | 1 | INSULATOR |
| DESK | 2 | INSULATOR |
|  |  | OFFICE SUPPLIES |
| PENCIL | 3 | INSULATOR |
|  |  | BLACK COLOR |
|  |  | OFFICE SUPPLIES |
| GRAPHITE | 1 | BLACK COLOR |
| BRUSH OF MOTOR | 1 | BLACK COLOR | therefore, three data identification names to be retrieved are directly or indirectly included in the third level concept name "PENCIL".

The above "directly included" means that a concept expressed by the data identification name to be retrieved is an element concept of a certain concept. The above "indirectly included" means that a concept expressed by the data identification name to be retrieved is an indirect element concept of a certain concept. Specifically, the first level concept name "OFFICE SUPPLIES" is directly included in the third level concept name "PENCIL". On the other hand, the first level concept names "INSULATOR" and "BLACK COLOR" are indirectly included in the third level concept name "PENCIL".

The above third level concept name "PENCIL" including all of three first level concept names to be retrieved corresponds to a retrieval result obtained by connecting the three first level concept names to be retrieved, by a conventional condition of "AND".

Further, for example, the value (hit number of the inputted data strings) stored in the count area [Count_R] in the third level data string having "DESK" as a data identification name is "2". Therefore, two first level concept names corresponding to two data identification names to be retrieved are directly or indirectly included in the third level concept name "DESK". The value (hit number of the inputted data strings) stored in the count area [Count_R] in the second level data string having "WOOD", "GRAPHITE" and "MICA" as data identification names is "1", and the value (hit number of the inputted data strings) stored in the count area [Count_R] in the third level data string having "BRUSH OF MOTOR" as a data identification name is "1". Therefore, one first level concept name corresponding to one data identification name to be retrieved is directly or indirectly included in the above second level concept name and third level concept name.

That is, the second or third level concept name containing at least one of the three concept names corresponding to the three data identification names to be retrieved corresponds to a retrieval result obtained by connecting the three concept names to be retrieved by a conventional retrieval condition of "OR". Unlike a conventional data retrieval method, however, it is possible to check how many data identification names to be retrieved are related to the extracted second level data string and the extracted third level data string.

In Example 3, the data identification names stored in the first level data string are objects to be retrieved, while, although depending upon the value of level N, the objects to be retrieved may be a combination of data identification names stored in the first level data string to (N−1)th level data string.

EXAMPLE 4

Example 4 is concerned with the link-information adding method directed to the first aspect of the present invention. In Example 4, the data string structure in the data structure and various data stored in data strings are the same as those in Example 1. Prior to the explanation of the link-information adding method in Example 4, the procedure or operation of the formation of a data string as the introduction of a new data string to the data structure will be explained below.

The formation of a new data string in the data structure is preferably conducted by introducing a new first level data string to the data structure. When a new data identification name is inputted through the input unit 12, MPU 10 checks whether the inputted data identification name is already stored in the data identification name storage areas [Name] of the data strings in the data structure. If the inputted data identification name is already stored in the data identification name storage area [Name] of any data string in the data structure, MPU 10 discontinues the operation. If the above is not the case, MPU 10 forms a data string having a structure shown, e.g., in FIG. 5A in the main storage device 14, gives a new ID number, stores the ID number in the identification number storage area [ID], stores the inputted data identification name in the data identification name storage area [Name] and stores "1" in the data level storage area [Level_value]. And, MPU 10 adds the above data string to the data structure in the external storage device 18.

The link-information adding method in Example 4 will be explained with reference to flow charts of FIGS. 15 to 18 hereinafter.

Figure 15:
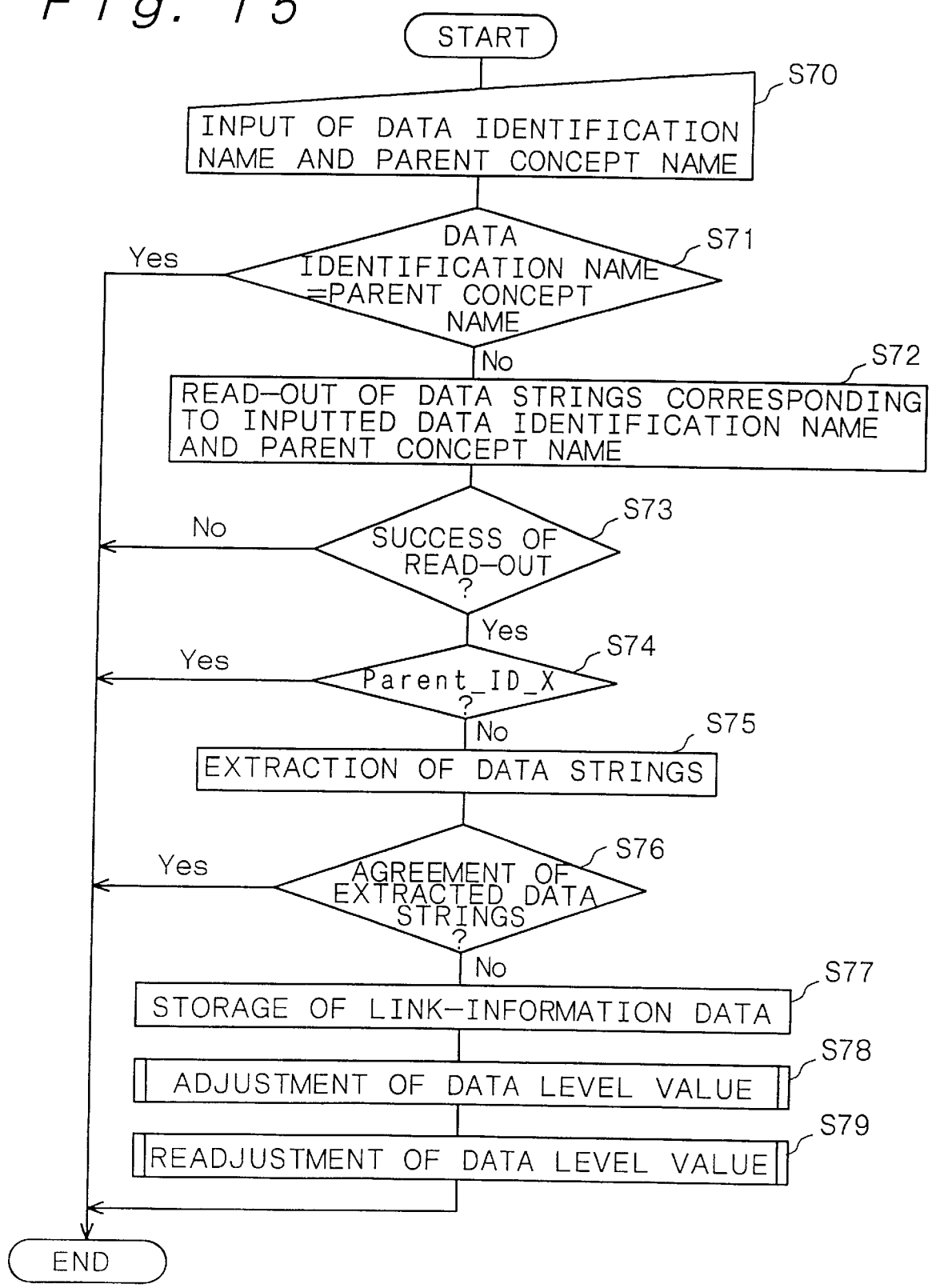
FIG. 15 is a flow chart showing the link-information adding method in Example 4.

As shown in FIG. 15, a data identification name is inputted through the input unit 12 containing, e.g., a keyboard, and a parent concept name which indicates a set including the data identification name is inputted (STEP-S70). In Example 4, the data identification name is "COMBUSTIBILITY", and the parent concept name is "PLANT". MPU 10 reads the inputted letter strings "COMBUSTIBILITY" and "PLANT", and stores them in the variable storage areas established in the main storage device 14.

MPU 10 checks whether the inputted data identification name is in agreement with the inputted parent concept name (STEP-S71), and if it is in agreement, MPU 10 discontinues the addition of the link-information data since the above-explained Rule (2) is violated.

If the inputted data identification name is not in agreement with the inputted parent concept name, a data string (inputted data string, DS_I) storing the inputted data identification name is extracted (read out), and a data string DS_P (to be sometimes referred to as "parent concept data string" hereinafter) storing the data identification name in agreement with the inputted parent concept name is extracted (read out) (STEP-S72). That is, MPU 10 accesses the data structure stored in the external storage device 18, extracts (reads out) the data string DS_I which has a data identification name stored in its data identification name storage area [Name] and is in agreement with the inputted data identification name (data string of ID number 6 in Example 4) from the data structure, and stores the content of the inputted data string in the variable X of the main storage device 14. Further, MPU 10 accesses the data structure stored in the external storage device 18, extracts (reads out) the data string DS_P having a data identification name which is stored in the data identification name storage area [Name] and is in agreement with the inputted concept name (data string of ID number 7 in Example 4) from the data structure, and stores the content of the parent concept data string in the variable Y of the main storage device 14. The variables X and Y can be structurally the same as the data string. If MPU 10 fails in reading out the data string from the data structure, the retrieval procedure is terminated (STEP-S73). When a plurality of parent concept names indicating a set containing the data identification name are inputted, a plurality of variables Y can be established.

MPU 10 checks whether the link-information data about the parent concept data string DS_P is stored in the parent data storage area of the inputted data string DS_I. Specifically, MPU 10 reads the parent identification number storage area [Parent_ID_X] of the parent data storage area [Parent_X] in the content of the inputted data string of ID number 6 stored in the variable X of the main storage device 14, and checks whether ID number 7 is there in the parent identification number storage area [Parent_ID_X] (STEP-S74). If it is there, the Rule (1) is violated, and the addition of link-information data is discontinued.

If the link-information data about the parent concept data string DS_P is not stored in the parent data storage area of the inputted data string DS_I, MPU 10 conducts the check of Rule (3). That is, on the basis of the link-information data stored in the parent data storage area of the parent concept data string DS_P (ID number 7), a data string is extracted.

Further, on the basis of the link-information data stored in the parent data storage area of the extracted data string, a data string is extracted until the parent data storage area of the extracted data string is empty (STEP-S75). Specifically, on the basis of the data of the parent identification number storage area [Parent_ID_Y] of the parent data storage area [Parent_Y] in the parent concept data string DS_P stored in the variable Y of the main storage device 14, MPU 10 executes the above-explained first retrieving pattern or second retrieving pattern. In this retrieving step, the data strings of ID number 12, ID number 15 and ID number 16 are extracted.

When any one of the data strings extracted in the above retrieval step is in agreement with the inputted data string DS_I (ID number 6), Rule (3) is violated and the addition of the link-information data is therefore discontinued (STEP-S76).

When none of the data strings extracted in the above retrieval step is not in agreement with the inputted data string DS_I, MPU 10 stores the link-information data about the parent concept data string DS_P in the parent data storage area of the inputted data string DS_I (ID number 6) (STEP-S77). That is, MPU 10 stores ID number 7 in the new parent identification number storage area [Parent_ID_X] of the parent data storage area [Parent_X] in the content of the inputted data string DS_I of ID number 6 stored in the variable X of the main storage device 14.

Figure 16:
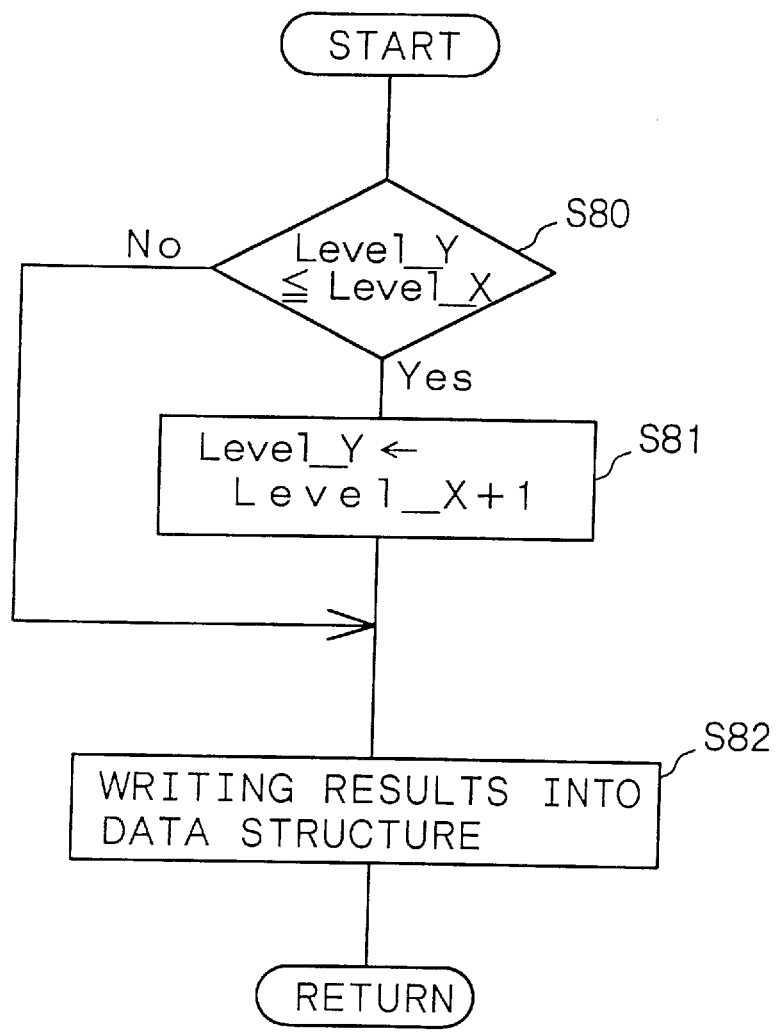
FIG. 16 is a flow chart showing the adjustment of data level value in the link-information adding method in Example 4.

Then, MPU 10 executes the adjustment of the data level value (STEP-S78). That is, as shown in FIG. 16, MPU 10 compares the data level value of the inputted data string DS_I (ID number 6) with the data level value of the parent concept data string DS_P. More specifically, MPU 10 compares the data level value of the data level storage area [Level_X] of the inputted data string DS_I stored in the variable X of the main storage device 14 with the data level value of the data level storage area [Level_Y] of the parent concept data string DS_P stored in the variable Y (STEP-S80). And when the value of the data level storage area (Level_Y)≦the value of the data level storage area [Level_X], MPU 10 stores a value obtained by adding 1 to the value of the data level storage area [Level_X] in the data level storage area [Level_Y] (STEP-S81). In Example 4, the value of the data level storage area [Level_Y] is equal to the value of the data level storage area [Level_X], MPU 10 stores "2" in the data level storage area [Level_Y].

Then, MPU 10 writes the contents of the variables X and Y in the data strings having corresponding ID numbers in the data structure (STEP-S82). As above, the addition of the link-information data for adding new link-information data to the parent data storage area of the data string DS_I is completed.

The data level value of the data string of ID number 7 changes from "1" to "2", whereby the data level value of the data string (ID number 12 in Example 4) storing the data identification name which indicates a set including the data identification name stored in the data string of ID number 7 changes. Further, the data level value of the data strings (data strings of ID number 15 and ID number 16 in Example 4) storing the data identification names which indicate sets including the data identification name stored in the data string of ID number 12 also changes. Therefore, the readjustment of the data level value (STEP-S79) is required in some cases.

In the above case, on the basis of the link-information data stored in the parent data storage area in the data string DS_P storing data identification name corresponding to the parent concept name, a data string is extracted, and on the basis of the link-information data stored in the parent data storage area of the extracted data string, a data string is further extracted until the parent data storage area of the extracted data string is empty. If the data level value in the extracted data string (DS-A) is greater than the data level value in the data string (DS-B) extracted on the basis of the link-information data stored in the parent data storage area of the extracted data string (DS-A), a value obtained by adding 1 to the data level value in the extracted data string (DS-A) is stored in the data level storage area of the data string (DB-B).

For the above purpose, MPU 10 prepares a dynamic array F in the variable storage area and initializes the dynamic array F (STEP-S90). The dynamic array F is composed of an ID number storage area [ID_D] and a data level storage area [Level_D]. MPU 10 stores the ID number (stored in the identification number storage area [ID_Y] of the data string stored in the variable Y of the main storage device 14) and the data level value (stored in the data level storage area [Level_Y]) in the ID number storage area [ID_D] and data level storage area [Level_D] of the dynamic array F (STEP-S91). In Example 4, in this STEP-S91, ID number 7 and data level value 2 are stored in the ID number storage area [ID_D] and the data level storage area [Level_D] of the dynamic array F(0). And, the variable i is set at 0 (STEP-S92).

Then, MPU 10 extracts (reads out) the data string corresponding to the ID number stored in the dynamic array F(i) from the data structure, and stores it in the variable X (STEP-S93). The variable X can be structurally the same as the data string. In STEP-S93, the data string corresponding to ID number 7 is extracted (read out) and stored in the variable X.

Then, MPU 10 checks the parent identification number storage area [Parent_ID_X] of the parent data storage area [Parent_X] in the variable X. If the parent identification number storage area [Parent_ID_X] is empty, MPU 10 moves to STEP-S101 (STEP-S94). If the parent identification number storage area [Parent_ID_X] is not empty, MPU 10 reads out the data string corresponding to ID number stored in the head parent identification number storage area [Parent_ID_X], from the data structure, and then stores the ID number and the data level value of the read-out data string in a variable P_ID and a variable P_Level (STEP-S95). In Example 4, in STEP-S95, the data string corresponding to ID number 12 stored in the head parent identification number storage area [Parent_ID_X] is extracted (read out) from the data structure, and ID number 12 and data level value "2" of the read-out data string are stored in the variables P_ID and P_Level.

When the data level value stored in the variable P_Level is greater than the data level value stored in the data level storage area [Level_D] of the dynamic array F(i) (STEP-S96), MPU 10 moves to STEP-S99. On the other hand, when the data level value stored in the variable P_Level is equal to, or smaller than the data level value stored in the data level storage area [Level_D] of the dynamic array F(i) (STEP-S96), the ID number stored in the variable P_ID and a value obtained by adding 1 to the data level value stored in the data level storage area [Level_D] of the dynamic array (F(i) are added to the ID number storage area [ID_D] and the data level storage area [Level_D] of the end of the dynamic array F (STEP-S97). In Example 4, in STEP-S97, the data level value of "2" stored in the variable P_Level is equal to the data level value stored in the data level storage area [Level_D] of the dynamic array F(0), ID number 12 stored in the variable P_ID and "3" which is a value obtained by adding 1 to the data level value stored in the data level storage area [Level_D] of the dynamic array F(i) are added to the ID number storage area [ID_D] and the data level storage area [Level_D] in the end of the dynamic array F. That is, ID number 12 is stored in the ID number storage area [ID_D] of the dynamic array F(1), and the data level value of "3" is stored in the data level storage area [Level_D] of the dynamic array F(1).

Further, MPU 10 writes a value obtained by adding 1 to the data level value (stored in the data level storage area [Level_D] of the dynamic array F(i)) in the data level storage area [Level_value] of the data string, in the data structure, corresponding to the ID number stored in the variable P_ID (STEP-S98). In Example 4, in STEP-S98, the value "3" obtained by adding 1 to the data level value stored in the data level storage area [Level_D] of the dynamic array F(i) is written in the data level storage area [Level_value] of the data string, in the data structure, corresponding to ID number 12 stored in the variable P_ID.

Then, MPU 10 checks the next parent identification number storage area [Parent_ID_X] of the parent data storage area [Parent_X] in the variable X (STEP-S99). If the parent identification number storage area [Parent_ID_X] is not empty, MPU 10 extracts (reads out) the data string corresponding to the ID number stored in the above next parent identification number storage area [Parent_ID_X] from the data structure, stores the ID number and data level value of the read-out data string in the variables P_ID and P_Level (STEP-S100), and then returns to STEP-S96.

When the above next parent identification number storage area [Parent_ID_X] is empty, MPU 10 increments the value of i by 1 (STEP-S101) and checks whether data is there in the dynamic array F(i). If data is there in the dynamic array F(i), MPU 10 returns to STEP-S93. If no data is there in dynamic array F(i), the readjustment of the data level value is finished.

In Example 4, the next parent identification number storage area [Parent_ID_X] of the variable X is empty, and therefore, MPU 10 increments the value of i by 1 (STEP-S101) and checks whether data is there in the dynamic array F(1) (STEP-S102). Since the dynamic array F(1) has data, MPU 10 returns STEP-S93.

Table 11 shows contents of the dynamic array F, obtained before the readjustment of the data level value is finished. Further, Table 12 shows the result of the readjustment of the data level value in the data structure shown in Table 3.

TABLE 11

| F (i) | P_ID | P_Level |
|---|---|---|
| F (0) | 7 | 2 |
| F (1) | 12 | 3 |
| F (2) | 15 | 4 |
| F (3) | 16 | 4 |

In Example 4, one parent concept name which indicates a set including the data identification name is inputted, while a plurality of parent concept names may be inputted for adding link-information data.

Example 5

Example 5 relates to the data retrieval method directed to the second aspect of the present invention. In Example 5, for a data identification name to be retrieved, a data string corresponding to an element concept and/or an indirect element concept are extracted.

FIG. 19A shows the data string structure in Example 5. The data string is composed of a data

TABLE 12

| | Concept Name Recorded in Data String | | | | Element Concept Name | | |
|---|---|---|---|---|---|---|---|
| ID No. | 4th level | 3rd level | 2nd level | 1st level | 3rd level | 2nd level | 1st level |
| 1 | | | | office supplies | | | |
| 2 | | | | furniture | | | |
| 3 | | | | writing tools | | | |
| 4 | | | | cylindrical form | | | |
| 5 | | | | insulator | | | |
| 6 | | | | combustibility | | | |
| 7 | | | plant | | | | combustibility |
| 8 | | | | specific gravity of 1 or less | | | |
| 9 | | | | conductibility | | | |
| 10 | | | | softness | | | |
| 11 | | | | black color | | | |
| 12 | | wood | | | | plant | insulator combustibility |
| 13 | | | graphite | | | | specific gravity of 4 or less conductubility softness black color |
| 14 | | | mica | | | | insulator |
| 15 | desk | | | | wood | | office supplies furniture |
| 16 | pencil | | | | wood | graphite | office supplies writing tools cylindrical form |
| 17 | | | brush of motor | | | graphite | | identification name area [Name] in which a data identification name is stored, a data level storage area [Level] in which a data level value is stored, and an element data storage area [Element]. The data string further contains an ID number storage area [ID] in which an identification number for identifying the data string is stored. The identification number is characteristic of the data string.

In the data structure in Example 5, the data level storage area [Level] of each data string stores a value of 1, 2 or 3. That is, the data structure in Example 5 is composed of a plurality of first level data strings, a plurality of second level data strings and a plurality of third level data strings.

The element data storage area [Element] of each data string DS_1 stores link-information data about a data string DS_0 storing a data identification name which is an element of a set indicated by the data identification name stored in the data string DS_1. The element data storage area [Element] is composed of a plurality of element identification number storage areas [Element_ID]. Further, the data string DS_0 corresponding to the link-information data stored in the element data storage area [Element] has a smaller data level value than the data string DS_1 containing this element data storage area [Element] has.

When there is an m'-th level data identification name (m'=1, 2, . . . , N-1) which is an element of a set indicated by an m-th level data identification name (m'<m≦N), the link-information data about the m'-th level data string is stored in the element data storage area [Element] of the m-th level data string. Specifically, the identification number of the m'-th level data string DS_0 is stored in the element identification number storage area [Element_ID] of the element data storage area [Element] in the m-th level data string DS_1. The identification number of the m'-th level data string stored in the element identification number storage area [Element_ID] of the element data storage area [Element] in the m-th level data string is link-information data in Example 5.

When the m-th level data string is taken as standard, the m'-th level data string corresponds to an element concept. Further, the data identification name stored in the m'-th level data string corresponds to the above-explained element concept name. On the other hand, when the m'-th level data string is taken as standard, the m-th level data string corresponds to a parent concept. Further, the data identification name stored in the m'-th level data string is taken as standard, the data identification name stored in the m-th level data string corresponds to a parent concept name. Further, the data identification name of the m'-th level data string DS_0 corresponding to the link-information data stored in the element identification number storage area [Element_ID] of element data storage area [Element] in the m-th level data string DS_1 corresponds to an element concept set.

In the data structure in Example 5, specifically, the data identification name corresponding to a concept name and the data level value thereof, and the data identification name corresponding to an element concept name and the data level value thereof are the same as those in the data structure shown in Table 3.

FIG. 19B shows a data string structure of a first level data string indicated by ID number 5 in Table 3. The data identification name in the first level data string is "INSULATOR", and this data identification name is stored in a data identification name storage area [Name] of the data string. Further, a data level storage area [Level_Value] stores "1" which indicates that the data string is a first level data string.

Further, since the first level data string storing the first level data identification name "INSULATOR" has no element contained in a set indicated by the first level data identification name "INSULATOR", nothing is stored in the element identification number storage area [Element_ID] of the element data storage area [Element]. ID numbers 1 to 4 and 6 to 11 which are first level data strings also have similar structures.

FIG. 20A shows a data string structure of a second (=m) level data string indicated by ID number 12 in Table 3. The data identification name as a second level data identification name in the second level data string is "WOOD", and this data identification name is stored in a data identification name storage area [Name] of the data string. Further, a data level storage area [Level_Value] stores "2" which indicates that the data string is a second level data string.

Further, the above second level data string storing the data identification name "WOOD" has m'-th level data identification names (m'=1 in this case) which are elements of a set indicated by the data identification name "WOOD" (specifically, the data strings storing the data identification names "INSULATOR", "COMBUSTIBILITY" and "SPECIFIC GRAVITY OF 1 OR LESS"). Therefore, the identification numbers 5, 6, 7 and 8 of the m'-th level data string storing the above m'-th level data identification names are stored, as link-information data, in the element identification number storage areas [Element_ID] of the element data storage area [Element] in the second level data string indicated by ID number 12.

ID numbers 13 and 14 which are second level data strings also have similar structures.

FIG. 20B shows a specific data string structure of a third (=N) level data string indicated by ID number 15 in Table 3. The data identification name in the third level data string is "DESK", and this data identification name is stored in a identification name storage area [Name] of the data string. Further, a data level storage area [Level_Value] stores "3" which indicates that the data string is a third level data string.

The above third level data string storing the data identification name "DESK" has m'-th level data identification names (m'=1 and 2) which are elements of a set indicated by the data identification name "DESK" (specifically, the data strings storing the data identification names "OFFICE SUPPLIES", "FURNITURE" and "WOOD"). Therefore, identification numbers 1, 2 and 12 of the m'-th level data string storing the above m'-th level data identification name are stored, as link-information data, in the element identification number storage areas [Element_ID] of the element data storage area [Element] in the third level data string indicated by ID number 15.

FIGS. 21A and 21B show specific data string structures of the third level data string and the second level data string indicated by ID number 16 and ID number 14 in Table 3.

For excluding a circulating definition, the element data storage area [Element] of the data string DS_1 does not contain any link-information data (e.g., identification number) about the data string DS_1 itself. Further, the link-information data stored in the element data storage area of the data string DS_1 differ from one another. These correspond to Rules (2) and (1) of the above "Construction Rule of Concept".

Further, when data strings are consecutively traced on the basis of link-information data stored in the element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings. This corresponds to Rule (3') in the above "Construction Rule of Concept".

For example, when ID number 12 which is the link-information data stored in the element identification number storage area [Element_ID] of the element data storage area [Element] in a third level data string DS_1 indicated by ID number 15 is supposed to be arbitrary link-information data, data strings are consecutively traced on the basis of the link-information data stored in the element data storage areas of data strings with the above arbitrary link-information data as a starting point. That is, the data string of ID number 5 is reached on the basis of ID number 5 which is the link-information data stored in the element identification number storage area [Element_ID] of the element data storage area [Element] in the data string of ID number 12. The element identification number storage area [Element_ID] of the element data storage area [Element] in the data string of ID number 5 is empty. Therefore, the data string of ID number 6 is reached on the basis of the link-information data stored in the next element identification number storage area [Element_ID] of the element data storage area [Element] in the data string of ID number 12. The element identification number storage area [Element_ID] of the element data storage area [Element] in the data string of ID number 6 is empty. This is also the case with ID numbers 7 and 8 which are the link-information data stored in other element identification number storage areas [Element_ID] of element data storage area in the data string of ID number 12. In the above procedures, ID number 15 which is the link-information data about the data string DS_1 is included in none of the element data storage areas of the traced data strings (data strings of ID numbers 12, 5, 6, 7 and 8 in the above case).

When the third level data string indicated by ID number 15 is taken as standard, the second level data string of ID number 12 corresponds to an element concept, and the first level data strings of ID numbers 5, 6, 7, and 8 correspond to indirect element concepts. On the other hand, when the first level data string indicated by ID number 5 is taken as standard, the second level data string of ID number 12 corresponds to a parent concept, and the third level data string of ID number 15 corresponds to an indirect parent concept.

Figure 3A:
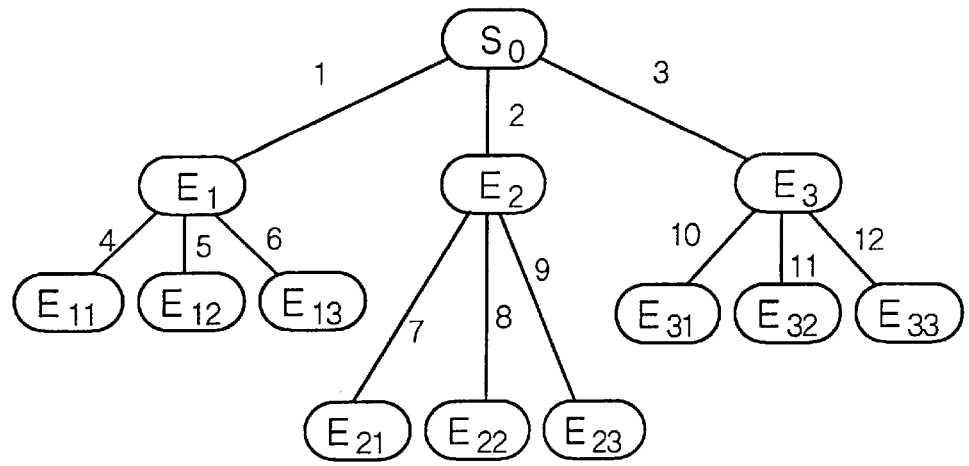
FIGS. 3A and 3B schematically show the third retrieving pattern in the data retrieval method directed to the second aspect of the present invention.
Figure 3B:
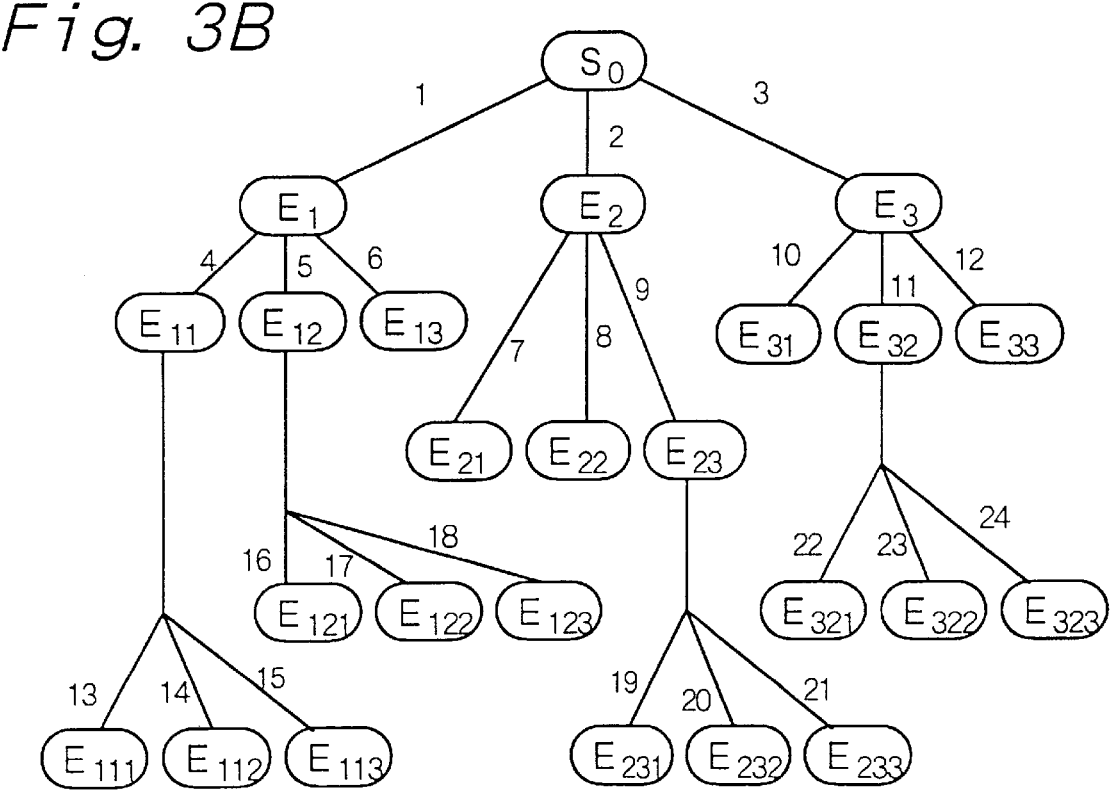

In Example 5, a data identification name to be retrieved is first inputted. Then, a data string is extracted on the basis of link-information data stored in the element data storage area of the data string (inputted data string) whose data identification name storage area stores the inputted data identification name. Further, a data string is extracted on the basis of the link-information data stored in the element data storage area of the extracted data string until the element data storage area of the extracted data string is empty. The data retrieving pattern in the data retrieval method in Example 5 is the third retrieving pattern shown in FIGS. 3A and 3B.

The data retrieval method in Example 5 will be explained with reference to flow charts of FIGS. 22 and 23 hereinafter.

A letter string "DESK" which is a data identification name corresponding to data to be retrieved is inputted through the input unit 12 containing, e.g., a keyboard (STEP-S110). MPU 10 reads the inputted letter string "DESK" and stores it in the variable storage area (not shown) of the main storage device 14. Then, MPU 10 accesses the data structure stored in the external storage device 18, extracts (reads out) the data string having the data identification name which is stored in the data identification name storage area [Name] and is in agreement with the inputted letter string (inputted data string and data string of ID number 15 in Example 5) from the data structure (STEP-S111), and stores the content of the inputted data string in the variable storage area of the main storage device 14. When MPU 10 fails in reading out the data string from the data structure, MPU 10 terminates the retrieval procedure (STEP-S112).

Then, MPU 10 checks the element identification number storage area of the element data storage area of the inputted data string stored in the variable storage area of the main storage device 14, and when the element identification number storage area is empty, MPU 10 terminates the retrieval procedure (STEP-S113). When the element identification number storage area is not empty, MPU 10 prepares a dynamic array D(0) in the variable storage area and initializes the dynamic array D(0) (STEP-S114). The ID number of the data string is stored in the dynamic array D. Then, MPU 10 stores ID number of the inputted data string in the dynamic array D(0) (STEP-S115).

Then, a data string is extracted on the basis of the link-information data stored in the element data storage area of the inputted data string. A data string is further extracted on the basis of the link-information data stored in the element data storage area of the extracted data string until the element data storage area of the extracted data string is empty. Specifically, MPU 10 executes the retrieving process 3 shown in FIG. 23. In the retrieving process 3, the variable i is set at 0 (STEP-S120).

Then, MPU 10 extracts (reads out) the data string corresponding to the ID number stored in the dynamic array D(i) from the data structure and stores it in a variable X (STEP-S121). The variable X can be structurally the same as the data string. Then, MPU 10 checks the element identification number storage area [Element_ID_X] of the element data storage area [Element_ID] in the variable X, and when the element identification number storage area [Element_ID_X] is empty, MPU 10 returns to STEP-S128 (STEP-S122). When the element identification number storage area [Element_ID_X] is not empty, MPU 10 stores ID number (stored in the head element identification number storage area [Element_ID_X]) in a variable EID (STEP-S123).

MPU 10 checks whether the ID number stored in the variable EID is in the dynamic array D (STEP-S124), and if it is there, MPU 10 moves to STEP-S126. On the other hand, if it is not there, MPU 10 adds the ID number stored in the variable EID to the end of the dynamic array D (STEP-S125). Then, MPU 10 checks the next element identification number storage area [Element_ID_X] of the element data storage area [Element_X] in the variable X, and when the element identification number storage area [Element_ID_X] is empty, MPU 10 moves to STEP-S128 (STEP-S126). When the element identification number storage area [Element_ID_X] is not empty, MPU 10 stores ID number (stored in the element identification number storage area [Element_ID_X]) in the variable EID (STEP-S127) and returns to STEP-S124.

In STEP-S128, MPU 10 increments the value of the variable i by 1 and checks whether ID number is stored in the dynamic array D(i), i.e., whether the dynamic array D(i) has data. When ID number is stored in the dynamic array D(i), MPU 10 returns to STEP-S121. When no ID number is stored, MPU 10 terminates the retrieving process 3.

Then, MPU 10 extracts (reads out) the data string corresponding to the ID number stored in the dynamic array D(i), and displays the data identification name stored in the data identification name storage area of the above data string and the data level value stored in the data level storage area, for example, on the display unit 16 (STEP-S117). The data identification name to be retrieved may be displayed or may not be displayed. The retrieval operation ends after the above.

When "DESK" is retrieved, ID numbers are stored in the dynamic array D(i) in the order shown in the following Table 13.

Table 13

D(0): ID number=15
D(1): ID number=1
D(2): ID number=2
D(3): ID number=12
D(4): ID number=5
D(4): ID number=6
D(4): ID number=7
D(4): ID number=8

In Example 5, when "DESK" is inputted as a data identification name to be retrieved, as explained above, "OFFICE SUPPLIES" and "FURNITURE" which are first level data strings and "WOOD" which is a second level data string, as elements of a set indicated by "DESK", are extracted, and moreover, "INSULATOR", "COMBUSTIBILITY", "PLANT" and "SPECIFIC GRAVITY OF 1 OR LESS" which are first level data strings as elements of a set indicated by "WOOD" can be extracted. That is, it can be concluded that "DESK" includes "INSULATOR", "COMBUSTIBILITY", "PLANT" and "SPECIFIC GRAVITY OF 1 OR LESS" as indirect element concepts, without inputting elements such as "INSULATOR", etc.. Table 14 shows the retrieval results. For a reference purpose, element concept or indirect element concept is given after the data level values.

Table 14

| Data identification name of extracted data string | Data level value | Classification of concepts |
| --- | --- | --- |
| OFFICE SUPPLIES | 1 | element concept |
| FURNITURE | 1 | element concept |
| WOOD | 2 | element concept |
| INSULATOR | 1 | indirect element concept |
| COMBUSTIBILITY | 1 | indirect element concept |
| PLANT | 1 | indirect element concept |
| SPECIFIC GRAVITY OF 1 OR LESS | 1 | indirect element concept |

In Example 5, the third level data identification name is an object to be retrieved, while a second level data identification name to an N-th level data identification name can be an object to be retrieved. Example 5 has used the third retrieving pattern, while the fourth retrieving pattern may be used in place thereof.

Example 6

Example 6 is also concerned with the data retrieval method directed to the second aspect of the present invention. In Example 5, the number of the data identification name to be retrieved is one, while a plurality of data identification names are retrieved in Example 6. The data retrieval method explained in Example 5 is executed with each of data identification names to be retrieved. And, the number of the data identification names to be retrieved with regard to each of the extracted data strings are outputted. That is, Example 6 is concurred with the data retrieval method of the scrap method.

Specifically, Example 6 will be explained using the data structure explained in Example 5. Example 6 also uses the third retrieving pattern as that used in Example 5, while the fourth retrieving pattern may be used. The number of the data identification names to be retrieved is two, that is, "DESK" and "PENCIL" are to be retrieved. The data identification names to be retrieved may have the same data level values or may have different data level values. The data retrieval method in Example 6 will be explained with reference to flow charts of FIGS. 24 and 14.

Figure 24:
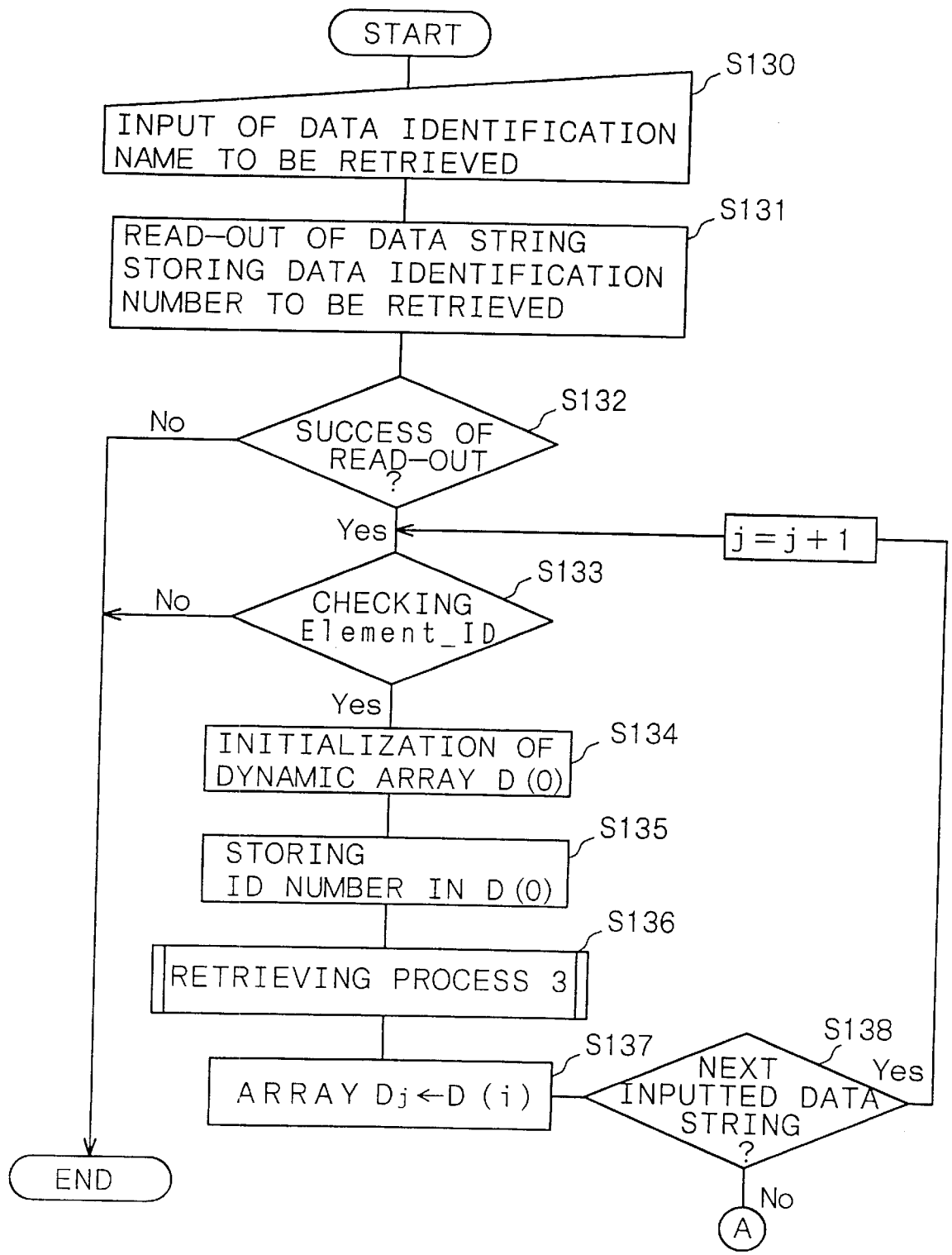
FIG. 24 is a flow chart showing the data retrieval method in Example 6.

As shown in FIG. 24, letter strings "DESK" and "PENCIL" are inputted through the input unit 12 containing, e.g., a keyboard (STEP-S130). MPU 10 reads the inputted letter strings "DESK" and "PENCIL" and stores them in the variable storage areas (not shown) of the main storage device 14. Then, MPU 10 substitutes "1" in the variable j, accesses the data structure stored in the external storage device 18, extracts (reads out) the data string having a data identification name which is stored in the data identification name storage area [Name] of the data string (data string of ID number 15 in Example 6) and is in agreement with the inputted letter string (first inputted data string) from the data structure, and stores the content of the data string in the variable storage area of the main storage device 14. MPU 10 conducts the above procedure as many times as the number of the inputted data identification names. That is, in Example 6, MPU 10 accesses the data structure stored in the external storage device 18, extracts (reads out) the data string of ID number 16 (second inputted data string) and stores the content of the data string in the variable storage area of the main storage device 14 (STEP-S131). When MPU 10 fails in reading out the data string from the data structure, MPU 10 terminates the retrieval procedure (STEP-S132). Then, MPU 10 checks the element identification number storage areas of the element data storage areas of all of the data strings stored in the variable storage area of the main storage device 14, and when the element identification number storage areas of all the data strings are empty, MPU 10 terminates the retrieval procedure (STEP-S133).

On the other hand, when the element identification number storage area of any data string is not empty, MPU 10 prepares the dynamic array D(0) in a variable storage area and initializes the dynamic array D(0) (STEP-S134). The dynamic array D is to store ID number of the data string. Then, MPU 10 stores ID number 15 of the first inputted data string which is one of the data strings stored in the variable storage area of the main storage device 14 and has the data identification name to be retrieved first, in the dynamic array D(0) (STEP-S135).

Then, on the basis of the link-information data stored in the element data storage area of the first inputted data string, a data string is extracted, and on the basis of the link-information data stored in the element data storage area of the extracted data string, a data string is further extracted until the element data storage area of the extracted data string is empty. Specifically, MPU 10 executes the same retrieving process 3 as that in Example 5 (STEP-S136).

Then, MPU 10 prepares an array $D_j$ (=$D_1$), copies the content of the dynamic array D(i) to the array $D_j$(i) and discards the dynamic array D(i) (STEP-S137). Then, MPU 10 checks whether the next inputted data string is stored in the variable storage area of the main storage device 14 (STEP-S138). When the next inputted data string is not stored in the variable storage area of the main storage device 14, MPU 10 moves to STEP-S50 (see FIG. 14). Table 15 shows the contents of $D_1$.

Table 15

$D_1(0)$: ID number=15
$D_1(1)$: ID number=1
$D_1(2)$: ID number=2
$D_1(3)$: ID number=12
$D_1(4)$: ID number=5
$D_1(5)$: ID number=6
$D_1(6)$: ID number=7
$D_1(7)$: ID number=8

When the next inputted data string is stored in the variable storage area of the main storage device 14, MPU 10 increments the variable j by 1 and returns to STEP-S134. That is, MPU 10 again prepares a dynamic array D(0) in the variable storage area and initializes the dynamic array D(0) (STEP-S134). Then, MPU 10 stores ID number 16 of the second inputted data string in the dynamic array D(0) (STEP-S135).

Then, on the basis of the link-information data stored in the element data storage area of the second inputted data string, a data string is extracted, and on the basis of the link-information data stored in the element data storage area of the extracted data string, a data string is further extracted until the element data storage area of the extracted data string is empty. Specifically, MPU 10 executes the same retrieving process 3 as that in Example 5 (STEP-S136).

Then, MPU 10 prepares an array $D_j$ (=$D_2$), copies the content of the dynamic array D(i) to the array $D_2$ and discards the dynamic array D(i) (STEP-S137). Table 16 shows the contents of $D_2$.

Table 16

$D_2(0)$: ID number=16
$D_2(1)$: ID number=1
$D_2(2)$: ID number=3
$D_2(3)$: ID number=4
$D_2(4)$: ID number=12
$D_2(5)$: ID number=13
$D_2(6)$: ID number=5
$D_2(7)$: ID number=6
$D_2(8)$: ID number=7
$D_2(9)$: ID number=8
$D_2(10)$: ID number=9
$D_2(11)$: ID number=10
$D_2(12)$: ID number=11

Then, MPU 10 checks whether the next inputted data string is stored in the variable storage area of the main storage device 14 (STEP-S138). In Example 6, no next data string is stored in the variable storage area of the main storage device 14, and MPU 10 therefore moves to STEP-S50 (see FIG. 14). Since the procedures in STEP-S50 to STEP-S60 are the same as those in Example 3, the detailed explanation thereof is omitted. Table 17 shows a sample display shown after the procedures in the above steps are completed. For a reference purpose, the inputted data identification names for the retrieval are given after the hit number of the inputted data strings. In Table 17, the hit numbers of the inputted data strings are sorted in the descending order.

TABLE 17

| Data identification name of extracted data string | Hit number of inputted data strings | Date identification name to be retrieved |
|---|---|---|
| OFFICE SUPPLIES | 2 | DESK/ PENCIL |
| WOOD | 2 | DESK/ PENCIL |
| INSULATOR | 2 | DESK/ PENCIL |
| COMBUSTIBILITY | 2 | DESK/ PENCIL |
| PLANT | 2 | DESK/ PENCIL |
| SPECIFIC GRAVITY OF 1 OR LESS | 2 | DESK/ PENCIL |
| FURNITURE | 1 | DESK |
| WRITING TOOLS | 1 | PENCIL |
| CYLINDRICAL | 1 | PENCIL |
| GRAPHITE | 1 | PENCIL |
| CONDUCTIBILITY | 1 | PENCIL |
| BLACK COLOR | 1 | PENCIL |
| SOFTNESS | 1 | PENCIL |

In Example 6, the number of the data identification names to be retrieved is outputted with regard to each of the extracted first level data string and second data string. It can be determined in advance by inputting a data level value through the input unit 12 whether the number of the data identification names to be retrieved is outputted with regard to each of the extracted data strings having the inputted data level value.

In the above scrap method, the value stored in the count area [Count_R] of the dynamic array R (the hit number of the inputted data strings) shows how many inputted data identification names are included or related to each of the extracted data strings. For example, the value (the hit number of the inputted data strings) about the first level data string having "INSULATOR" as a data identification name is "2", which means that two of the inputted data identification names to be retrieved directly or indirectly include the first level concept name "INSULATOR".

The above "directly included" means that a concept expressed by the data identification name to be retrieved is a parent concept of an extracted concept. The above "indirectly included" means that a concept expressed by the data identification name to be retrieved is an indirect parent concept of an extracted concept. Specifically, the third level concept name "DESK" directly includes the first level concept name "OFFICE SUPPLIES". On the other hand, the third level concept names "DESK" indirectly includes the first level concept name "INSULATOR".

The extracted data string directly or indirectly including all of data identification names to be retrieved corresponds to the result of the conventional retrieval using the retrieval condition of "AND" for connecting the data identification names to be retrieved. In Example 6, two data identification names are retrieved. It can be therefore easily found, on the basis of reading the data identification name showing that the hit number of the inputted data strings is "2", which is an element concept (or an indirect element concept) common to the two concepts to be retrieved.

The extracted data string directly or indirectly including at least one of data identification names to be retrieved corresponds to the result of the conventional retrieval using the retrieval condition of "OR" for connecting the data identification names to be retrieved. In Example 6, two data identification names are retrieved. It can be therefore easily found, on the basis of reading the data identification name showing that the hit number of the inputted data strings is "1", which is an element concept (or an indirect element concept) uncommon to the two concepts to be retrieved. As described above, differing from a conventional data retrieval method, the data retrieval method of the present invention makes it possible to easily find how many inputted data identification names are related to each of the extracted data strings.

In Example 6, the data identification names stored in the third level data string are objects to be retrieved, while, although depending upon the value of level N, the objects to be retrieved may be a combination of data identification names stored in the second level data string to the N-th level data string.

Example 7

Example 7 is concerned with the link-information adding method directed to the second aspect of the present invention. In Example 7, the data strings in the data structure and the data stored in the data strings are structurally the same as those in Example 5. The link-information adding method in Example 7 will be explained with reference to flow charts of FIGS. 25 and 26 hereinafter.

In Example 7, the data structure of the external storage device 18 additionally contains, as a first level data string, a new data string of ID number 18 having a data identification name of "MOTOR".

Figure 25:
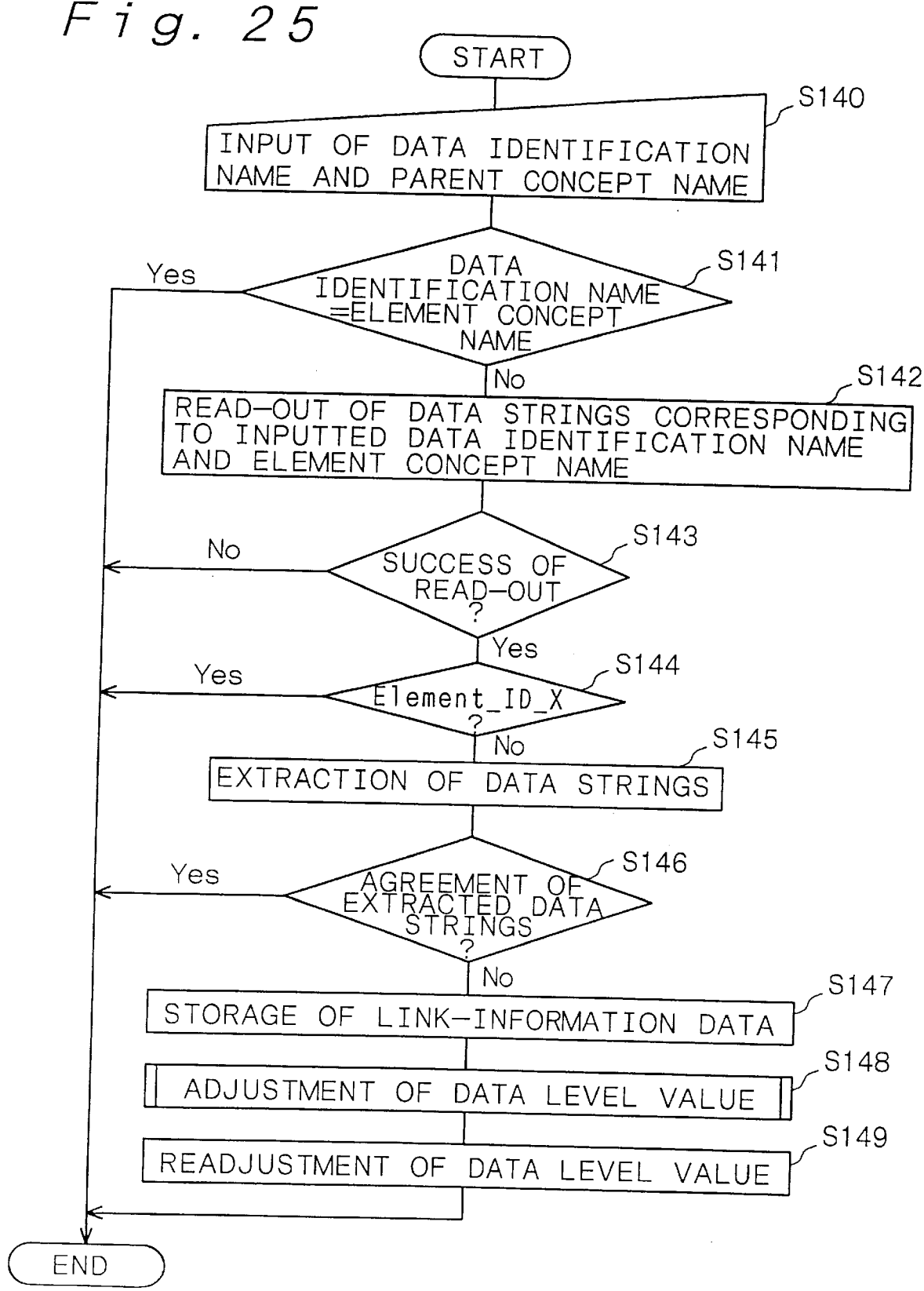
FIG. 25 is a flow chart showing the link-information adding method in Example 7.

As shown in FIG. 25, first, a data identification name is inputted through the input unit 12 containing, e.g., a keyboard, and an element concept name which is an element of a set indicated by the above data identification name is also inputted (STEP-S140). In Example 7, the data identification name is "MOTOR", and the element concept name is "BRUSH OF MOTOR". MPU 10 reads the inputted letter strings "MOTOR" and "BRUSH OF MOTOR" and stores them in the variable storage areas established in the main storage device 14. MPU 10 checks whether the inputted data identification name is in agreement with the element concept name (STEP-S141), and when the agreement is there, the addition of the link-information data is canceled since the above Rule (2) is violated.

When the inputted data identification name is not in agreement with the inputted element concept name, a data string storing the inputted data identification name (inputted data string, DS_I) is extracted. That is, MPU 10 accesses the data structure stored in the external storage device 18, extracts (reads out) the data string DS_I having a data identification name which is stored in the data identification name storage area [Name] of the data string and which is in agreement with the inputted data identification name (data string of ID number 18 in Example 7) from the data structure (STEP-S142), and stores the content of the inputted data string DS_I in a variable X of the main storage device 14. MPU 10 also accesses the data structure stored in the external storage device 18, extracts (reads out) the data string DS_E having a data identification name which is stored in the data identification name storage area [Name] and which is in agreement with the inputted element concept name (data string of ID number 17 in Example 7) from the data structure (STEP-S 142), and stores the content of the above data string DS_E (to be sometimes referred to as "element concept data string⇒ in a variable Y of the main storage device 14. The variables X and Y can be structurally the same as that of the data string. When MPU 10 fails in reading out the data string from the data structure, MPU 10 terminates the retrieval procedure (STEP-S143). As explained above, the data string storing the inputted data identification name is extracted, and the data string storing the data identification name in agreement with the inputted element concept name can be extracted. When a plurality of element concept names which are elements of a set indicated by the data identification name are inputted, a plurality of variables Y can be established.

Then, MPU 10 checks whether the link-information data about the element concept data string DS_E is stored in the element data storage area of the inputted data string DS_I. Specifically, MPU 10 reads out the element identification number storage area [Element_ID_X] of the element data storage area [Element_X] in the content of the inputted data string DS_I of ID number 18 stored in the variable X of the main storage device 14, and checks whether ID number 17 is there in the element identification number storage area [Element_ID_X] (STEP-S144). If it is there, Rule (1) is violated, and the addition of the link-information data is discontinued.

When the link-information data about the element concept data string DS_E is not stored in the element data storage area of the inputted data string DS_I, MPU 10 conducts checks of Rule (3'). That is, a data string is extracted on the basis of the link-information data stored in the element data storage area of the element concept data string DS_E (ID number 17), and a data string is further extracted on the basis of the link-information data stored in the element data storage area of the extracted data string until the element data storage area of the extracted data string is empty (STEP-S145). Specifically, on the basis of the element identification number storage area [Element_ID_Y] of the element data storage area [Element_Y] in the element concept data string stored in the variable Y of the main storage device 14, MPU 10 executes the already explained third retrieving pattern or fourth retrieving pattern. In the above retrieval step, the data strings of ID numbers 13, 9, 10 and 11 are extracted.

When any one of the data strings extracted in the above retrieval step is in agreement with the inputted data string DS_I (ID number 18), Rule (3') is violated, and therefore, the addition of the link-information data is discontinued (STEP-S146).

When none of the data strings extracted in the above retrieval step is in agreement with the inputted data string DS_I, ID number 17 which is the link-information data about the element concept data string DS_E is stored in the element data storage area of the inputted data string DS_I (STEP-S147). That is, MPU 10 stores ID number 17 in a new parent identification number storage area [Element_ID_X] of the element data storage area [Element_X] in the content of the inputted data string of ID number 18 stored in the variable X of the main storage device 14.

Figure 26:
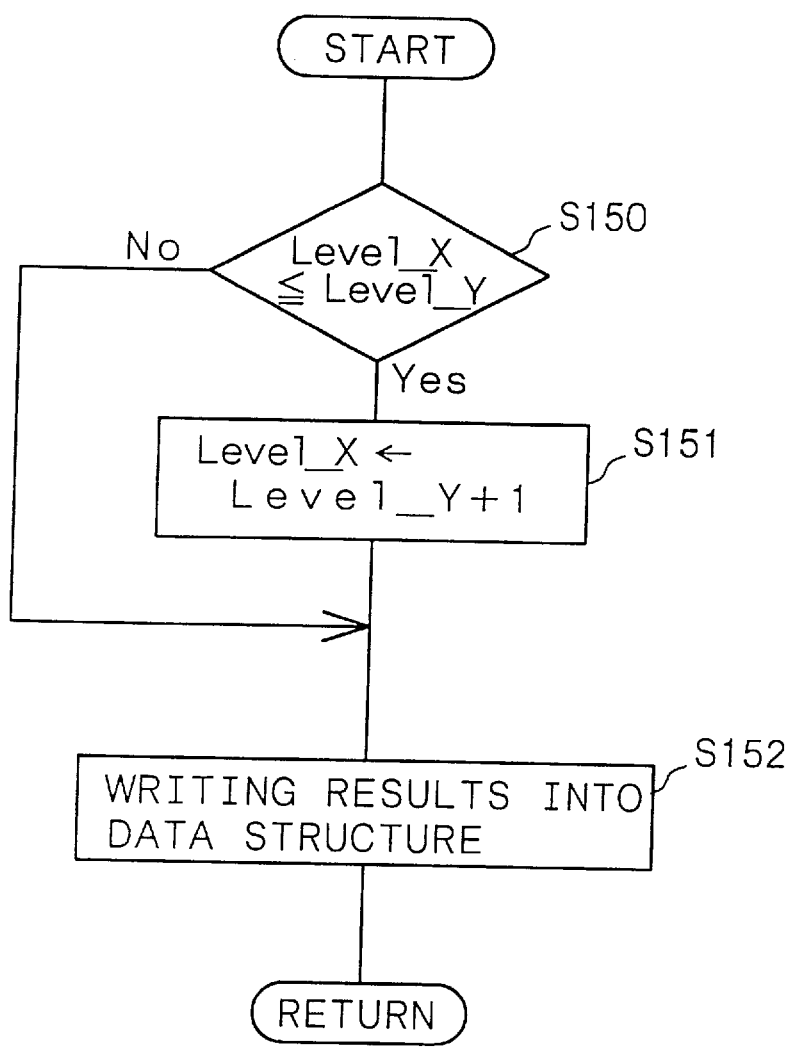
FIG. 26 is a flow chart showing the adjustment of data level value in the link-information adding method in Example 7.

Then, MPU 10 executes the adjustment procedure of the data level value in STEP-S148. That is, as shown in FIG. 26, MPU 10 compares the data level value of the inputted data string DS_I (ID number 18) with the data level value of the element concept data string DS_E. More specifically, MPU 10 compares the value of the data level storage area [Level_X] of the inputted data string stored in the variable X of the main storage device 14 with the value of the data level storage area [Level_Y] of the element concept data string stored in the variable Y (STEP-S150). If the value of the data level storage area [Level_X]≦the value of the data level storage area [Level_Y], MPU 10 stores a value obtained by adding 1 to the value of the data level storage area [Level_Y] in the data level storage area [Level_X] (STEP-S151). Since the value of data level storage area [Level_X](=1) <the value of data level storage area [Level_Y](=2) in Example 7, MPU 10 stores "3" in the data level storage area [Level_X].

Then, MPU 10 writes the contents of the variables X and Y in the data strings of the corresponding ID numbers in the data structure (STEP-S152). The link-information addition for adding new link-information data to the element data storage area of the data string is so completed.

The change of the data level value of the data string of ID number 18 from "1" to "3" also causes a change in the data level value of the data string storing the data identification name which indicates a set including the data identification name stored in the data string of ID number 18. It is therefore sometimes required to readjust the data level value (STEP-S149), although there is no such data string in Example 7.

In the above case, there are extracted all of data strings having a greater data level value than the data level value which is not yet adjusted in the inputted data string DS_I. With regard to the extracted data strings (called starting data strings), each data string is extracted on the basis of the link-information data stored in the element data storage area of the data string according to the third retrieving pattern or the fourth retrieving pattern, and the data strings are further extracted on the basis of the link-information data stored in the element data storage area of the extracted data string until the element data storage area of the extracted data string is empty or until the link-information data about the inputted data string DS_I is found in the element data storage area of the extracted data string. And, if the link-information data about the inputted data string DS_I is there in the extracted data string, the starting data strings and a series of the data strings extracted from the starting data strings are stored. On the other hand, if the link-information data about the inputted data string DS_I is there in the extracted data string, the above starting data strings are discarded.

Then, the data level values of the starting data strings and a series of the data strings extracted from the above starting data strings are readjusted on the basis of the adjusted data level value of the inputted data string DS_I. That is, if the data level value of a data string (DS-C) is equal to, or smaller than, the maximum value of the level values of the data extracted strings (DS-D) on the basis of the link-information data stored in the element data storage area of the data string (DS-C), a value obtained by adding 1 to the maximum value of the level values of the extracted data strings (DS-D) is stored in the data level value of the data string (DS-c). The above procedure can be conducted on the basis of the starting data string in the order of from the last data string to the first data string in a series of the extracted data strings, further, up to the starting data string.

The number of the inputted element concept name which is an element of a set indicated by the data identification name is one, while a plurality of element concept names can be inputted for adding link-information data.

Example 8

Example 8 is concerned with the data retrieval method directed to the third aspect of the present invention. In Example 8, with regard to a data identification name to be retrieved, there is extracted at least one of a data string corresponding to a parent concept, a data string corresponding to an indirect parent concept, a data string corresponding to an element concept and a data string corresponding to an indirect element concept. The data structure in Example 8 is as shown in Table 12.

FIG. 27 shows the structure of a data string having each level. The data string in Example 8 differs from the data string in Examples 1 and 5 in that the data string in Example 8 has a parent data storage area [Parent] and an element data storage area [Element]. That is, the data string in Example 8 is composed of an identification number storage area [ID], a data identification name storage area [Name], a data level storage area [Level], a parent data storage area [Parent] and an element data storage area [Element]. The parent data storage area [Parent] is composed of a plurality of parent identification number storage areas [Parent_ID], and the element data storage area [Element] is composed of a plurality of element identification number storage areas [Element_ID]. In Example 8, N=4.

The parent data storage area [Parent] of a data string DS_1 contains link-information data about a data string DS_2 which indicates a set including the data identification name stored in the data string DS_1. Further, the data string DS_2 corresponding to the link-information data stored in the parent data storage area [Parent] of the data string DS_1 has a greater data level value than the data string DS_1 including the parent data storage area [Parent] has.

When there is an M'-th level data identification name (M'=M+1, M+2, . . . , N) which indicates a set including an M-th level data identification name (1≦M<M'), the link-information data about the m'-th level data string DS_2 is stored in the parent data storage area [Parent] of the M-th level data string DS_1. Specifically, the identification number of the M'-th level data string DS_2 is stored in the parent identification number storage area [Parent_ID] of the parent data storage area [Parent] in the m-th level data string DS_1, as link-information data in Example 8.

For excluding a circulating definition as explained in Example 1, the parent data storage area [Parent] of the data string DS_1 does not contain any link-information data (e.g., identification number) about the data string DS_1 itself. Further, the link-information data stored in the parent data storage areas of the data string DS_1 differ from one another. These points correspond to Rules (1) and (2) in the already explained "Construction Rule of Concept".

Further, when data strings are consecutively traced on the basis of the link-information data stored in the parent data storage areas of a data strings, with an arbitrary link-information data in the parent data storage area of the data string DS_1 as a starting point, until the parent data storage area of the any traced data string is empty, the link-information data about the data string DS_1 is contained in none of the parent data storage areas of the traced data strings. This point corresponds to Rule (3) in the already explained "Construction Rule of Concept".

The element data storage area [Element] of each data string DS_1 stores link-information data about a data string DS_0 storing the data identification name which is an element of a set indicated by the data identification name stored in the data string DS_1. Further, the data string DS_0 corresponding to the link-information data stored in the element data storage area [Element] has a smaller data level value than the data string DS_1 containing the element data storage area [Element] has.

When there is an m'-th level data identification name (m'=1, 2, ..., N−1) which indicates an element of a set indicated by an m-th level data identification name (m'<m≦N), the link-information data about the m'-th level data string DS_0 is stored in the element data storage area [Element] of the m-th level data string DS_1. Specifically, the identification number of the m'-th level data string DS_0 is stored in the element identification number storage area [Element_ID] of the element data storage area [Element] in the m-th level data string DS_1, as link-information data in Example 8.

For excluding a circulating definition as explained in Example 5, the link-information data (e.g., identification number) about the data string DS_1 itself is not contained in the element data storage area [Element] of the data string DS_1. Moreover, the link-information data stored in the element data storage area of the data string DS_1 differ from one another. These points correspond to Rules (1) and (2) of the already explained "Construction Rule of Concept".

Further, when data strings are consecutively traced on the basis of the link-information data stored in the element data storage areas of the data strings, with an arbitrary link-information data stored in the element data storage area of the data string DS_1 as a starting point, until the element data storage area of the traced data string is empty, the link-information data about the data string DS_1 is contained in none of the element data storage areas of the traced data strings. This point corresponds to Rule (3') of the already explained "Construction Rule of Concept".

Example 8 will be explained with reference to the data structure shown in Table 12.

FIG. 28 shows a data string structure of a first level data string indicated by ID number 5 in Table 12. The first level data identification name in the above first level data string is "INSULATOR", and the data identification name is stored in the data identification name storage area [Name] of the data string. Further, the data level storage area [Level] stores "1" which indicates that the data string is a first level data string.

Further, since there are M'-th level data identification names (M'=2 or 3 in Example 8) which indicate a set including the M-th (=1) level data identification name "INSULATOR" (specifically, second and third level data identification names "WOOD" and "MICA"), the link-information data about the identification numbers 12 and 14 of the M'-th level data strings storing the above M'-th level data identification names (corresponding to link-information data about a parent concept) are stored in the parent identification number storage areas [Parent_ID] of the parent data storage area [Parent] in the first level data string indicated by ID number 5. Since the data string indicated by ID number 5 is a first level data string, nothing is stored in the element identification number storage area [Element_ID] of its element data storage area [Element]. ID numbers 1 to 4 and 6 to 11 which are first level data strings also have the same structure. Some M-th level data strings have no M'-th level data identification name indicating a set which includes the M-th level data identification name. In this case, nothing is stored in the parent identification number storage area [Parent_ID] of the parent data storage area [Parent] in the M-th level data string.

FIG. 29 shows a data string structure of a third (=M) level data string indicated by ID number 12 in Table 12. The third level data identification name in the above third level data string is "WOOD", and this data identification name is stored in the data identification name storage area [Name] of the data string. Further, the data level storage area [Level] stores "3" which indicates that the data string is a third level data string.

Further, the above third level data string storing the third level data identification name "WOOD" has the M'-th level data identification name (M'=4 in Example 8) indicating a set which includes the above third level data identification name (specifically, 4th level data identification names "DESK" and "PENCIL"), the ID numbers 15 and 16 of the M'-th level data strings storing these M'-th level data identification names (corresponding to link-information data about a parent concept) are stored in the parent identification number storage areas [Parent_ID] of the parent data storage area [Parent] in the third level data string indicated by ID number 12.

In the third level data string storing the third level data identification name, further, the link-information data about the first and second level data strings storing the first and second (=m') level data identification names as elements of a set indicated by the third level data identification name is stored in the element data storage area [Element] of the data string. Specifically, identification numbers 5, 6 and 8 of the first level data string storing the first level data identification name and identification number 7 of the second level data string storing the second level data identification name (corresponding to link-information data about an element concept) are stored in the element identification number storage areas [Element_ID] of the element data storage area [Element] in the third level data string indicated by ID number 12.

ID numbers 13, 14 and 17 which are second and third level data strings also have similar structures.

FIG. 30 shows a data string structure of a 4-th level data string indicated by ID number 15 in Table 12. The above 4-th level data identification name is "DESK", and the data identification name is stored in the data identification name storage area [Name] of the data string. Further, the data level storage area [Level] stores "4" which indicates that the data string is a 4th level data string.

In the 4th level data string storing the 4th (=N) level data identification name, the link-information data about the third level data string storing the third (=N−1) level data identification name as an element of a set indicated by the 4th level data identification name is stored in the element data storage area [Element]. Further, the link-information data about an L'-th level data string storing an L'-th level data identification name (L'=1, 2, ..., N−1, and L'=1, 2 in the data string of ID number 15) as an element of a set indicated by the 4th level data identification name is stored in the element data storage area [Element]. Specifically, identification number 12 of the third level data string storing the third level data identification name (corresponding to link-information data about an element concept) and identification number 1 and 2 of the first level data string storing the first level data identification name (corresponding to link-information data about an element concept) are stored in the element identification number storage areas [Element_ID] of the element data storage area [Element] in the 4th level data string indicated by ID number 15.

ID number 16 which is a 4th level data string also has a similar structure. Since the data string has a maximum level of 4 in Example 8, nothing is stored in the parent identification number storage area [Parent_ID] of the parent data storage area [Parent] in the 4th level data string.

FIGS. 31 and 32 show data string structures of the second level data string and the 4th level data string indicated by ID numbers 14 and 16 in Table 12.

Figure 4:
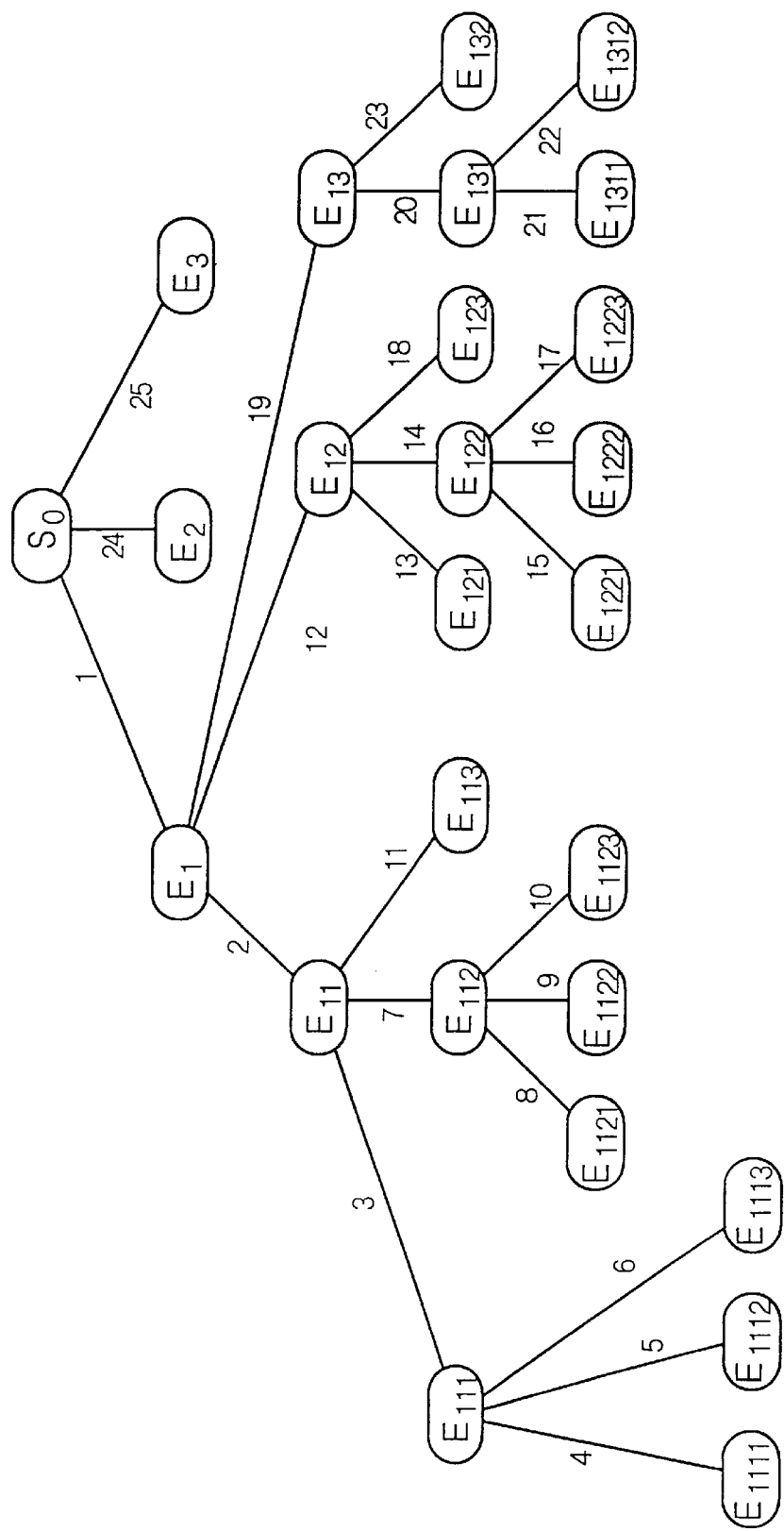
FIG. 4 schematically shows the fourth retrieving pattern in the data retrieval method directed to the second aspect of the present invention.

In the data retrieval method in Example 8, first a data identification name to be retrieved is inputted. Then, a data string is extracted on the basis of the link-information data stored in the parent data storage area of the data string whose data identification name storage area stores the inputted data identification name, and a data string is further extracted on the basis of the link-information data stored in the parent data storage area of the extracted data string until the parent data storage area of the extracted data string is empty. The above data retrieval can be conducted by means of the first retrieving pattern shown in FIGS. 1A and 1B and explained in Example 1 or the second retrieving pattern shown in FIG. 2 and explained in Example 2. A data string is also extracted on the basis of the link-information data stored in the element data storage area of the data string whose data identification name storage area stores the inputted data identification name, and a data string is further extracted on the basis of the link-information data stored in the element data storage area of the extracted data string until the element data storage area of the extracted data string is empty. The above data retrieval can be conducted by means of the third retrieving pattern shown in FIGS. 3A and 3B and explained in Example 5 or the fourth retrieving pattern shown in FIG. 4. Then, the extracted data strings are outputted. The data retrieval method can be the same as those in Examples 1, 2 and 5 and its detailed explanation is therefore omitted.

For example, when the data to be retrieved is "WOOD", results shown in Table 18 can be obtained.

TABLE 18

| Data identification name of extracted data string | Data level value | Classification of concept |
|---|---|---|
| DESK | 4 | parent concept |
| PENCIL | 4 | parent concept |
| INSULATOR | 1 | element concept |
| COMBUSTIBILITY | 1 | element concept |
| PLANT | 2 | element concept |
| GRAVITY OF 1 OR LESS | 1 | element concept |

"COMBUSTIBILITY" is an element concept of "PLANT" and corresponds to an indirect element concept of "WOOD", while it does not show in the retrieval results on the basis of the step explained in STEP-S124.

For example, when the data to be retrieved is "PLANT", results shown in Table 19 can be obtained.

TABLE 19

| Data identification name of extracted data string | Data level value | Classification of concept |
|---|---|---|
| WOOD | 3 | parent concept |
| DESK | 4 | indirect parent concept |
| PENCIL | 4 | indirect parent concept |
| COMBUSTIBILITY | 1 | element concept |

In Example 8, the data retrieval method can be carried out according to the scrap method explained in Example 3 or Example 6. For example, when the data to be retrieved are "WOOD" and "MICA", results shown in Table 20 can be obtained.

TABLE 20

| Data identification name of extracted data string | Hit number of inputted data strings |
|---|---|
| DESK | 1 |
| PENCIL | 1 |
| INSULATOR | 2 |
| COMBUSTIBILITY | 1 |
| PLANT | 1 |
| SPECIFIC GRAVITY OF 1 OR LESS | 1 |

Example 9

Example 9 is concerned with the data retrieval method directed to the fourth aspect of the present invention. In Example 9, the data string structure in the data structure and various data stored in the data strings are the same as those in Example 8.

In the data retrieval method in Example 9, first, a data identification name to be retrieved is inputted. Then, a data string is extracted on the basis of the link-information data stored in the element data storage area of the data string whose data identification name storage area stores the inputted data identification name, and a data string is further extracted on the basis of the link-information data stored in the element data storage area of the extracted data string until the element data storage area of the extracted data string is empty. The above data retrieval can be carried out by means of the third retrieving pattern shown in FIGS. 3A and 3B or the fourth retrieving pattern shown in FIG. 4.

Then, a data string is extracted on the basis of the link-information data stored in the parent data storage area of the data string whose element data storage area is empty from among the data strings extracted in the above step, and a data string is further extracted on the basis of the link-information data stored in the parent data storage area of the extracted data string until the parent data storage area of the extracted data string is empty. Then, the so-extracted data string is outputted. The above data retrieval can be carried out by means of the first retrieving pattern shown in FIGS. 1A and 1B and explained in Example 1 or the second retrieving pattern shown in FIG. 2 and explained in Example 2.

Figure 22:
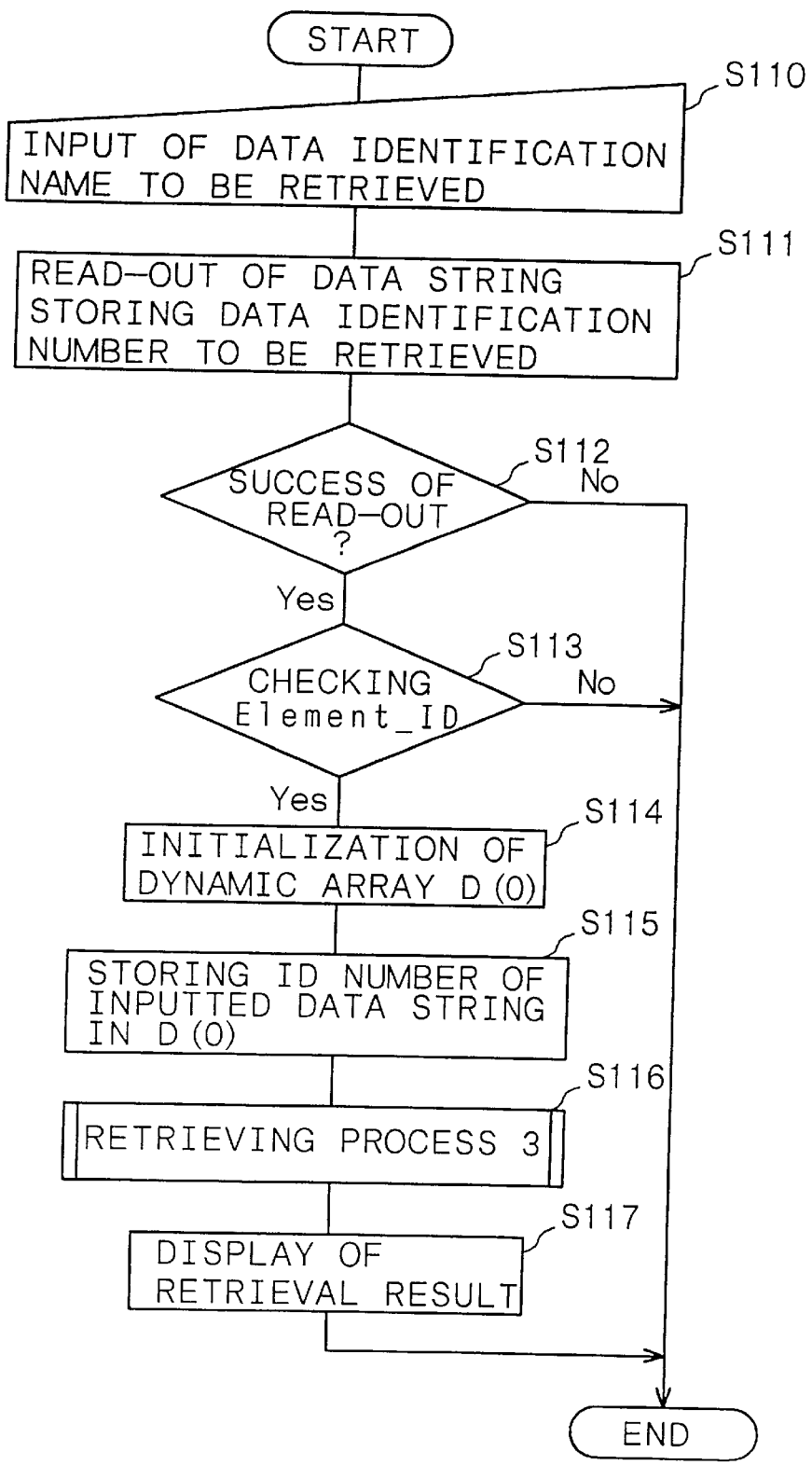
FIG. 22 is a flow chart showing the data retrieval method in Example 5.
Figure 23:
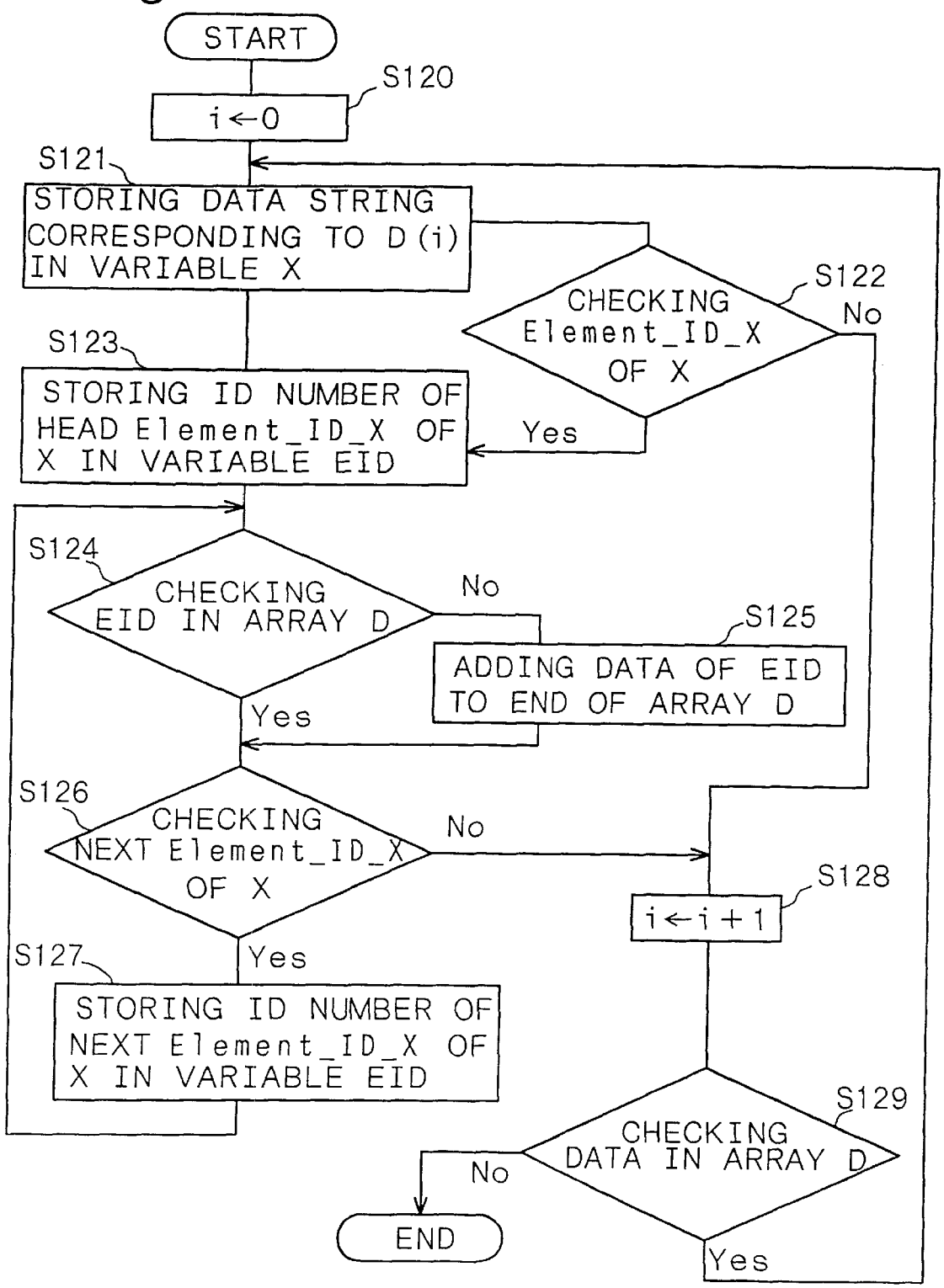
FIG. 23 is a flow chart showing the retrieving process-3 in the data retrieval method in Example 5.

Specifically, for evaluating the data string as to whether or not the element data storage area is empty, it is sufficient to use a dynamic array D' which is to store not only ID number in the dynamic array D explained in Example 5 but also a data level value (see FIGS. 22 and 23). And, the retrieving pattern 3 explained in Example 5 is completed, and then a new dynamic array D' composed of the dynamic array D(0) and a data level value of "1" is formed. Then, with the data identification name corresponding to the ID number stored in the above new dynamic array D' is used as a data identification name to be retrieved, for example, the retrieving process 1 (see FIG. 9) explained in Example 1 is executed. And, a data string corresponding to the ID number stored in the dynamic array D'(i) is extracted (read out) from the data structure in the same manner as in STEP-S17 in Example 1, and the data identification name stored in the data identification name storage area and the data level value stored in the data level storage area of the above data string can be displayed, for example, on the display unit 16.

For example, when the data to be retrieved is "WOOD", the new dynamic array D' having contents shown in Table 21 can be obtained. Further, retrieval results shown in Table 22 can be obtained. The data level values are arranged in the ascending order when the retrieval results are outputted.

Table 21

D'(0): ID number=12
D'(1): ID number=5
D'(2): ID number=6
D'(3): ID number=8

TABLE 22

| Data identification name of extracted data string | Data level value |
|---|---|
| INSULATOR | 1 |
| COMBUSTIBILITY | 1 |
| SPECIFIC GRAVITY OF 1 OR LESS | 1 |
| PLANT | 2 |
| MICA | 2 |
| WOOD | 3 |
| DESK | 4 |
| PENCIL | 4 |

In Example 9, the data retrieval method can be carried out on the basis of the new dynamic array D' according to the scrap method explained in Example 3. In this case, data strings based on ID numbers which are contents of the new dynamic array D' are consecutively extracted (read out) from the data structure, the read-out data string is stored in the variable storage area as an inputted data string, and then the procedures in STEP-S43 in Example 3 and the procedures thereafter can be carried out.

Example 10

Example 10 is concerned with the link-information adding method directed to the third aspect of the present invention, and with a link-information adding method of adding new link-information data to the parent data storage area of a data string. In Example 10, the data string structure of in the data structure and various data stored in the data strings are the same as those in Example 1. Fundamentally, the link-information adding method in Example 10 can be said to be similar to the first link-information adding method of the present invention explained in Example 4. Therefore, the link-information adding method in Example 10 will be explained particularly with regard to points different from the first link-information adding method of the present invention explained in Example 4, with reference to flow charts of FIGS. 15 to 18.

As shown in FIG. 15, first, a data identification name is inputted through the input unit 12 containing, e.g., a keyboard, and a parent concept name indicating a set which includes the data identification name is also inputted (STEP S70). In Example 10, as new link-information data, the link-information data about the data string of ID number 7 storing the data identification name "Plant" will be added to the data string of ID number 6 storing the data identification name "COMBUSTIBILITY". That is, the concept name "PLANT" corresponds to a parent concept, and the concept name "COMBUSTIBILITY" corresponds to an element concept.

MPU 10 reads the inputted letter strings "COMBUSTIBILITY" and "PLANT", and stores them in the variable storage areas established in the main storage device 14. MPU 10 checks whether the inputted data identification name is in agreement with the inputted parent concept name (STEP-S71), and when they are in agreement, MPU 10 discontinues the addition of link-information data since the already explained Rule (2) is violated. When the inputted data identification name is not in agreement with the inputted parent concept name, MPU 10 extracts (reads out) the inputted data string DS_I (ID number 6) which is a data string storing the inputted data identification name, and also extracts (reads out) the parent concept data string DS_P (ID number 7) which is a data string storing the data identification name in agreement with the inputted parent concept name (STEP-S72, STEP-S73).

Then, MPU 10 checks whether the parent data storage area of the inputted data string DS_I has the link-information data about the parent concept data string DS_P (STEP-S74). If affirmative, MPU 10 discontinues the addition of link-information data since the already explained Rule (1) is violated. The above checking can be also conducted by deciding whether the link-information data about the inputted data string DS_I is stored in the element data storage area of the parent concept data string DS_P.

When the link-information data about the parent concept data string DS_P is not there in the parent data storage area of the inputted data string DS_I, MPU 10 conducts the checking of Rule (3). That is, a data string is extracted on the basis of the link-information data stored in the parent data storage area of the parent concept data string DS_P, and a data string is further extracted on the basis of the link-information data stored in the parent data storage area of the extracted data string until the parent data storage area of the extracted data string is empty (STEP-S75). In the above retrieval step, the data strings of ID numbers 15 and 16 are extracted.

When any one of the data strings extracted in the above retrieval step is in agreement with the inputted data string DS_I (ID number 6), the addition of the link-information data is discontinued since Rule (3) is violated (STEP-S76).

When none of the data strings extracted in the above retrieval step is in agreement with the inputted data string DS_I (ID number 6), ID number 7 which is the link-information data about the parent concept data string DS_P is stored in the parent data storage area of the inputted data string DS_I (STEP-S77). Further, ID number 6 which is the link-information data about the inputted data string DS_I is stored in the element data storage area of the parent concept data string DS_P (ID number 7) (STEP-S77).

Then, MPU 10 executes the data level value adjustment in STEP-S78. That is, as shown in FIG. 16, MPU 10 compares the data level value of the inputted data string DS_I (ID number 6) with the data level value of the parent concept data string DS_P (ID number 7). More specifically, MPU 10 compares the value of the data level storage area [Level_X] of the inputted data string stored in a variable X of the main storage device 14 with the value of the data level storage area [Level_Y] of the parent concept data string stored in a variable Y (STEP-S80). The variables X and Y have the same structure as those of the variables X and Y explained in Example 4. When the value of the data level storage area [Level_Y]≦the value of the data level storage area [Level_X], a value obtained by adding 1 to the value of the data level storage area [Level_X] is stored in the data level storage area [Level_Y] (STEP-S81). In Example 10, since the value of the data level storage area [Level_Y] is equal to the value of the data level storage area [Level_Y], "2" is stored in the data level storage area [Level_Y].

Then, MPU 10 writes the contents of the variables X and Y in the data strings of corresponding ID numbers in the data structure (STEP-S82).

Then, a data string is extracted on the basis of the link-information data stored in the parent data storage area of the parent concept data string DS_P (ID number 7). When the data level value of the so-extracted data string is equal to, or smaller than the data level value adjusted in STEP-S78 (data level value obtained after the adjustment in STEP-S81), a value obtained by adding 1 to the data level value adjusted in STEP-S78 is stored in the data level storage area of the so-extracted data string. That is, the data level value of the data string of ID number 7 changes from "1" to "2", which changes the data level value of the data string (ID number 12 in Example 10) storing the data identification name indicating a set which includes the data identification name stored in the data string of ID number 7. Further, there is a change in the data level values of the data strings (data strings of ID numbers 15 and 16 in Example 10) storing the data identification name indicating a set which includes the data identification name stored in the data string of ID number 12. It is therefore necessary to carry out the data level value readjustment procedure (STEP-S79).

In the above case, a data string is extracted on the basis of the link-information data stored in the parent data storage area of the data string storing the data identification name corresponding to the parent concept name, and a data string is further extracted on the basis of the link-information data stored in the parent data storage area of the extracted data string until the parent data storage area of the extracted data string is empty. When the data level value of the extracted data string (DS-E) is equal to, or greater than, the data level value of the data string (DS-F) extracted on the basis of the link-information data stored in the parent data storage area of the data string (DS-E), a value obtained by adding 1 to the data level value of the extracted data string (DS-E) is stored in the data level storage area of the data string (DS-F).

Figure 17:
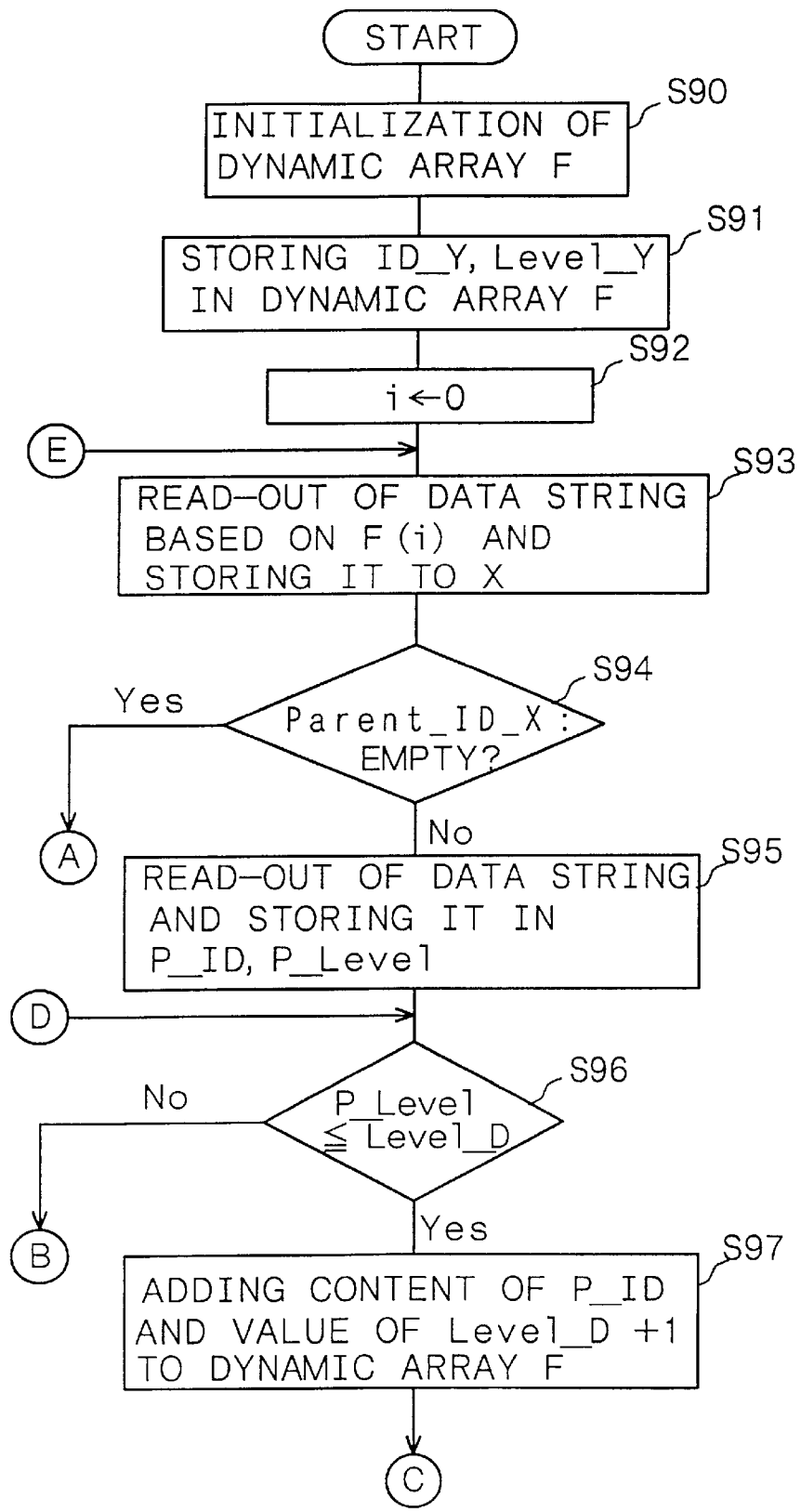
FIG. 17 is a flow chart showing the link-information adding method in Example 4 subsequent to FIG. 15.
Figure 18:
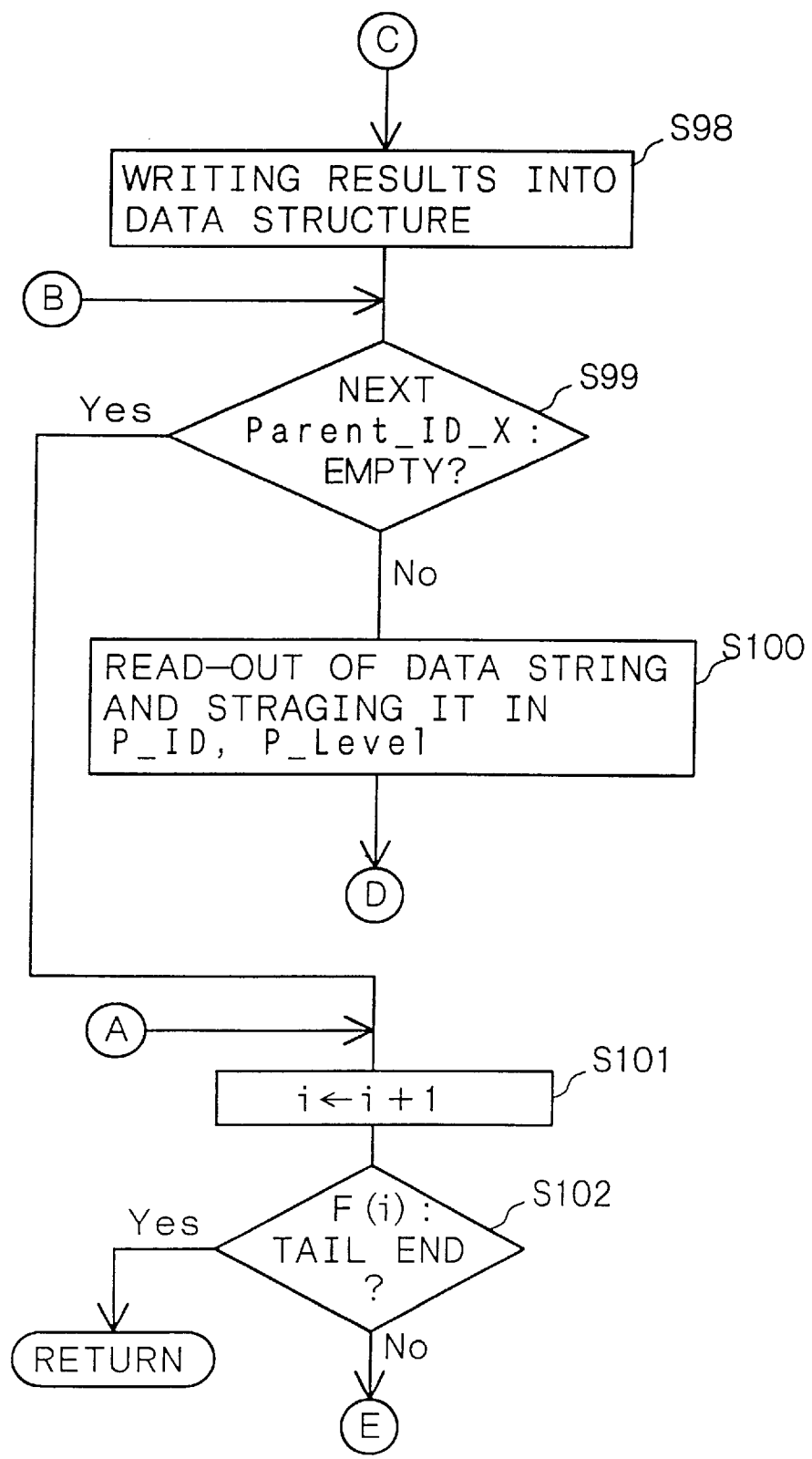
FIG. 18 is a flow chart showing the link-information adding method in Example 4 subsequent to FIG. 17.

The above can be carried out by executing STEP-S90 to STEP-S102 in Example 4 explained with reference to FIGS. 17 and 18. Accordingly, the addition of the new link-information data to the parent data storage area of the data string is completed.

Example 11

Example 11 is a variant of Example 10, and is concerned with the link-information adding method directed to the fourth aspect of the present invention.

In Example 10 which is concerned with the link-information adding method directed to the third aspect of the present invention, in STEP-S75, a data string is extracted on the basis of the link-information data stored in the parent data storage area of the parent concept data string DS_P. That is, the above step is substantially the same as STEP-S13 to STEP-S16 in Example 1. On the other hand, in the link-information adding method in Example 11, in STEP-S75, a data string is extracted on the basis of the link-information data stored in the element data storage area of the inputted data string DS_I.

That is, in the link-information adding method in Example 11, in STEP-S74, it is checked whether the element data storage area of the parent concept data string DS_P has the link-information data about the inputted data string DS_I. If the link-information data is there, the addition of the link-information data is discontinued since Rule (1) is violated. The above checking can be also conducted by deciding whether the link-information data about the parent concept data string DS_P is stored in the parent data storage area of the inputted data string DS_I.

When the element data storage area of the parent concept data string DS_P has no link-information data about the inputted data string DS_I, the checking of Rule (3') is conducted. That is, a data string is extracted on the basis of the link-information data stored in the element data storage area of the inputted data string DS_I, and a data string is further extracted on the basis of the link-information data stored in the element data storage area of the extracted data string until the element data storage area of the extracted data string is empty. Specifically, MPU 10 executes the already explained third retrieving pattern or fourth retrieving pattern on the basis of the data of the element identification number storage area [Element_ID_X] of the element data storage area [Element_X] of the data string stored in the variable X of the main storage device 14. Since the data string of ID number 6 storing the data identification name "COMBUSTIBILITY" has a data level value of "1", no data string is extracted in the above retrieval step.

When any one of the data strings extracted in the above step is in agreement with the data string DS_P storing the parent concept name (ID number 7 in Example 11), the addition of the link-information data is discontinued. When none of the data strings extracted in the above step is in agreement with the data string DS_P storing the parent concept name, ID number 7 which is the link-information data about the data string DS_P storing the parent concept name is stored in the parent data storage area of the inputted data string DS_I (ID number 6) (STEP-S77). Further, ID number 6 which is the link-information data about the inputted data string DS_I is stored in the element data storage area of the data string DS_P (ID number 7) storing the parent concept name.

Except for the above point, other steps in Example 11 can be the same as those in Example 10, and their detailed explanation is therefore omitted.

Example 12

Example 12 is concerned with the link-information adding method directed to the fifth aspect of the present invention, and is concerned with the link-information adding method of adding new link-information data to the element data storage area of a data string. In Example 12, the data string structure in the data string and various data stored in data strings are the same as those in Example 1. Fundamentally, the link-information adding method in Example 12 can be said to be similar to the second link-information adding method of the present invention explained in Example 7. Therefore, the link-information adding method in Example 12 will be explained particularly with regard to points different from the second link-information adding method of the present invention explained in Example 7, with reference to flow charts of FIGS. 25 and 26 and FIGS. 17 and 18.

As shown in FIG. 25, first, a data identification name is inputted through the input unit 12 containing, e.g., a keyboard, and an element concept name which is an element of a set indicated by the data identification name is also inputted (STEP-S140). In Example 12, as new link-information data, the link-information data about the data string of ID number 6 (element concept data string, DS_E) storing the data identification name "COMBUSTIBILITY" is added to the data string (inputted data string, DS_I) of ID number 7 storing the data identification name "PLANT". MPU 10 reads the inputted letter strings "PLANT" and "COMBUSTIBILITY" and stores them in the variable storage areas established in the main storage device 14. MPU 10 checks whether the inputted data identification name is in agreement with the inputted element concept name (STEP- S141), and when they are in agreement, the addition of the link-information data is discontinued since Rule (2) is violated.

When the inputted data identification name is not in agreement with the inputted element concept name, the inputted data string DS_I (ID number 7) which is the data string storing the inputted data identification name is extracted, and the element concept data string DS_E (ID number 6) which is the data string storing the data identification name in agreement with the inputted element concept name is extracted (STEP-S142 and STEP-S143).

Then, it is checked whether the element data storage area of the inputted data string DS_I has the link-information data about the element concept data string DS_E (STEP-S144). If the above is the case, the addition of the link-information data is discontinued since Rule (1) is violated. This decision can be also conducted by checking whether the link-information data about the inputted data string DS_I is stored in the parent data storage area of the element concept data string DS_E.

When the link-information data about the element concept data string DS_E is not there in the element data storage area of the inputted data string DS_I, the checking of Rule (3) is conducted. That is, a data string is extracted on the basis of the link-information data stored in the parent data storage area of the inputted data string DS_I, and a data string is further extracted on the basis of the link-information data stored in the parent data storage area of the extracted data string until the parent data storage area of the extracted data string is empty (STEP-S145). Unlike Example 7, the above step can be substantially the same as STEP-S13 to STEP-S16 in Example 1. In the above retrieval step, the data strings of ID numbers 12, 15 and 16 are extracted.

When any one of the data strings extracted in the above retrieval step is in agreement with the element concept data string DS_E (ID number 6), the addition of the link-information data is discontinued since Rule (3') is violated (STEP-S46).

When none of the data strings extracted in the above retrieval step is in agreement with the element concept data string DS_E (ID number 6) storing the element concept data identification name, ID number 6 which is the link-information data about the element concept data string DS_E is stored in the element data storage area of the inputted data string DS_I (ID number 7) (STEP-S147). ID number 7 which is the link-information data about the inputted data string DS_I is also stored in the parent data storage area of the element concept data string DS_E (ID number 6). The above step can be also the same as STEP-S147 in Example 7.

Then, MPU 10 executes the data level value adjustment in STEP-S148. That is, as shown in FIG. 26, MPU 10 compares the data level value of the inputted data string DS_I (ID number 7) with the data level value of the element concept data string DS_E (ID number 6). More specifically, MPU 10 compares the value of the data level storage area [Level_X] of the inputted data string stored in a variable X of the main storage device 14 with the value of the data level storage area [Level_Y] of the element concept data string stored in a variable Y (STEP-S150). The variables X and Y have the same structures as those explained in Example 7. When the value of the data level storage area [Level_X] ≦ the value of the data level storage area [Level_Y], a value obtained by adding 1 to the value of the data level storage area [Level_Y] is stored in the data level storage area [Level_X] (STEP-S151). In Example 12, since the value of the data level storage area [Level_X] is equal to the value of the data level storage area [Level_Y], "2" is stored in the data level storage area [Level_X].

Then, the contents of X and Y are written in the data strings of the corresponding ID numbers in the data structure (STEP-S152).

Then, if necessary, a data string is extracted on the basis of the link-information data stored in the parent data storage area of the data string DS_I, and a value obtained by adding 1 to the data level value of the data level storage area [Level_X] is stored in the data level storage area of the extracted data string when the extracted data string has a data level value equal to, or smaller than, the value of the data level storage area [Level_X].

That is, a data string is extracted on the basis of the link-information data stored in the parent data storage area of the inputted data string DS_I (ID number 7), and when the data level value of the so-extracted data string is equal to, or smaller than, the data level value adjusted in STEP-S151, a value obtained by adding 1 to the data level value adjusted in STEP-S151 is stored in the data level storage area of the so-extracted data string. That is, the data level value of the data string of ID number 7 changes from "1" to "2", which causes a change in the data level value of the data string (ID number 12 in Example 12) storing the data identification name indicating a set which includes the data identification name stored in the data string of ID number 7. Further, there is also caused a change in the data level values of the data strings (data strings of ID numbers 15 and 16 in Example 12) storing the data identification name indicating a set which includes the data identification name stored in the data string of ID number 12. It is therefore required to conduct the data level value readjustment procedure.

In the above case, a data string is extracted on the basis of the link-information data stored in the parent data storage area in the parent concept data string, and a data string is further extracted on the basis of the link-information data stored in the parent data storage area of the extracted data string until the parent data storage area of the extracted data string is empty. When the data level value of the extracted data string (DS-G) is equal to, or greater than, the data level value of the data string (DS-H) extracted on the basis of the link-information data stored in the parent data storage area of the extracted data string (DS-G), a value obtained by adding 1 to the data level value of the extracted data string (DS-G) is stored in the data level storage area of the data string (DS-H).

The above can be carried out by executing STEP-S90 to STEP-S102 in Example 4 explained with reference to FIGS. 17 and 18. In this case, however, the content of the variable X is moved to the variable Y before STEP-S90 is executed. The addition of new link-information data to the element data storage area of the data string is accordingly completed.

Example 13

Example 13 is a variant of Example 12, and is concerned with the link-information adding method directed to the sixth aspect of the present invention.

In Example 12 which is concerned with the link-information adding method directed to the fifth aspect of the present invention, in STEP-S145, a data string is extracted on the basis of the link-information data stored in the parent data storage area of the inputted data string DS_I. That is, the above step is substantially the same as STEP-S13 to STEP-S16. On the other hand, in the link-information adding method in Example 13, in STEP-S145, a data string is extracted on the basis of the link-information data stored in the element data storage area of the element concept data string DS_E.

That is, in the link-information adding method in Example 13, in STEP-S145, when the parent data storage area of the element concept data string DS_E has no link-information data about the inputted data string DS_I (or when the element data storage area of the inputted data string DS_I has no link-information data about the element concept data string DS_E), a data string is extracted on the basis of the link-information data stored in the element data storage area of the element concept data string DS_E, and a data string is further extracted on the basis of the link-information data stored in the element data storage area of the extracted data string until the element data storage area of the extracted data string is empty. Specifically, the third retrieving pattern or the fourth retrieving pattern which has been already explained is executed on the basis of the data of the element identification number storage area [Element_ID_Y] of the element data storage area [Element_Y] of the data string stored in a variable Y of the main storage device 14. Since the data level value of the data string of ID number 6 storing the data identification name "COMBUSTIBILITY" is "1", no data string is extracted in the above retrieval step.

When any one of the data strings extracted in the above step is in agreement with the inputted data string DS_I (ID number 7 in Example 13) (STEP-S146), the addition of the link-information data is discontinued. When none of the data strings extracted in the above step is in agreement with the inputted data string DS_I, ID number 6 which is the link-information data about the element concept data string DS_E is stored in the element data storage area of the inputted data string DS_I (ID number 7) (STEP-S147). Further, ID number 7 which is the link-information data about the inputted data string DS_I is stored in the parent data storage area of the element concept data string DS_E (ID number 6).

Except for the above points, other steps are the same as those in Example 12, and detailed explanation of the other points is therefore omitted.

Example 14

Example 14 is concerned with the data retrieval method directed to the first and fourth aspects of the present invention, more specifically to the first and fourth aspects in the medical field of diagnostics. Table 23 shows a data structure in Example 14.

It is diagnostically very useful to know any possible disease on the basis of symptoms which a patient has and test data obtained by examining the patient. A medical doctor can know what is a disease

TABLE 23

| ID No. | Concept Name Recorded in Data String | | | Element Concept Name | |
|---|---|---|---|---|---|
| | 3rd level | 2nd level | 1st level | 2nd level | 1st level |
| 1 | | | fever | | |
| 2 | | | leukocytosis | | |
| 3 | | | leukopenia | | |
| 4 | | | cough | | |
| 5 | | | sputa | | |
| 6 | | viral_pneumonia | | | fever |
| | | | | | leukopenia |
| | | | | | cough |
| 7 | | respiratory sympton | | | cough |
| | | | | | sputa |
| 8 | bacterial_pneumonia | | | | fever |
| | | | | | leukocytosis |
| | | | | respiratory sympton | | which has leukocytosis, cough and fever as element concepts and/or indirect element concepts when he or she can extract, from a data structure, a data string having a data identification name which can be a parent concept and/or an indirect parent concept with regard to the concepts of leukocytosis, fever and cough. That is, "LEUKOCYTOSIS", "FEVER" and "COUGH" are inputted as data identification names to be retrieved. Table 24 shows results of the data retrieval carried out according to the data retrieval method of the scrap method. For specific data retrieval procedures, please refer to Example 3.

TABLE 24

| Data identification name of extracted data string | Hit number of inputted data strings |
|---|---|
| BACTERIAL PNEUMONIA | 3 |
| VIRAL PNEUMONIA | 2 |
| RESPIRATORY SYMPTOM | 1 |

The results of the above data retrieval show that the concept having all of "LEUKOCYTOSIS", "FEVER" and "COUGH" as element concepts and/or indirect element concepts is "BACTERIAL PNEUMONIA". The above "BACTERIAL PNEUMONIA" does not contains "COUGH" as an element concept. It is however seen that since "RESPIRATORY SYMPTOM" contains "COUGH" as an element concept, "BACTERIAL PNEUMONIA" has "COUGH" as an indirect element concept.

When all of diseases are expressed as data strings having a data level value of "2" and the data retrieval is conducted, the same result as above can be obtained. However, an element set is full of a list of symptoms and abnormal qualities identified in a test, stored in first level data strings, and it is therefore difficult to identify the characteristics of a disease. More rational is a method in which a disease is expressed by means of medical concepts which can express the characteristics and in which the used medical concepts are expressed by other medical concepts.

In diagnostics, it is necessary to consider a case where a patient has no typical symptoms. In this case, for example, it is necessary to expand the retrieval scope to diseases having at least two symptoms of "LEUKOCYTOSIS", "FEVER" and "COUGH" as element concepts and/or indirect element concepts. The data identification names showing that the hit number of the inputted data strings is at least "2" are "VIRAL PNEUMONIA" and "BACTERIAL PNEUMONIA".

When a disease showing a respiratory symptom is retrieved, a medical doctor sometimes needs only a disease having one of "COUGH" and "SPUTA" as an element concept and/or an indirect element concept. For example the concept of "VIRAL PNEUMONIA" contains the concept of "COUGH" alone out of "COUGH" and "SPUTA". Originally, the element set of the "VIRAL PNEUMONIA" should be

{FEVER, LEUKOPENIA, COUGH, SPUTA} or

{FEVER, LEUKOPENIA, RESPIRATORY SYMPTOM}.

At the stage of forming the data structure, however, the above consistency is not always satisfied.

In the application of the data retrieval method directed to the fourth aspect of the present invention explained in Example 9, for example, it is possible to determine a concept which has at least one element concept and/or indirect element concept of "RESPIRATORY SYMPTOM" as an element concept and/or an indirect element concept. That is, as a result of the data retrieval, "VIRAL PNEUMONIA" and "BACTERIAL PNEUMONIA" can be obtained. However, the display of "respiratory symptom" and "first level data string" is excluded.

Further, there is a problem concerning synonyms. For example, various expressions such as "FEVER", "HIGH FEVER" and "LOWER GRADE FEVER" are used, and these terms are distinguished depending upon diseases when used. When it is supposed to retrieve feverish disease, it is required to combine "FEVER", "HIGH FEVER" and "LOWER GRADE FEVER" by "OR" in the a conventional retrieval method. In contrast, in the data retrieval method of the present invention, a data string

FEVER {HIGH FEVER, LOWER GRADE FEVER} which corresponds to a concept including similar concepts is formed in advance. And, the data retrieval method directed to the fourth aspect of the present invention is carried out, whereby all of feverish diseases having "FEVER", "HIGH FEVER" and "LOWER GRADE FEVER" as element concepts and/or indirect element concepts can be obtained. Data strings defined as concepts including synonyms are prepared in advance, whereby the omission of designated keywords or the complicated designation of items can be avoided.

Example 15

Example 15 is concerned with the data retrieval method directed to the second aspect of the present invention. Example 15 deals with the following chemical reactions.

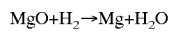

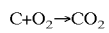

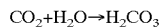

Table 25 shows the data structure in Example 15.

In Table 25, a compound which is a data identification name stored in a certain data string having a certain data level value is formed by a reaction of a certain compound or element which is a data identification name stored in a data string

TABLE 25

| ID No. | Concept Name Recorded in Data String | | | Element Concept Name | |
|---|---|---|---|---|---|
| | 3rd level | 2nd level | 1st level | 2nd level | 1st level |
| 1 | | | MgO | | |
| 2 | | | $H_2$ | | |
| 3 | | | C | | |
| 4 | | | $O_2$ | | |
| 5 | | Mg | | | MgO $H_2$ |
| 6 | | $H_2O$ | | | MgO $H_2$ |
| 7 | | $CO_2$ | | | C $O_2$ |
| 8 | $H_2CO_3$ | | | $CO_2$ $H_2O$ | | corresponding to link-information data stored in the element data storage area of the certain data string.

In Example 15, "$H_2CO_3$" is inputted as data to be retrieved. As data retrieval results after the procedures similar to those in Example 5, "MgO", "$H_2$", "C" and "$O_2$" can be obtained when only data strings having a data level value of "1" are displayed. These results show that $H_2CO_3$ is formed from MgO, $H_2$, C and $O_2$.

The present invention is explained on the basis of preferred embodiments of the present invention, while the present invention shall not be limited to these embodiments. The data string structure in the data structure is give for an illustrative purpose, and can be properly modified. The retrieval data array and retrieval element data array are also given for an illustrative purpose, and can be properly modified. Further, the method of extracting data strings is also given for an illustrative purpose, and data strings can be extracted by any method.

For example, a data structure shown in FIG. 33 may be used. The data structure shown in FIG. 33 contains a concept structure, a parent set structure and an element set structure. In the concept structure, each data string contains an identification number storage area [ID], a data identification name storage area [Name], a level value storage area [Level], a parent data storage area [Parent] and an element data storage area [Element]. In the identification number storage area [ID], an identification number for identifying the data string is stored. The identification number is a number characteristic of its corresponding data string. In a data identification name storage area [Name], a concept name at a corresponding level (first level concept name, second level concept name, third level concept name, etc.) is stored. In the data level value storage area [Level_Value], the data level value (1, 2, 3 or the like) of the data string is stored.

The parent data storage area [Parent] is composed of a parent concept link-information data count area [Parent_Count] for storing the count number of the parent concept link-information data, a parent set structure link-information data first storage area [Parent_LinkTop] for storing ID number at the head of the related parent set structure, and a parent set structure link-information data second storage area [Parent_LinkEnd] for storing ID number at the end of the related parent set structure. When there is no related parent set structure, "void" is written in the parent set structure link-information data first storage area [Parent_LinkTop] and the parent set structure link-information data second storage area [Parent_LinkEnd].

The element data storage area [Element] is composed of an element concept link-information data count area [Element_Count] for storing the number of the element concept link-information data, an element set structure link-information data first storage area [Element_LinkTop] for storing ID number at the head of the related element set structure, and an element set structure link-information data second storage area [Element_LinkEnd] for storing ID number at the end of the related element set structure. When there is no element set structure, "void" is written in the element set structure link-information data first storage area [Parent_LinkTop] and the element set structure link-information data second storage area [Parent_LinkEnd].

The parent set structure is composed of an ID number storage area [ID] for storing ID number, a next ID number storage area [Next_ID] for storing ID number of a next parent set structure, a previous ID number storage area [Before_ID] for storing ID number of a parent set structure located before the present parent set structure, and parent identification number storage areas [Parent_ID]. The next parent set structure is used when the present parent set structure cannot manage to store parent concept link-information data, that is, when the parent identification number storage areas [Parent_ID] in the present parent set structure are full. In the parent identification number storage areas [Parent_ID], ID numbers as parent concept link-information data are stored.

The element set structure is composed of an ID number storage area [ID] for storing ID number, a next ID number storage area [Next_ID] for storing ID number of a next element set structure, a previous ID number storage area [Before_ID] for storing ID number of an element set structure located before the present element set structure, and element identification number storage areas [Element_ID]. The next element set structure is used when the present element set structure cannot manage to store element concept link-information data, that is, when the element identification number storage areas [Element_ID] in the present element set structure are full. In the element identification number storage areas [Element_ID], ID numbers are stored as element concept link-information data.

In the data structure having the above structure, a data identification name is inputted and a data string (inputted data) having a concept structure storing the data identification name is accordingly read out. A data of the parent set structure can be arrived at on the basis of the ID number stored in the parent set structure link-information data first storage area [Parent_LinkTop] of the inputted data string. The content of the data of the above parent set structure is read out, whereby the link-information data about the parent concept can be read out. When the parent identification number storage area [Parent_ID] alone is not adequate for storing link-information data, the data of the parent set structure can be read out on the basis of ID number stored in the next ID number storage area [Next_ID]. In the element set structure, link-information data of an element concept can be also similarly read out.

In the data retrieval method or the link-information adding method of the present invention, the possibility of falling in an endless loop in data retrieval can be completely prevented. Further, the circulating definition can be completely removed. In adding link-information data in the data structure, users can add link-information data without taking care not to cause a circulating definition. Further, there are excellent effects that not only a parent concept and an element concept can be extracted, but also an indirect parent concept and an indirect element concept can be extracted, in the data retrieval.

According to the present invention, there can be constructed a data structure for effectively and easily expressing knowledge in the form of a hierarchical structure. In this data structure, all pieces of knowledge is modeled by means of a set having a name called a concept, and users can construct and reconstruct a data structure having a hierarchical structure as required. The direct or indirect circulating definition which takes place when a certain concept as an element concept is added to other concept can be automatically excluded.

What is claimed is:

1. A data retrieval method in a data-string set including a plurality of data strings,
each data string DS_1 having
   (1) a data identification name storage area storing a data identification name,
   (2) a data level storage area storing a data level value, and
   (3) a parent data storage area storing link-information data about a data string DS_2 storing a data identification name which indicates a set including the data identification name stored in the data string DS_1,
wherein:
   (A) the data string DS_2 has a larger data level value than the data string DS_1 has,
   (B) the parent data storage area of the data string DS_1 does not contain link-information data about the data string DS_1 itself, and the link-information data stored in the parent data storage area of the data string DS_1 differ from one another, and
   (C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings,
the method comprising the steps of
   (a) inputting a data identification name corresponding to data to be retrieved,
   (b) extracting a data string on the basis of link-information data stored in a parent data storage area of a data string whose data identification name storage area stores the same data identification name as the inputted data identification name, and further extracting a data string on the basis of link-information data stored in a parent data storage area of the extracted data string until the parent data storage area of the extracted data string is empty, and
   (c) outputting the extracted data string.

2. A data retrieval method in a data-string set including a plurality of data strings,
each data string DS_1 having
   (1) a data identification name storage area storing a data identification name,
   (2) a data level storage area storing a data level value, and
   (3) an element data storage area storing link-information data about a data string DS_0 storing a data identification name which is an element of a set indicated by the data identification name stored in the data string DS_1,
wherein:
   (A) the data string DS_0 has a smaller data level value than the data string DS_1 has, (B) the element data storage area of the data string DS_1 does not contain link-information data about the data string DS_1 itself, and the link-information data stored in the element data storage area of the data string DS_1 differ from one another, and (C) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings, the method comprising the steps of (a) inputting a data identification name corresponding to data to be retrieved, (b) extracting a data string on the basis of link-information data stored in an element data storage area of a data string whose data identification name storage area stores the same data identification name as the inputted data identification name, and further extracting a data string on the basis of link-information data stored in an element data storage area of the extracted data string until the element data storage area of the extracted data string is empty, and (c) outputting the extracted data string.

3. A data retrieval method in a data-string set including a plurality of data-strings, each data string DS_1 having (1) a data identification name storage area storing a data identification name, (2) a data level storage area storing a data level value, (3) a parent data storage area storing link-information data about a data string DS_2 storing a data identification name which indicates a set including the data identification name stored in the data string DS_1, and (4) an element data storage area storing link-information data about a data string DS_0 storing a data identification name which is an element of a set indicated by the data identification name stored in the data string DS_1, wherein:

(A) the data string DS_2 has a larger data level value than the data string DS_1 has, (B) the parent data storage area of the data string DS_1 does not contain link-information data about the data string DS_1 itself, and the link-information data stored in the parent data storage area of the data string DS_1 differ from one another, (C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings, (D) the data string DS_0 has a smaller data level value than the data string DS_1 has, (E) the element data storage area of the data string DS_1 does not contain link-information data about the data string DS_1 itself, and the link-information data stored in the element data storage area of the data string DS_1 differ from one another, and (F) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings, the method comprising the steps of (a) inputting a data identification name corresponding to data to be retrieved, (b) extracting a data string on the basis of link-information data stored in a parent data storage area of a data string whose data identification name storage area stores the same data identification name as the inputted data identification name, and further extracting a data string on the basis of link-information data stored in a parent data storage area of the extracted data string until the parent data storage area of the extracted data string is empty, (c) extracting a data string on the basis of link-information data stored in an element data storage area of the data string whose data identification name storage area stores the same data identification name as the inputted data identification name, and further extracting a data string on the basis of link-information data stored in an element data storage area of the extracted data string until the element data storage area of the extracted data string is empty, and (d) outputting the extracted data strings.

4. A data retrieval method in a data-string set including a plurality of data-strings, each data string DS_1 having (1) a data identification name storage area storing a data identification name, (2) a data level storage area storing a data level value, (3) a parent data storage area storing link-information data about a data string DS_2 storing a data identification name which indicates a set including the data identification name stored in the data string DS_1, and (4) an element data storage area storing link-information data about a data string DS_0 storing a data identification name which is an element of a set indicated by the data identification name stored in the data string DS_1, wherein:

(A) the data string DS_2 has a larger data level value than the data string DS_1 has, (B) the parent data storage area of the data string DS_1 does not contain link-information data about the data string DS_1 itself, and the link-information data stored in the parent data storage area of the data string DS_1 differ from one another, (C) when data strings are consecutively traced on the basis of link-information data stored in parent data storage areas of data strings, with arbitrary link-information data stored in the parent data storage area of the data string DS_1 as a starting point, until the parent data storage area of the traced data string is empty, the link-information data about the data string DS_1 is included in none of the parent data storage areas of the traced data strings, (D) the data string DS_0 has a smaller data level value than the data string DS_1 has, (E) the element data storage area of the data string DS_1 does not contain link-information data about the data string DS_1 itself, and the link-information data stored in the element data storage area of the data string DS_1 differ from one another, and (F) when data strings are consecutively traced on the basis of link-information data stored in element data storage areas of data strings, with arbitrary link-information data stored in the element data storage area of the data string DS_1 as a starting point, until the element data storage area of the traced data string is empty, the link-information data about the data string DS_1 is included in none of the element data storage areas of the traced data strings, the method comprising the steps of (a) inputting a data identification name corresponding to data to be retrieved, (b) extracting a data string on the basis of link-information data stored in an element data storage area of a data string whose data identification name storage area stores the same data identification name as the data identification name to be retrieved, and further extracting a data string on the basis of link-information data stored in an element data storage area of the extracted data string until the element data storage area of the extracted data string is empty, (c) extracting a data string on the basis of link-information data stored in the parent data storage area of the extracted data string whose element data storage area is empty, from among the data strings extracted in the step (b), and further extracting a data string on the basis of link-information data stored in a parent data storage area of the extracted data string until the parent data storage area of the extracted data string is empty, and (d) outputting the extracted data string.

* * * * *